(12) United States Patent
Shukla

(10) Patent No.: US 11,017,551 B2
(45) Date of Patent: May 25, 2021

(54) SYSTEM AND METHOD FOR IDENTIFYING A POINT OF INTEREST BASED ON INTERSECTING VISUAL TRAJECTORIES

(71) Applicant: DMAI, Inc., Los Angeles, CA (US)

(72) Inventor: Nishant Shukla, Hermosa Beach, CA (US)

(73) Assignee: DMAI, INC., Los Angeles, CA (US)

( * ) Notice: Subject to any disclaimer, the term of this patent is extended or adjusted under 35 U.S.C. 154(b) by 0 days.

(21) Appl. No.: 16/277,535

(22) Filed: Feb. 15, 2019

(65) Prior Publication Data

US 2019/0251701 A1 Aug. 15, 2019

Related U.S. Application Data

(60) Provisional application No. 62/630,918, filed on Feb. 15, 2018.

(51) Int. Cl.
*G06T 7/70* (2017.01)
*G06F 3/01* (2006.01)
*G06N 20/00* (2019.01)

(52) U.S. Cl.
CPC ............... *G06T 7/70* (2017.01); *G06F 3/013* (2013.01); *G06N 20/00* (2019.01); *G06T 2200/04* (2013.01)

(58) Field of Classification Search
CPC .......... G06N 5/04; G06N 3/006; G06N 3/008; G06N 20/00; G06N 5/02; G06K 9/00597; G06F 3/013; G06T 7/70; G06T 2200/04
See application file for complete search history.

(56) References Cited

U.S. PATENT DOCUMENTS

| 9,953,637 | B1 | 4/2018 | Di Fabbrizio et al. |
| 10,665,249 | B2 | 5/2020 | Yamaya |
| 10,878,808 | B1 | 12/2020 | Mathias |
| 10,963,493 | | 3/2021 | Hu |
| 2003/0007609 | A1 | 1/2003 | Yuen |
| 2007/0186184 | A1 | 8/2007 | Berstis |
| 2009/0037175 | A1 | 2/2009 | Wang |
| 2010/0042409 | A1 | 2/2010 | Hutchinson |
| 2014/0324648 | A1 | 10/2014 | Mori |

(Continued)

FOREIGN PATENT DOCUMENTS

| KR | 10-0915681 B1 | 9/2009 |
| KR | 100915681 B1 * | 9/2009 |

OTHER PUBLICATIONS

International Search Report and Written Opinion dated May 1, 2019 in International Application PCT/US2019/018270.

(Continued)

*Primary Examiner* — Syed Haider
(74) *Attorney, Agent, or Firm* — Pillsbury Winthrop Shaw Pittman LLP

(57) ABSTRACT

The present teaching relates to method, system, medium, and implementations for identifying object of interest. Image data acquired by a camera with respect to a scene are received. One or more users are detected, during a period of time, from the image data who are present at the scene. Three dimensional (3D) gazing rays of the one or more users during the period of time are estimated. One or more intersections of such 3D gazing rays are identified and are used to determine at least one object of interest of the one or more users.

21 Claims, 37 Drawing Sheets

(56) References Cited

U.S. PATENT DOCUMENTS

| | | | |
|---|---|---|---|
| 2015/0243036 A1* | 8/2015 | Hoffmann | G06T 7/75 382/103 |
| 2016/0078747 A1 | 3/2016 | King | |
| 2016/0163311 A1 | 6/2016 | Crook | |
| 2016/0210503 A1* | 7/2016 | Yin | G06K 9/00335 |
| 2017/0083753 A1 | 3/2017 | Friedland | |
| 2017/0105619 A1 | 4/2017 | Ebisawa | |
| 2017/0161665 A1 | 6/2017 | Iwata | |
| 2017/0206095 A1 | 7/2017 | Gibbs | |
| 2017/0249504 A1 | 8/2017 | Martinson | |
| 2018/0300310 A1 | 10/2018 | Shinn | |
| 2018/0342239 A1 | 11/2018 | Baughman | |
| 2019/0058793 A1 | 2/2019 | Konig | |
| 2019/0066660 A1 | 2/2019 | Liang | |
| 2019/0080252 A1 | 3/2019 | Shinn | |
| 2019/0130900 A1 | 5/2019 | Tsai | |
| 2019/0206401 A1 | 7/2019 | Liu | |
| 2019/0206402 A1 | 7/2019 | Shukla | |
| 2019/0206407 A1 | 7/2019 | Shukla | |
| 2019/0228107 A1 | 7/2019 | Trim | |
| 2019/0236205 A1 | 8/2019 | Jia | |
| 2019/0251331 A1 | 8/2019 | Shukla | |
| 2019/0251701 A1 | 8/2019 | Shukla | |
| 2020/0012720 A1 | 1/2020 | Elson | |

OTHER PUBLICATIONS

International Preliminary Report on Patentability dated Aug. 27, 2020 in International Application PCT/US2019/018270.
Office Action dated Jan. 28, 2021 in U.S. Appl. No. 16/277,032.
Office Action dated Jan. 29, 2021 in U.S. Appl. No. 16/277,469.
Office Action dated Feb. 1, 2021 in U.S. Appl. No. 16/277,505.
Rosani, Andrea et al., "Human Behavior Recognition Using a Context-Free Grammar," Journal of Electronic Imaging, vol. 23.3, 033016-1, May/Jun. 2014.
Liu, Changsong et al., "Learning to Mediate Perceptual Differences in Situated Human-Robot Dialogue", Proceedings of the AAAI Conference on Artificial Intelligence, vol. 29, No. 1, Feb. 19, 2015.
Ryoo, Michael et al., "Recognition of Composite Human Activities through Context-Free Grammar Based Representation," 2006 IEEE Computer Society Conference on Computer Vision and Pattern Recognition (CVPR'06), New York, NY, USA, 2006, pp. 1709-1718, doi: 10.1109/Cvpr.2006.242.
Office Action dated Feb. 10, 2021 in U.S. Appl. No. 16/277,337.
Office Action dated Feb. 16, 2021 in U.S. Appl. No. 16/276,950.
Office Action dated Feb. 24, 2021 in U.S. Appl. No. 16/277,381.
Office Action dated Mar. 12, 2021 in U.S. Appl. No. 16/277,418.
Office Action dated Apr. 5, 2021 in U.S. Appl. No. 16/277,271.
Office Action dated Apr. 5, 2021 in U.S. Appl. No. 16/277,301.

* cited by examiner

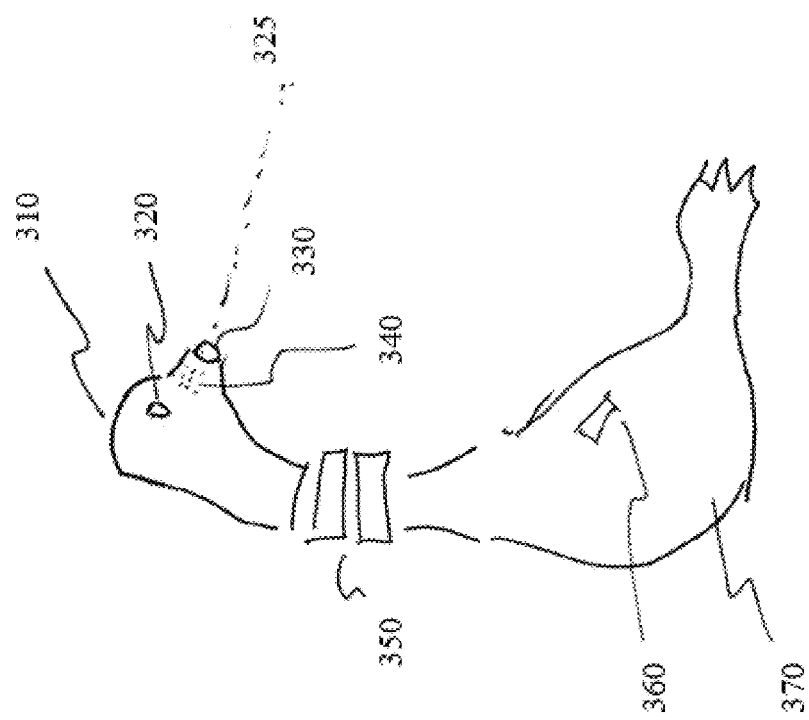

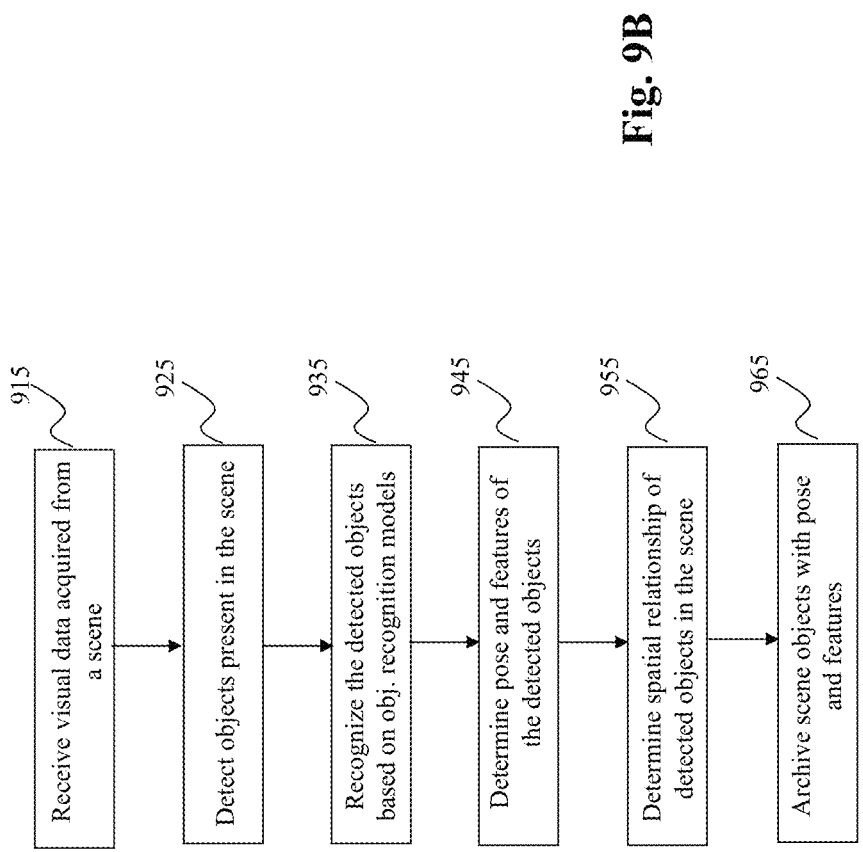

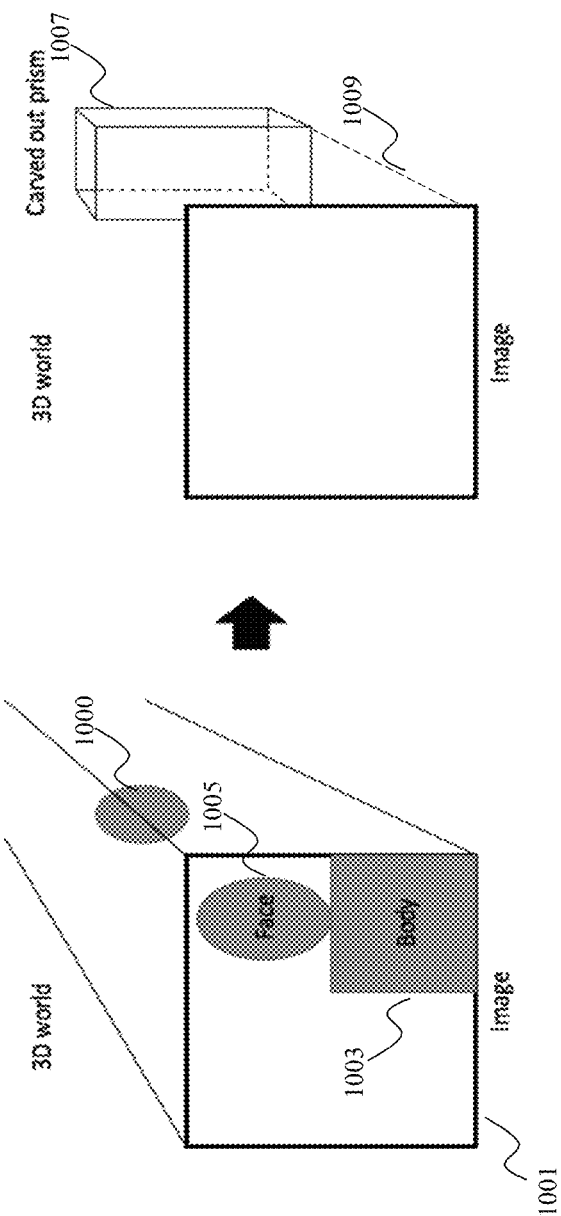

SYSTEM AND METHOD FOR IDENTIFYING A POINT OF INTEREST BASED ON INTERSECTING VISUAL TRAJECTORIES

CROSS-REFERENCE TO RELATED APPLICATIONS

This application claims priority to U.S. Provisional Patent Application 62/630,918, filed Feb. 15, 2018, the contents of which are incorporated herein by reference in its entirety.

The present application is related to International Application No. PCT/US2019/018281, filed Feb. 15, 2019, U.S. patent application Ser. No. 16/277,599, filed Feb. 15, 2019, International Application No. PCT/US2019/018277, filed Feb. 15, 2019, U.S. patent application Ser. No. 16/277,562, filed Feb. 15, 2019, International Application No. PCT/US2019/018270, filed Feb. 15, 2019, International Application No. PCT/US2019/018253, filed Feb. 15, 2019, U.S. patent application Ser. No. 16/277,469, filed Feb. 15, 2019, International Application No. PCT/US2019/018209, filed Feb. 15, 2019, U.S. patent application Ser. No. 16/276,950, filed Feb. 15, 2019, International Application No. PCT/US2019/018264, filed Feb. 15, 2019, U.S. patent application Ser. No. 16/277,505, filed Feb. 15, 2019, International Application No. PCT/US2019/018212, filed Feb. 15, 2019, U.S. patent application Ser. No. 16/277,032, filed Feb. 15, 2019, International Application No. PCT/US2019/018217, filed Feb. 15, 2019, U.S. patent application Ser. No. 16/277,271, filed Feb. 15, 2019, International Application No. PCT/US2019/018226, filed Feb. 15, 2019, U.S. patent application Ser. No. 16/277,301, filed Feb. 15, 2019, International Application No. PCT/US2019/018235, filed Feb. 15, 2019, U.S. patent application Ser. No. 16/277,337, filed Feb. 15, 2019, International Application No. PCT/US2019/018242, filed Feb. 15, 2019, U.S. patent application Ser. No. 16/277,381, filed Feb. 15, 2019, International Application No. PCT/US2019/018248, filed Feb. 15, 2019, U.S. patent application Ser. No. 16/277,418, filed Feb. 15, 2019, International Application No. PCT/US2019/018215, filed Feb. 15, 2019, U.S. patent application Ser. No. 16/277,136, filed Feb. 15, 2019, which are hereby incorporated by reference in their entireties.

BACKGROUND

1. Technical Field

The present teaching generally relates to computer. More specifically, the present teaching relates to computerized intelligent agent.

2. Technical Background

With advancement of artificial intelligence technologies and the explosion Internet based communications because of the ubiquitous Internet's connectivity, computer aided dialogue systems have become increasingly popular. For example, more and more call centers deploy automated dialogue robot to handle customer calls. Hotels started to install various kiosks that can answer questions from tourists or guests. Online bookings (whether travel accommodations or theater tickets, etc.) are also more frequently done by chatbots. In recent years, automated human machine communications in other areas are also becoming more and more popular.

Such traditional computer aided dialogue systems are usually pre-programed with certain questions and answers based on commonly known patterns of conversations in different domains. Unfortunately, human conversant can be unpredictable and sometimes does not follow a pre-planned dialogue pattern. In addition, in certain situations, a human conversant may digress during the process and continue the fixed conversation patterns likely will cause irritation or loss of interests. When this happens, such machine traditional dialogue systems often will not be able to continue to engage a human conversant so that the human machine dialogue either has to be aborted to hand the tasks to a human operator or the human conversant simply leaves the dialogue, which is undesirable.

In addition, traditional machine based dialogue systems are often not designed to address the emotional factor of a human, let alone taking into consideration as to how to address such emotional factor when conversing with a human. For example, a traditional machine dialogue system usually does not initiate the conversation unless a human activates the system or asks some questions. Even if a traditional dialogue system does initiate a conversation, it has a fixed way to start a conversation and does not change from human to human or adjusted based on observations. As such, although they are programmed to faithfully follow the pre-designed dialogue pattern, they are usually not able to act on the dynamics of the conversation and adapt in order to keep the conversation going in a way that can engage the human. In many situations, when a human involved in a dialogue is clearly annoyed or frustrated, a traditional machine dialogue systems is completely unaware and continue the conversation in the same manner that has annoyed the human. This not only makes the conversation end unpleasantly (the machine is still unaware of that) but also turns the person away from conversing with any machine based dialogue system in the future.

In some application, conducting a human machine dialogue session based on what is observed from the human is crucially important in order to determine how to proceed effectively. One example is an education related dialogue. When a chatbot is used for teaching a child to read, whether the child is perceptive to the way he/she is being taught has to be monitored and addressed continuously in order to be effective. Another limitation of the traditional dialogue systems is their context unawareness. For example, a traditional dialogue system is not equipped with the ability to observe the context of a conversation and improvise as to dialogue strategy in order to engage a user and improve the user experience.

Thus, there is a need for methods and systems that address such limitations.

SUMMARY

The teachings disclosed herein relate to methods, systems, and programming for computerized intelligent agent.

In one example, a method, implemented on a machine having at least one processor, storage, and a communication platform capable of connecting to a network for identifying object of interest. Image data acquired by a camera with respect to a scene are received. One or more users are detected, during a period of time, from the image data who are present at the scene. Three dimensional (3D) gazing rays of the one or more users during the period of time are estimated. One or more intersections of such 3D gazing rays are identified and are used to determine at least one object of interest of the one or more users.

In a different example, a system for identifying object of interest. The system includes a dynamic gazing ray estimator and a gaze based object of interest estimator. The dynamic gazing ray estimator is configured for receiving image data acquired by a camera with respect to a scene where one or more users are present, detecting, from the image data, the one or more users during a period of time, and estimating three dimensional (3D) gazing rays of the one or more users during the period of time. The gaze based object of interest estimator is configured for identifying one or more intersections of the 3D gazing rays in the scene and determining at least one object of interest, based on the one or more intersections, associated with at least one of the one or more user present in the scene.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for identifying object of interest, wherein the medium, when read by the machine, causes the machine to perform a series of steps. Image data acquired by a camera with respect to a scene are received. One or more users are detected, during a period of time, from the image data who are present at the scene. Three dimensional (3D) gazing rays of the one or more users during the period of time are estimated. One or more intersections of such 3D gazing rays are identified and are used to determine at least one object of interest of the one or more users.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3B illustrates an exemplary agent device, in accordance with an embodiment of the present teaching;

FIG. 9B is a flowchart of an exemplary process for object detection/tracking, according to an embodiment of the present teaching;

FIGS. 10B-10C illustrate the concept of estimating 3D space occupancy based on face detection, according to an embodiment of the present teaching;

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to address the deficiencies of the traditional human machine dialogue systems and to provide methods and systems that enables a more effective and realistic human to machine dialogue. The present teaching incorporates artificial intelligence in an automated companion with an agent device in conjunction with the backbone support from a user interaction engine so that the automated companion can conduct a dialogue based on continuously monitored multimodal data indicative of the surrounding of the dialogue, adaptively estimating the mindset/emotion/intent of the participants of the dialogue, and adaptively adjust the conversation strategy based on the dynamically changing information/estimates/contextual information.

The automated companion according to the present teaching is capable of personalizing a dialogue by adapting in multiple fronts, including, but not limited to, the subject matter of the conversation, the hardware/components used to carry out the conversation, and the expression/behavior/gesture used to deliver responses to a human conversant. The adaptive control strategy is to make the conversation more realistic and productive by flexibly changing the conversation strategy based on observations on how receptive the human conversant is to the dialogue. The dialogue system according to the present teaching can be configured to achieve a goal driven strategy, including dynamically configuring hardware/software components that are considered most appropriate to achieve an intended goal. Such optimizations are carried out based on learning, including learning from prior conversations as well as from an on-going conversation by continuously assessing a human conversant's behavior/reactions during the conversation with respect to some intended goals. Paths exploited to achieve a goal driven strategy may be determined to remain the human conversant engaged in the conversation even though in some instances, paths at some moments of time may appear to be deviating from the intended goal.

Figure 1:
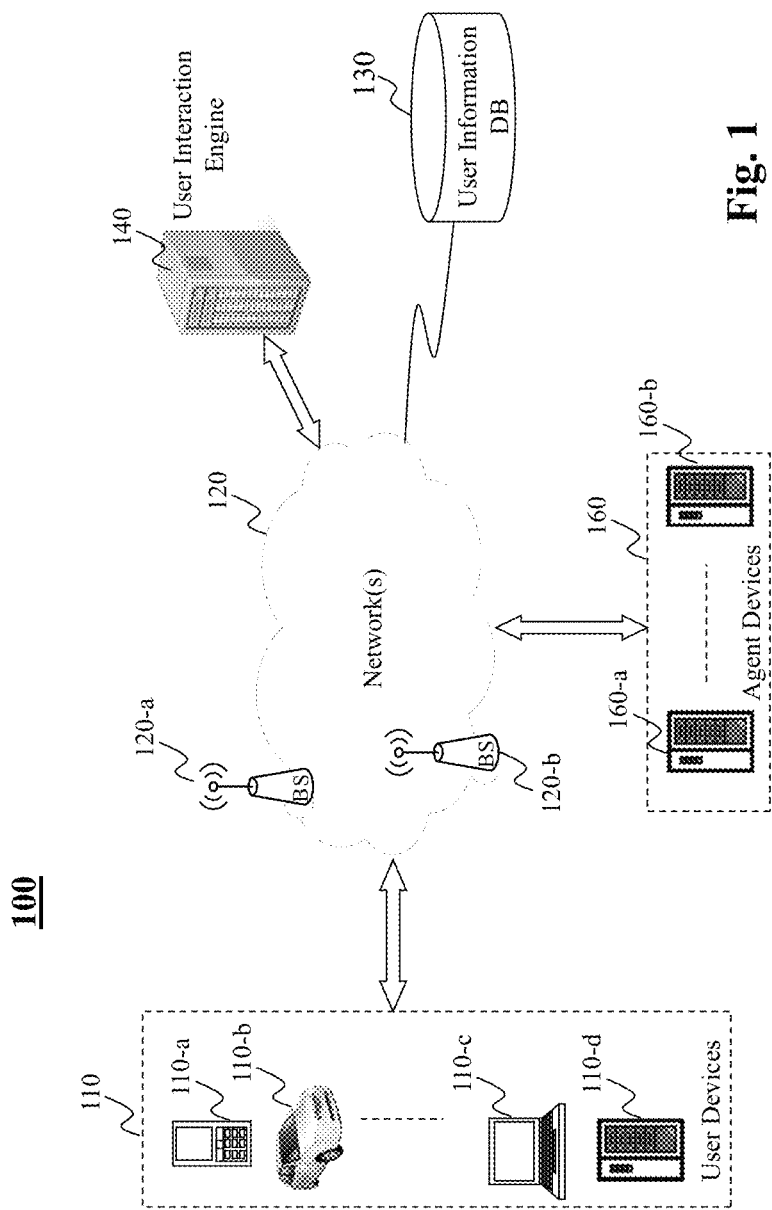
FIG. 1 depicts a networked environment for facilitating a dialogue between a user operating a user device and an agent device in conjunction with a user interaction engine, in accordance with an embodiment of the present teaching.

More specifically, the present teaching discloses a user interaction engine providing backbone support to an agent device to facilitate more realistic and more engaging dialogues with a human conversant. FIG. 1 depicts a networked environment 100 for facilitating a dialogue between a user operating a user device and an agent device in conjunction with a user interaction engine, in accordance with an embodiment of the present teaching. In FIG. 1, the exemplary networked environment 100 includes one or more user devices 110, such as user devices 110-*a*, 110-*b*, 110-*c*, and 110-*d*, one or more agent devices 160, such as agent devices 160-*a*, . . . 160-*b*, a user interaction engine 140, and a user information database 130, each of which may communicate with one another via network 120. In some embodiments, network 120 may correspond to a single network or a combination of different networks. For example, network 120 may be a local area network ("LAN"), a wide area network ("WAN"), a public network, a proprietary network, a proprietary network, a Public Telephone Switched Network ("PSTN"), the Internet, an intranet, a Bluetooth network, a wireless network, a virtual network, and/or any combination thereof. In one embodiment, network 120 may also include various network access points. For example, environment 100 may include wired or wireless access points such as, without limitation, base stations or Internet exchange points 120-*a*, . . . , 120-*b*. Base stations 120-*a* and 120-*b* may facilitate, for example, communications to/from user devices 110 and/or agent devices 160 with one or more other components in the networked framework 100 across different types of network.

A user device, e.g., 110-*a*, may be of different types to facilitate a user operating the user device to connect to network 120 and transmit/receive signals. Such a user device 110 may correspond to any suitable type of electronic/computing device including, but not limited to, a desktop computer (110-*d*), a mobile device (110-*a*), a device incorporated in a transportation vehicle (110-*b*), . . . , a mobile computer (110-*c*), or a stationary device/computer (110-*d*). A mobile device may include, but is not limited to, a mobile phone, a smart phone, a personal display device, a personal digital assistant ("PDAs"), a gaming console/device, a wearable device such as a watch, a Fitbit, a pin/broach, a headphone, etc. A transportation vehicle embedded with a device may include a car, a truck, a motorcycle, a boat, a ship, a train, or an airplane. A mobile computer may include a laptop, an Ultrabook device, a handheld device, etc. A stationary device/computer may include a television, a set top box, a smart household device (e.g., a refrigerator, a microwave, a washer or a dryer, an electronic assistant, etc.), and/or a smart accessory (e.g., a light bulb, a light switch, an electrical picture frame, etc.).

An agent device, e.g., any of 160-*a*, . . . , 160-*b*, may correspond one of different types of devices that may communicate with a user device and/or the user interaction engine 140. Each agent device, as described in greater detail below, may be viewed as an automated companion device that interfaces with a user with, e.g., the backbone support from the user interaction engine 140. An agent device as described herein may correspond to a robot which can be a game device, a toy device, a designated agent device such as a traveling agent or weather agent, etc. The agent device as disclosed herein is capable of facilitating and/or assisting in interactions with a user operating user device. In doing so, an agent device may be configured as a robot capable of controlling some of its parts, via the backend support from the application server 130, for, e.g., making certain physical movement (such as head), exhibiting certain facial expression (such as curved eyes for a smile), or saying things in a certain voice or tone (such as exciting tones) to display certain emotions.

When a user device (e.g., user device 110-*a*) is connected to an agent device, e.g., 160-*a* (e.g., via either a contact or contactless connection), a client running on a user device, e.g., 110-*a*, may communicate with the automated companion (either the agent device or the user interaction engine or both) to enable an interactive dialogue between the user operating the user device and the agent device. The client may act independently in some tasks or may be controlled remotely by the agent device or the user interaction engine 140. For example, to respond to a questions from a user, the agent device or the user interaction engine 140 may control the client running on the user device to render the speech of the response to the user. During a conversation, an agent device may include one or more input mechanisms (e.g., cameras, microphones, touch screens, buttons, etc.) that allow the agent device to capture inputs related to the user or the local environment associated with the conversation. Such inputs may assist the automated companion to develop an understanding of the atmosphere surrounding the conversation (e.g., movements of the user, sound of the environment) and the mindset of the human conversant (e.g., user picks up a ball which may indicates that the user is bored) in order to enable the automated companion to react accordingly and conduct the conversation in a manner that will keep the user interested and engaging.

In the illustrated embodiments, the user interaction engine 140 may be a backend server, which may be centralized or distributed. It is connected to the agent devices and/or user devices. It may be configured to provide backbone support to agent devices 160 and guide the agent devices to conduct conversations in a personalized and customized manner. In some embodiments, the user interaction engine 140 may receive information from connected devices (either agent devices or user devices), analyze such information, and control the flow of the conversations by sending instructions to agent devices and/or user devices. In some embodiments, the user interaction engine 140 may also communicate directly with user devices, e.g., providing dynamic data, e.g., control signals for a client running on a user device to render certain responses.

Generally speaking, the user interaction engine 140 may control the state and the flow of conversations between users and agent devices. The flow of each of the conversations may be controlled based on different types of information associated with the conversation, e.g., information about the user engaged in the conversation (e.g., from the user information database 130), the conversation history, surround information of the conversations, and/or the real time user feedbacks. In some embodiments, the user interaction engine 140 may be configured to obtain various sensory inputs such as, and without limitation, audio inputs, image inputs, haptic inputs, and/or contextual inputs, process these inputs, formulate an understanding of the human conversant, accordingly generate a response based on such understanding, and control the agent device and/or the user device to carry out the conversation based on the response. As an illustrative example, the user interaction engine 140 may receive audio data representing an utterance from a user operating user device, and generate a response (e.g., text) which may then be delivered to the user in the form of a computer generated utterance as a response to the user. As yet another example, the user interaction engine 140 may also, in response to the utterance, generate one or more instructions that control an agent device to perform a particular action or set of actions.

As illustrated, during a human machine dialogue, a user, as the human conversant in the dialogue, may communicate across the network 120 with an agent device or the user interaction engine 140. Such communication may involve data in multiple modalities such as audio, video, text, etc. Via a user device, a user can send data (e.g., a request, audio signal representing an utterance of the user, or a video of the scene surrounding the user) and/or receive data (e.g., text or audio response from an agent device). In some embodiments, user data in multiple modalities, upon being received by an agent device or the user interaction engine 140, may be analyzed to understand the human user's speech or gesture so that the user's emotion or intent may be estimated and used to determine a response to the user.

Figure 2A:
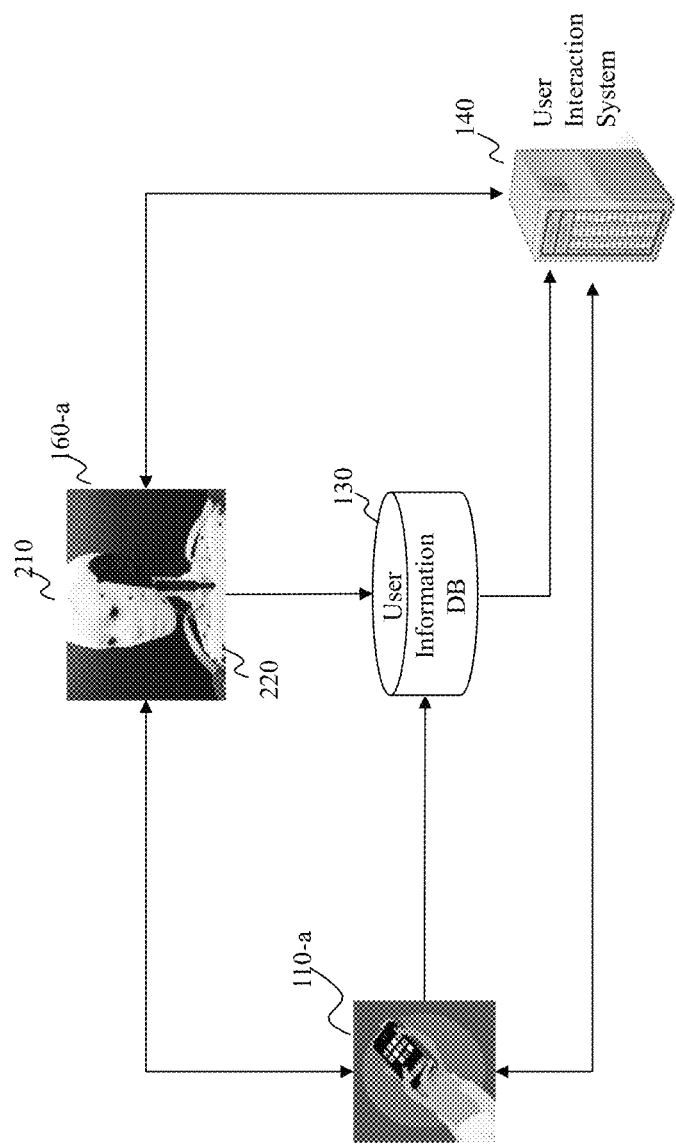
FIGS. 2A-2B depict connections among a user device, an agent device, and a user interaction engine during a dialogue, in accordance with an embodiment of the present teaching.

FIG. 2A depicts specific connections among a user device 110-*a*, an agent device 160-*a*, and the user interaction engine 140 during a dialogue, in accordance with an embodiment of the present teaching. As seen, connections between any two of the parties may all be bi-directional, as discussed herein. The agent device 160-*a* may interface with the user via the user device 110-*a* to conduct a dialogue in a bi-directional communications. On one hand, the agent device 160-*a* may be controlled by the user interaction engine 140 to utter a response to the user operating the user device 110-*a*. On the other hand, inputs from the user site, including, e.g., both the user's utterance or action as well as information about the surrounding of the user, are provided to the agent device via the connections. The agent device 160-*a* may be configured to process such input and dynamically adjust its response to the user. For example, the agent device may be instructed by the user interaction engine 140 to render a tree on the user device. Knowing that the surrounding environment of the user (based on visual information from the user device) shows green trees and lawns, the agent device may customize the tree to be rendered as a lush green tree. If the scene from the user site shows that it is a winter weather, the agent device may control to render the tree on the user device with parameters for a tree that has no leaves. As another example, if the agent device is instructed to render a duck on the user device, the agent device may retrieve information from the user information database 130 on color preference and generate parameters for customizing the duck in a user's preferred color before sending the instruction for the rendering to the user device.

In some embodiments, such inputs from the user's site and processing results thereof may also be transmitted to the user interaction engine 140 for facilitating the user interaction engine 140 to better understand the specific situation associated with the dialogue so that the user interaction engine 140 may determine the state of the dialogue, emotion/mindset of the user, and to generate a response that is based on the specific situation of the dialogue and the intended purpose of the dialogue (e.g., for teaching a child the English vocabulary). For example, if information received from the user device indicates that the user appears to be bored and become impatient, the user interaction engine 140 may determine to change the state of dialogue to a topic that is of interest of the user (e.g., based on the information from the user information database 130) in order to continue to engage the user in the conversation.

In some embodiments, a client running on the user device may be configured to be able to process raw inputs of different modalities acquired from the user site and send the processed information (e.g., relevant features of the raw inputs) to the agent device or the user interaction engine for further processing. This will reduce the amount of data transmitted over the network and enhance the communication efficiency. Similarly, in some embodiments, the agent device may also be configured to be able to process information from the user device and extract useful information for, e.g., customization purposes. Although the user interaction engine 140 may control the state and flow control of the dialogue, making the user interaction engine 140 light weight improves the user interaction engine 140 scale better.

Figure 2B:
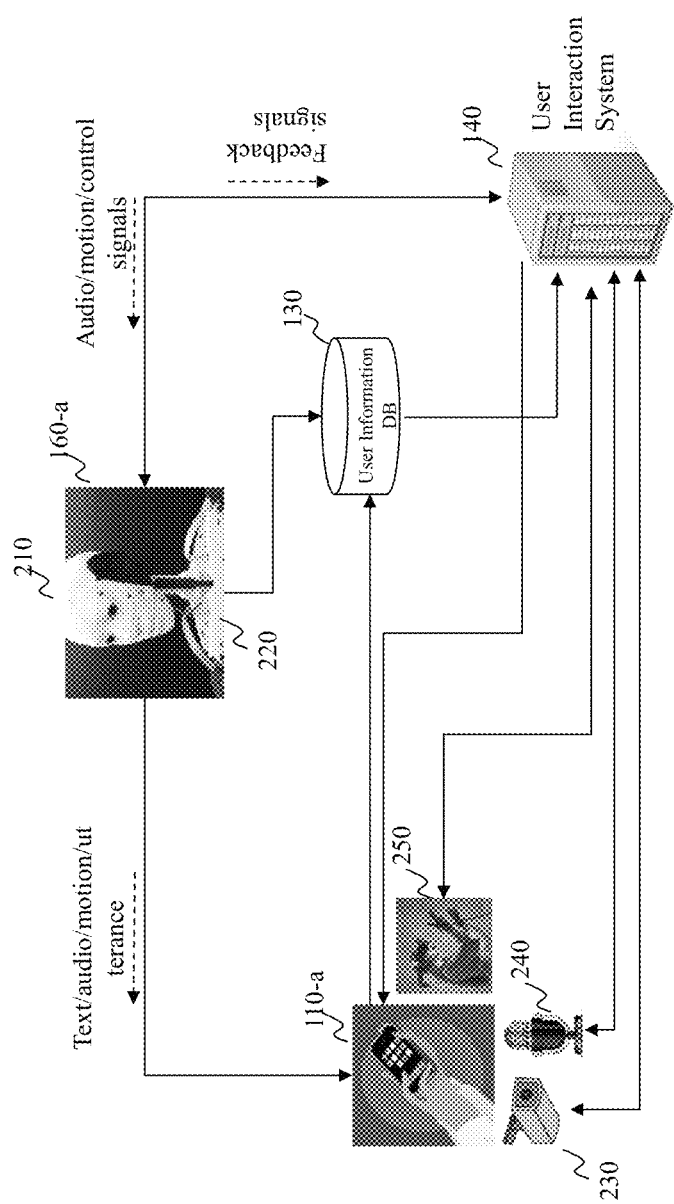

FIG. 2B depicts the same setting as what is presented in FIG. 2A with additional details on the user device 110-*a*. As shown, during a dialogue between the user and the agent 210, the user device 110-*a* may continually collect multi-modal sensor data related to the user and his/her surroundings, which may be analyzed to detect any information related to the dialogue and used to intelligently control the dialogue in an adaptive manner. This may further enhance the user experience or engagement. FIG. 2B illustrates exemplary sensors such as video sensor 230, audio sensor 240, . . . , or haptic sensor 250. The user device may also send textual data as part of the multi-model sensor data. Together, these sensors provide contextual information surrounding the dialogue and can be used for the user interaction engine 140 to understand the situation in order to manage the dialogue. In some embodiment, the multi-modal sensor data may first be processed on the user device and important features in different modalities may be extracted and sent to the user interaction engine 140 so that dialogue may be controlled with an understanding of the context. In some embodiments, the raw multi-modal sensor data may be sent directly to the user interaction engine 140 for processing.

Figure 3A:
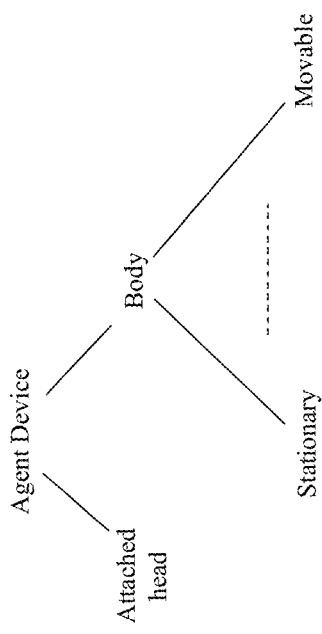
FIG. 3A illustrates an exemplary structure of an agent device with exemplary types of agent body, in accordance with an embodiment of the present teaching.

As seen in FIGS. 2A-2B, the agent device may correspond to a robot that has different parts, including its head 210 and its body 220. Although the agent device as illustrated in FIGS. 2A-2B appears to be a person robot, it may also be constructed in other forms as well, such as a duck, a bear, a rabbit, etc. FIG. 3A illustrates an exemplary structure of an agent device with exemplary types of agent body, in accordance with an embodiment of the present teaching. As presented, an agent device may include a head and a body with the head attached to the body. In some embodiments, the head of an agent device may have additional parts such as face, nose and mouth, some of which may be controlled to, e.g., make movement or expression. In some embodiments, the face on an agent device may correspond to a display screen on which a face can be rendered and the face may be of a person or of an animal. Such displayed face may also be controlled to express emotion.

The body part of an agent device may also correspond to different forms such as a duck, a bear, a rabbit, etc. The body of the agent device may be stationary, movable, or semi-movable. An agent device with stationary body may correspond to a device that can sit on a surface such as a table to conduct face to face conversation with a human user sitting next to the table. An agent device with movable body may correspond to a device that can move around on a surface such as table surface or floor. Such a movable body may include parts that can be kinematically controlled to make physical moves. For example, an agent body may include feet which can be controlled to move in space when needed. In some embodiments, the body of an agent device may be semi-movable, i.e., some parts are movable and some are not. For example, a tail on the body of an agent device with a duck appearance may be movable but the duck cannot move in space. A bear body agent device may also have arms that may be movable but the bear can only sit on a surface.

FIG. 3B illustrates an exemplary agent device or automated companion 160-*a*, in accordance with an embodiment of the present teaching. The automated companion 160-*a* is a device that interacts with people using speech and/or facial expression or physical gestures. For example, the automated companion 160-*a* corresponds to an animatronic peripheral device with different parts, including head portion 310, eye portion (cameras) 320, a mouth portion with laser 325 and a microphone 330, a speaker 340, neck portion with servos 350, one or more magnet or other components that can be used for contactless detection of presence 360, and a body portion corresponding to, e.g., a charge base 370. In operation, the automated companion 160-*a* may be connected to a user device which may include a mobile multi-function device (110-*a*) via network connections. Once connected, the automated companion 160-*a* and the user device interact with each other via, e.g., speech, motion, gestures, and/or via pointing with a laser pointer.

Other exemplary functionalities of the automated companion 160-*a* may include reactive expressions in response to a user's response via, e.g., an interactive video cartoon character (e.g., avatar) displayed on, e.g., a screen as part of a face on the automated companion. The automated companion may use a camera (320) to observe the user's presence, facial expressions, direction of gaze, surroundings, etc. An animatronic embodiment may "look" by pointing its head (310) containing a camera (320), "listen" using its microphone (340), "point" by directing its head (310) that can move via servos (350). In some embodiments, the head of the agent device may also be controlled remotely by a, e.g., the user interaction engine 140 or by a client in a user device (110-*a*), via a laser (325). The exemplary automated companion 160-*a* as shown in FIG. 3B may also be controlled to "speak" via a speaker (330).

Figure 4A:
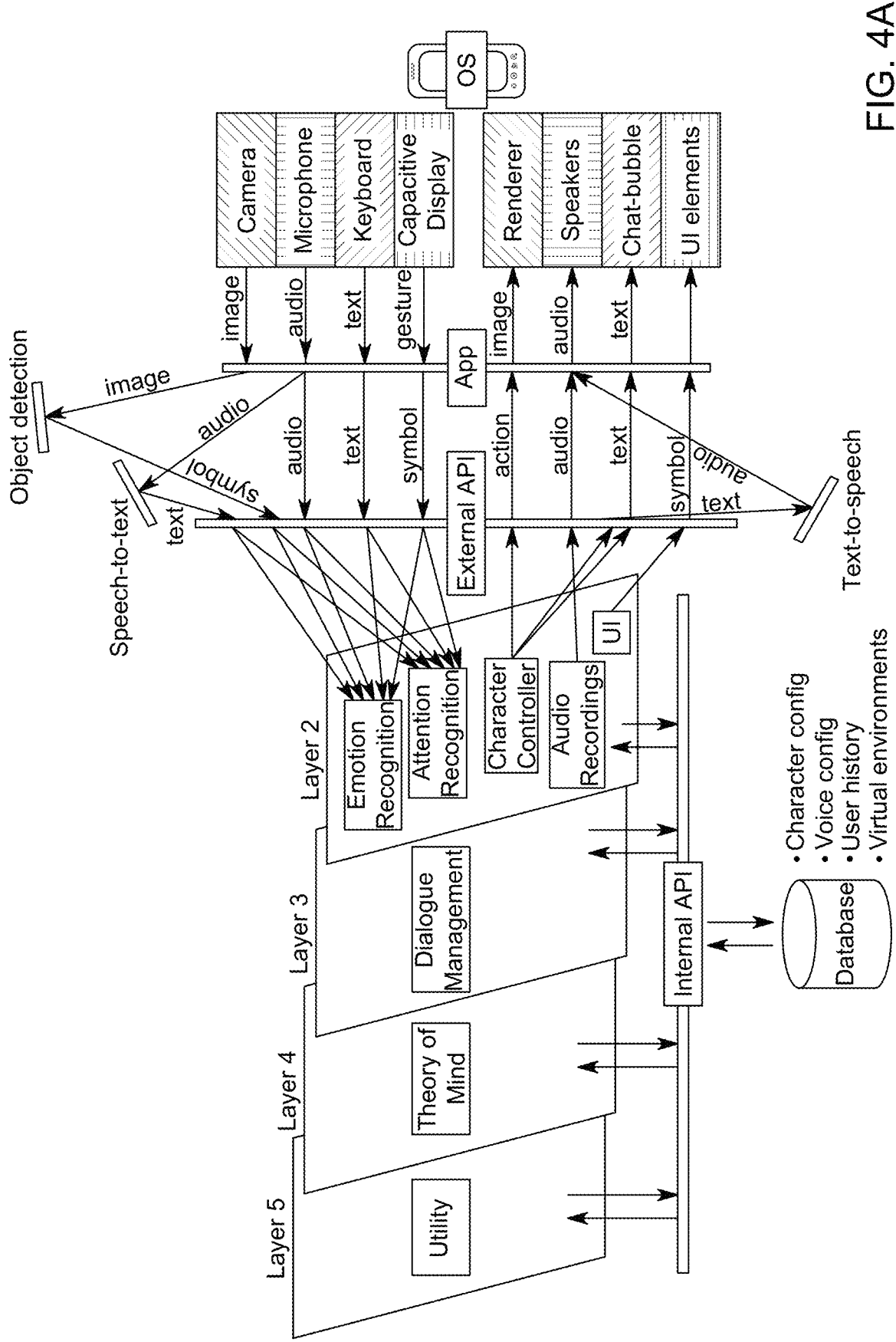
FIG. 4A depicts an exemplary high level system diagram for an overall system for the automated companion, according to various embodiments of the present teaching.

FIG. 4A depicts an exemplary high level system diagram for an overall system for the automated companion, according to various embodiments of the present teaching. In this illustrated embodiment, the overall system may encompass components/function modules residing in a user device, an agent device, and the user interaction engine 140. The overall system as depicted herein comprises a plurality of layers of processing and hierarchies that together carries out human-machine interactions in an intelligent manner. In the illustrated embodiment, there are 5 layers, including layer 1 for front end application as well as front end multi-modal data processing, layer 2 for characterizations of the dialog setting, layer 3 is where the dialog management module resides, layer 4 for estimated mindset of different parties (human, agent, device, etc.), layer 5 for so called utility. Different layers may correspond different levels of processing, ranging from raw data acquisition and processing at layer 1 to layer 5 on processing changing utilities of participants of dialogues.

The term "utility" is hereby defined as preferences of a party identified based on states detected associated with dialogue histories. Utility may be associated with a party in a dialogue, whether the party is a human, the automated companion, or other intelligent devices. A utility for a particular party may represent different states of a world, whether physical, virtual, or even mental. For example, a state may be represented as a particular path along which a dialog walks through in a complex map of the world. At different instances, a current state evolves into a next state based on the interaction between multiple parties. States may also be party dependent, i.e., when different parties participate in an interaction, the states arising from such interaction may vary. A utility associated with a party may be organized as a hierarchy of preferences and such a hierarchy of preferences may evolve over time based on the party's choices made and likings exhibited during conversations. Such preferences, which may be represented as an ordered sequence of choices made out of different options, is what is referred to as utility. The present teaching discloses method and system by which an intelligent automated companion is capable of learning, through a dialogue with a human conversant, the user's utility.

Within the overall system for supporting the automated companion, front end applications as well as front end multi-modal data processing in layer 1 may reside in a user device and/or an agent device. For example, the camera, microphone, keyboard, display, renderer, speakers, chat-bubble, and user interface elements may be components or functional modules of the user device. For instance, there may be an application or client running on the user device which may include the functionalities before an external application interface (API) as shown in FIG. 4A. In some embodiments, the functionalities beyond the external API may be considered as the backend system or reside in the user interaction engine 140. The application running on the user device may take multi-model data (audio, images, video, text) from the sensors or circuitry of the user device, process the multi-modal data to generate text or other types of signals (object such as detected user face, speech understanding result) representing features of the raw multi-modal data, and send to layer 2 of the system.

In layer 1, multi-modal data may be acquired via sensors such as camera, microphone, keyboard, display, speakers, chat bubble, renderer, or other user interface elements. Such multi-modal data may be analyzed to estimated or infer various features that may be used to infer higher level characteristics such as expression, characters, gesture, emotion, action, attention, intent, etc. Such higher level characteristics may be obtained by processing units at layer 2 and the used by components of higher layers, via the internal API as shown in FIG. 4A, to e.g., intelligently infer or estimate additional information related to the dialogue at higher conceptual levels. For example, the estimated emotion, attention, or other characteristics of a participant of a dialogue obtained at layer 2 may be used to estimate the mindset of the participant. In some embodiments, such mindset may also be estimated at layer 4 based on additional information, e.g., recorded surrounding environment or other auxiliary information in such surrounding environment such as sound.

The estimated mindsets of parties, whether related to humans or the automated companion (machine), may be relied on by the dialogue management at layer 3, to determine, e.g., how to carry on a conversation with a human conversant. How each dialogue progresses often represent a human user's preferences. Such preferences may be captured dynamically during the dialogue at utilities (layer 5). As shown in FIG. 4A, utilities at layer 5 represent evolving states that are indicative of parties' evolving preferences, which can also be used by the dialogue management at layer 3 to decide the appropriate or intelligent way to carry on the interaction.

Sharing of information among different layers may be accomplished via APIs. In some embodiments as illustrated in FIG. 4A, information sharing between layer 1 and rest of the layers is via an external API while sharing information among layers 2-5 is via an internal API. It is understood that this merely a design choice and other implementations are also possible to realize the present teaching presented herein. In some embodiments, through the internal API, various layers (2-5) may access information created by or stored at other layers to support the processing. Such information may include common configuration to be applied to a dialogue (e.g., character of the agent device is an avatar, voice preferred, or a virtual environment to be created for the dialogue, etc.), a current state of the dialogue, a current dialogue history, known user preferences, estimated user intent/emotion/mindset, etc. In some embodiments, some information that may be shared via the internal API may be accessed from an external database. For example, certain configurations related to a desired character for the agent device (a duck) may be accessed from, e.g., an open source database, that provide parameters (e.g., parameters to visually render the duck and/or parameters needed to render the speech from the duck).

Figure 4B:
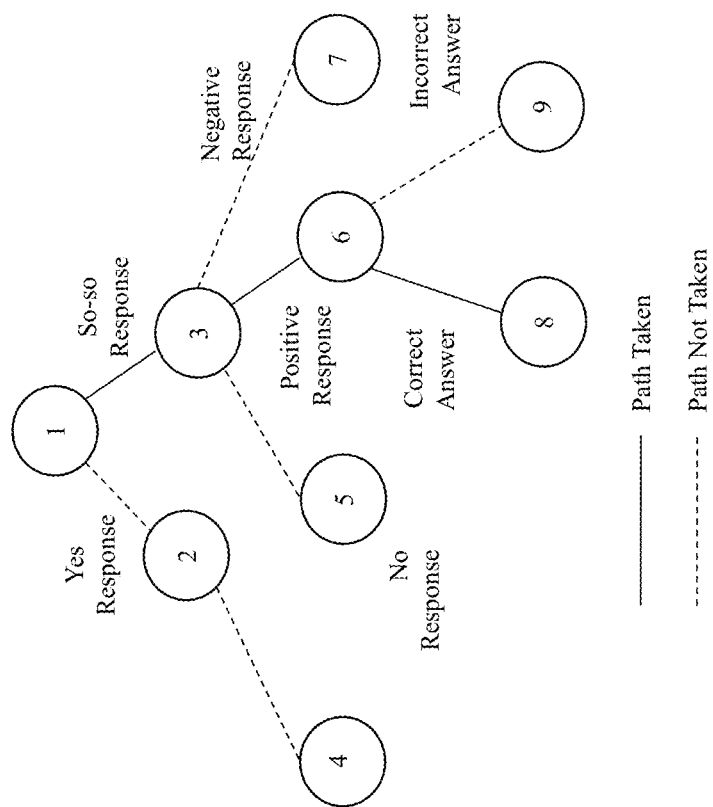
FIG. 4B illustrates a part of a dialogue tree of an on-going dialogue with paths taken based on interactions between the automated companion and a user, according to an embodiment of the present teaching.

FIG. 4B illustrates a part of a dialogue tree of an on-going dialogue with paths taken based on interactions between the automated companion and a user, according to an embodiment of the present teaching. In this illustrated example, the dialogue management at layer 3 (of the automated companion) may predict multiple paths with which a dialogue, or more generally an interaction, with a user may proceed. In this example, each node may represent a point of the current state of the dialogue and each branch from a node may represent possible responses from a user. As shown in this example, at node 1, the automated companion may face with three separate paths which may be taken depending on a response detected from a user. If the user responds with an affirmative response, dialogue tree 400 may proceed from node 1 to node 2. At node 2, a response may be generated for the automated companion in response to the affirmative response from the user and may then be rendered to the user, which may include audio, visual, textual, haptic, or any combination thereof.

If, at node 1, the user responses negatively, the path is for this stage is from node 1 to node 10. If the user responds, at node 1, with a "so-so" response (e.g., not negative but also not positive), dialogue tree 400 may proceed to node 3, at which a response from the automated companion may be rendered and there may be three separate possible responses from the user, "No response," "Positive Response," and "Negative response," corresponding to nodes 5, 6, and 7, respectively. Depending on the user's actual response with respect to the automated companion's response rendered at node 3, the dialogue management at layer 3 may then follow the dialogue accordingly. For instance, if the user responds at node 3 with a positive response, the automated companion moves to respond to the user at node 6. Similarly, depending on the user's reaction to the automated companion's response at node 6, the user may further respond with an answer that is correct. In this case, the dialogue state moves from node 6 to node 8, etc. In this illustrated example, the dialogue state during this period moved from node 1, to node 3, to node 6, and to node 8. The traverse through nodes 1, 3, 6, and 8 forms a path consistent with the underlying conversation between the automated companion and a user. As seen in FIG. 4B, the path representing the dialogue is represented by the solid lines connecting nodes 1, 3, 6, and 8, whereas the paths skipped during a dialogue is represented by the dashed lines.

Figure 4C:
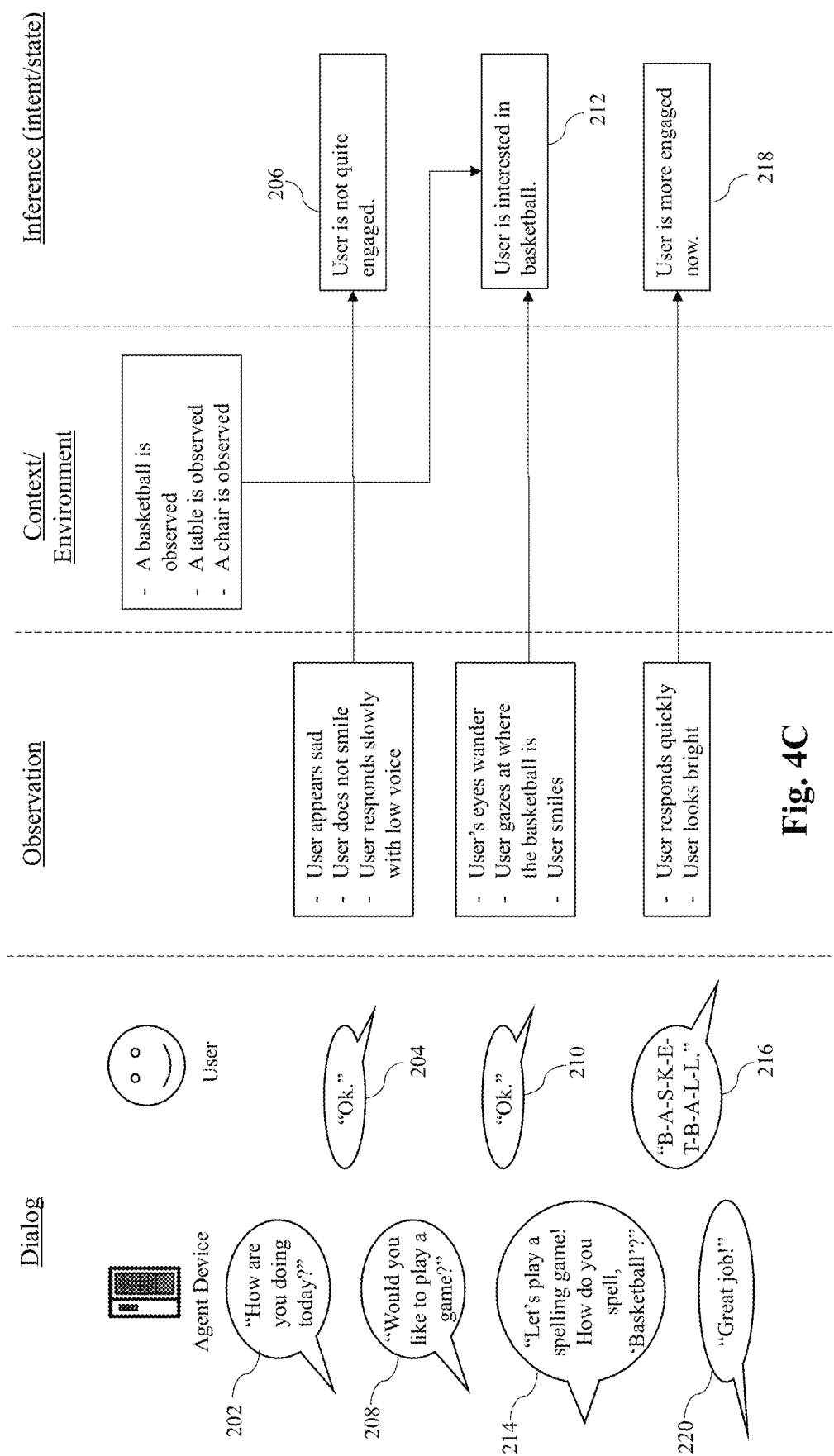
FIG. 4C illustrates exemplary a human-agent device interaction and exemplary processing performed by the automated companion, according to an embodiment of the present teaching.

FIG. 4C illustrates exemplary a human-agent device interaction and exemplary processing performed by the automated companion, according to an embodiment of the present teaching. As seen from FIG. 4C, operations at different layers may be conducted and together they facilitate intelligent dialogue in a cooperated manner. In the illustrated example, an agent device may first ask a user "How are you doing today?" at 402 to initiate a conversation. In response to utterance at 402, the user may respond with utterance "Ok" at 404. To manage the dialogue, the automated companion may activate different sensors during the dialogue to make observation of the user and the surrounding environment. For example, the agent device may acquire multi-modal data about the surrounding environment where the user is in. Such multi-modal data may include audio, visual, or text data. For example, visual data may capture the facial expression of the user. The visual data may also reveal contextual information surrounding the scene of the conversation. For instance, a picture of the scene may reveal that there is a basketball, a table, and a chair, which provides information about the environment and may be leveraged in dialogue management to enhance engagement of the user. Audio data may capture not only the speech response of the user but also other peripheral information such as the tone of the response, the manner by which the user utters the response, or the accent of the user.

Based on acquired multi-modal data, analysis may be performed by the automated companion (e.g., by the front end user device or by the backend user interaction engine 140) to assess the attitude, emotion, mindset, and utility of the users. For example, based on visual data analysis, the automated companion may detect that the user appears sad, not smiling, the user's speech is slow with a low voice. The characterization of the user's states in the dialogue may be performed at layer 2 based on multi-model data acquired at layer 1. Based on such detected observations, the automated companion may infer (at 406) that the user is not that interested in the current topic and not that engaged. Such inference of emotion or mental state of the user may, for instance, be performed at layer 4 based on characterization of the multi-modal data associated with the user.

To respond to the user's current state (not engaged), the automated companion may determine to perk up the user in order to better engage the user. In this illustrated example, the automated companion may leverage what is available in the conversation environment by uttering a question to the user at 408: "Would you like to play a game?" Such a question may be delivered in an audio form as speech by converting text to speech, e.g., using customized voices individualized for the user. In this case, the user may respond by uttering, at 410, "Ok." Based on the continuously acquired multi-model data related to the user, it may be observed, e.g., via processing at layer 2, that in response to the invitation to play a game, the user's eyes appear to be wandering, and in particular that the user's eyes may gaze towards where the basketball is located. At the same time, the automated companion may also observe that, once hearing the suggestion to play a game, the user's facial expression changes from "sad" to "smiling." Based on such observed characteristics of the user, the automated companion may infer, at 412, that the user is interested in basketball.

Based on the acquired new information and the inference based on that, the automated companion may decide to leverage the basketball available in the environment to make the dialogue more engaging for the user yet still achieving the educational goal for the user. In this case, the dialogue management at layer 3 may adapt the conversion to talk about a game and leverage the observation that the user gazed at the basketball in the room to make the dialogue more interesting to the user yet still achieving the goal of, e.g., educating the user. In one example embodiment, the automated companion generates a response, suggesting the user to play a spelling game" (at 414) and asking the user to spell the word "basketball."

Given the adaptive dialogue strategy of the automated companion in light of the observations of the user and the environment, the user may respond providing the spelling of word "basketball." (at 416). Observations are continuously made as to how enthusiastic the user is in answering the spelling question. If the user appears to respond quickly with a brighter attitude, determined based on, e.g., multi-modal data acquired when the user is answering the spelling question, the automated companion may infer, at 418, that the user is now more engaged. To further encourage the user to actively participate in the dialogue, the automated companion may then generate a positive response "Great job!" with instruction to deliver this response in a bright, encouraging, and positive voice to the user.

Figure 5:
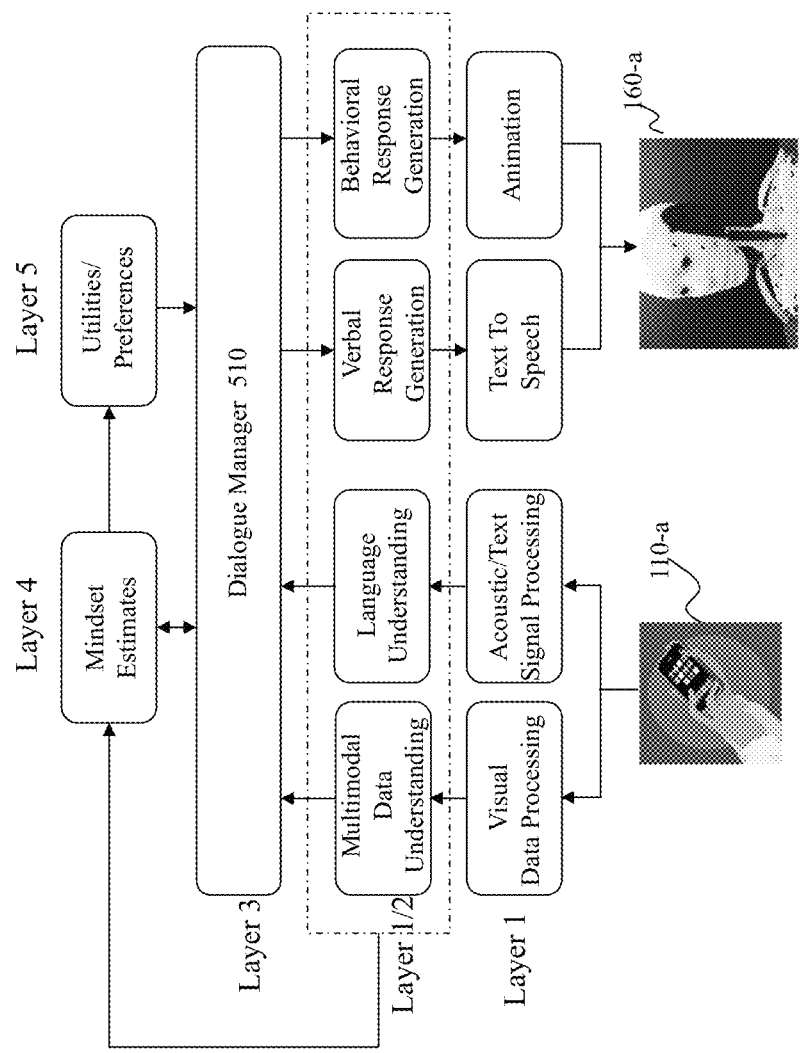
FIG. 5 illustrates exemplary multiple layer processing and communications among different processing layers of an automated dialogue companion, according to an embodiment of the present teaching.

FIG. 5 illustrates exemplary communications among different processing layers of an automated dialogue companion centered around a dialogue manager 510, according to various embodiments of the present teaching. The dialogue manager 510 in FIG. 5 corresponds to a functional component of the dialogue management at layer 3. A dialog manager is an important part of the automated companion and it manages dialogues. Traditionally, a dialogue manager takes in as input a user's utterances and determine how to respond to the user. This is performed without taking into account the user's preferences, user's mindset/emotions/intent, or surrounding environment of the dialogue, i.e., given any weights to the different available states of the relevant world. The lack of an understanding of the surrounding world often limits the perceived authenticity of or engagement in the conversations between a human user and an intelligent agents.

In some embodiments of the present teaching, the utility of parties of a conversation relevant to an on-going dialogue is exploited to allow a more personalized, flexible, and engaging conversion to be carried out. It facilitates an intelligent agent acting in different roles to become more effective in different tasks, e.g., scheduling appointments, booking travel, ordering equipment and supplies, and researching online on various topics. When an intelligent agent is aware of a user's dynamic mindset, emotions, intent, and/or utility, it enables the agent to engage a human conversant in the dialogue in a more targeted and effective way. For example, when an education agent teaches a child, the preferences of the child (e.g., color he loves), the emotion observed (e.g., sometimes the child does not feel like continue the lesson), the intent (e.g., the child is reaching out to a ball on the floor instead of focusing on the lesson) may all permit the education agent to flexibly adjust the focus subject to toys and possibly the manner by which to continue the conversation with the child so that the child may be given a break in order to achieve the overall goal of educating the child.

As another example, the present teaching may be used to enhance a customer service agent in its service by asking questions that are more appropriate given what is observed in real-time from the user and hence achieving improved user experience. This is rooted in the essential aspects of the present teaching as disclosed herein by developing the means and methods to learn and adapt preferences or mindsets of parties participating in a dialogue so that the dialogue can be conducted in a more engaging manner.

Dialogue manager (DM) 510 is a core component of the automated companion. As shown in FIG. 5, DM 510 (layer 3) takes input from different layers, including input from layer 2 as well as input from higher levels of abstraction such as layer 4 for estimating mindsets of parties involved in a dialogue and layer 5 that learns utilities/preferences based on dialogues and assessed performances thereof. As illustrated, at layer 1, multi-modal information is acquired from sensors in different modalities which is processed to, e.g., obtain features that characterize the data. This may include signal processing in visual, acoustic, and textual modalities.

Such multi-modal information may be acquired by sensors deployed on a user device, e.g., 110-a during the dialogue. The acquired multi-modal information may be related to the user operating the user device 110-a and/or the surrounding of the dialogue scene. In some embodiments, the multi-model information may also be acquired by an agent device, e.g., 160-a, during the dialogue. In some embodiments, sensors on both the user device and the agent device may acquire relevant information. In some embodiments, the acquired multi-model information is processed at Layer 1, as shown in FIG. 5, which may include both a user device and an agent device. Depending on the situation and configuration, Layer 1 processing on each device may differ. For instance, if a user device 110-a is used to acquire surround information of a dialogue, including both information about the user and the environment around the user, raw input data (e.g., text, visual, or audio) may be processed on the user device and then the processed features may then be sent to Layer 2 for further analysis (at a higher level of abstraction). If some of the multi-modal information about the user and the dialogue environment is acquired by an agent device, the processing of such acquired raw data may also be processed by the agent device (not shown in FIG. 5) and then features extracted from such raw data may then be sent from the agent device to Layer 2 (which may be located in the user interaction engine 140).

Layer 1 also handles information rendering of a response from the automated dialogue companion to a user. In some embodiments, the rendering is performed by an agent device, e.g., 160-a and examples of such rendering include speech, expression which may be facial or physical acts performed. For instance, an agent device may render a text string received from the user interaction engine 140 (as a response to the user) to speech so that the agent device may utter the response to the user. In some embodiments, the text string may be sent to the agent device with additional rendering instructions such as volume, tone, pitch, etc. which may be used to convert the text string into a sound wave corresponding to an utterance of the content in a certain manner. In some embodiments, a response to be delivered to a user may also include animation, e.g., utter a response with an attitude which may be delivered via, e.g., a facial expression or a physical act such as raising one arm, etc. In some embodiments, the agent may be implemented as an application on a user device. In this situation, rendering of a response from the automated dialogue companion is implemented via the user device, e.g., 110-a (not shown in FIG. 5).

Processed features of the multi-modal data may be further processed at layer 2 to achieve language understanding and/or multi-modal data understanding including visual, textual, and any combination thereof. Some of such understanding may be directed to a single modality, such as speech understanding, and some may be directed to an understanding of the surrounding of the user engaging in a dialogue based on integrated information. Such understanding may be physical (e.g., recognize certain objects in the scene), perceivable (e.g., recognize what the user said, or certain significant sound, etc.), or mental (e.g., certain emotion such as stress of the user estimated based on, e.g., the tune of the speech, a facial expression, or a gesture of the user).

The multimodal data understanding generated at layer 2 may be used by DM 510 to determine how to respond. To enhance engagement and user experience, the DM 510 may also determine a response based on the estimated mindsets of the user and of the agent from layer 4 as well as the utilities of the user engaged in the dialogue from layer 5. The mindsets of the parties involved in a dialogue may be estimated based on information from Layer 2 (e.g., estimated emotion of a user) and the progress of the dialogue. In some embodiments, the mindsets of a user and of an agent may be estimated dynamically during the course of a dialogue and such estimated mindsets may then be used to learn, together with other data, utilities of users. The learned utilities represent preferences of users in different dialogue scenarios and are estimated based on historic dialogues and the outcomes thereof.

In each dialogue of a certain topic, the dialogue manager 510 bases its control of the dialogue on relevant dialogue tree(s) that may or may not be associated with the topic (e.g., may inject small talks to enhance engagement). To generate a response to a user in a dialogue, the dialogue manager 510 may also consider additional information such as a state of the user, the surrounding of the dialogue scene, the emotion of the user, the estimated mindsets of the user and the agent, and the known preferences of the user (utilities).

An output of DM 510 corresponds to an accordingly determined response to the user. To deliver a response to the user, the DM 510 may also formulate a way that the response is to be delivered. The form in which the response is to be delivered may be determined based on information from multiple sources, e.g., the user's emotion (e.g., if the user is a child who is not happy, the response may be rendered in a gentle voice), the user's utility (e.g., the user may prefer speech in certain accent similar to his parents'), or the surrounding environment that the user is in (e.g., noisy place so that the response needs to be delivered in a high volume). DM 510 may output the response determined together with such delivery parameters.

In some embodiments, the delivery of such determined response is achieved by generating the deliverable form(s) of each response in accordance with various parameters associated with the response. In a general case, a response is delivered in the form of speech in some natural language. A response may also be delivered in speech coupled with a particular nonverbal expression as a part of the delivered response, such as a nod, a shake of the head, a blink of the eyes, or a shrug. There may be other forms of deliverable form of a response that is acoustic but not verbal, e.g., a whistle.

To deliver a response, a deliverable form of the response may be generated via, e.g., verbal response generation and/or behavior response generation, as depicted in FIG. 5. Such a responses in its determined deliverable form(s) may then be used by a renderer to actual render the response in its intended form(s). For a deliverable form in a natural language, the text of the response may be used to synthesize a speech signal via, e.g., text to speech techniques, in accordance with the delivery parameters (e.g., volume, accent, style, etc.). For any response or part thereof, that is to be delivered in a non-verbal form(s), e.g., with a certain expression, the intended non-verbal expression may be translated into, e.g., via animation, control signals that can be used to control certain parts of the agent device (physical representation of the automated companion) to perform certain mechanical movement to deliver the non-verbal expression of the response, e.g., nodding head, shrug shoulders, or whistle. In some embodiments, to deliver a response, certain software components may be invoked to render a different facial expression of the agent device. Such rendition(s) of the response may also be simultaneously carried out by the agent (e.g., speak a response with a joking voice and with a big smile on the face of the agent).

Figure 6:
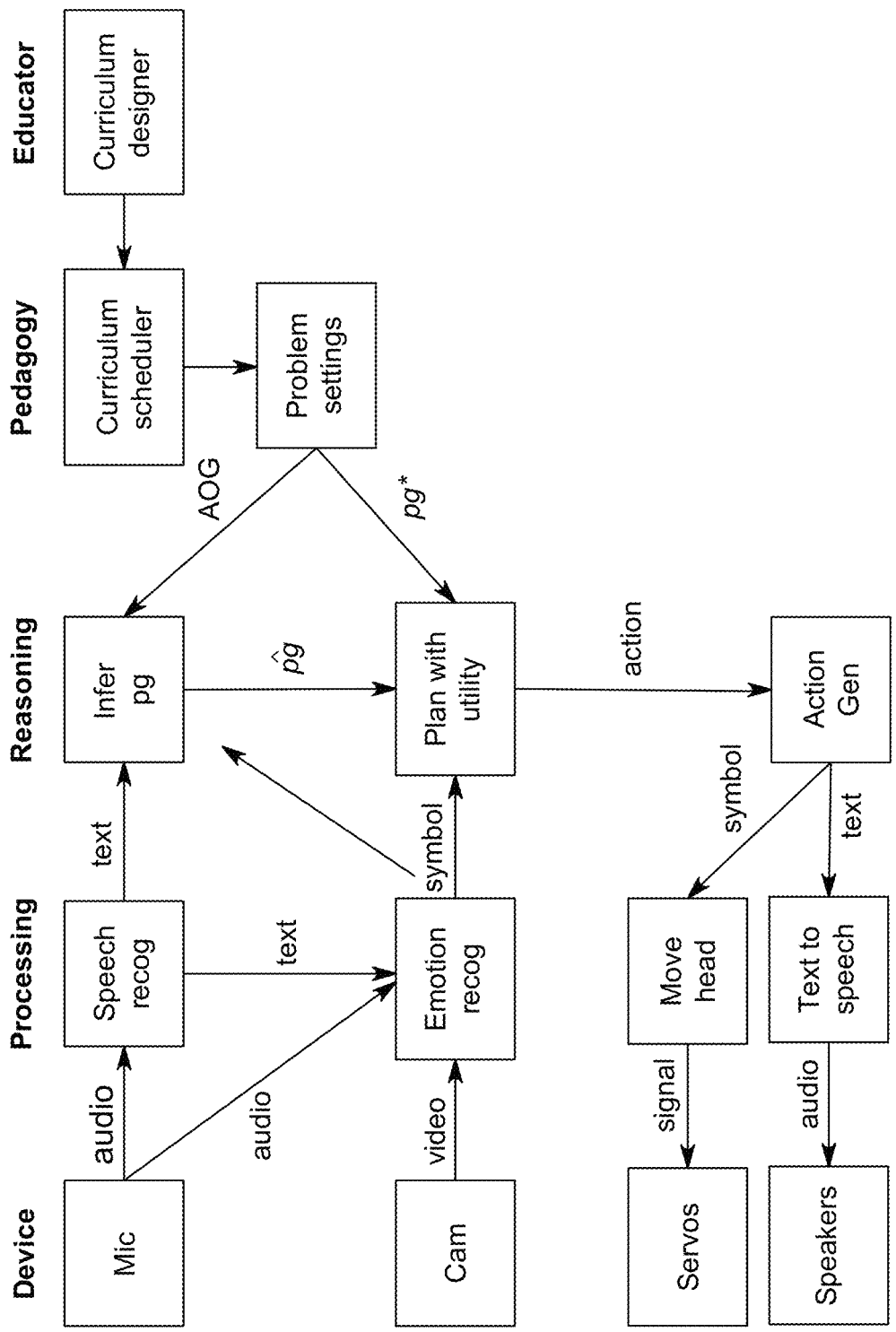
FIG. 6 depicts an exemplary high level system framework for an artificial intelligence based educational companion, according to an embodiment of the present teaching.

FIG. 6 depicts an exemplary high level system diagram for an artificial intelligence based educational companion, according to various embodiments of the present teaching. In this illustrated embodiment, there are five levels of processing, namely device level, processing level, reasoning level, pedagogy or teaching level, and educator level. The device level comprising sensors such as microphone and camera or media delivery devices such as servos to move, e.g., body parts of a robot or speakers to deliver dialogue content. The processing level comprises various processing components directed to processing of different types of signals, which include both input and output signals.

On the input side, the processing level may include speech processing module for performing, e.g., speech recognition based on audio signal obtained from an audio sensor (microphone) to understand what is being uttered in order to determine how to respond. The audio signal may also be recognized to generate text information for further analysis. The audio signal from the audio sensor may also be used by an emotion recognition processing module. The emotion recognition module may be designed to recognize various emotions of a party based on both visual information from a camera and the synchronized audio information. For instance, a happy emotion may often be accompanied with a smile face and a certain acoustic cues. The text information obtained via speech recognition may also be used by the emotion recognition module, as a part of the indication of the emotion, to estimate the emotion involved.

On the output side of the processing level, when a certain response strategy is determined, such strategy may be translated into specific actions to take by the automated companion to respond to the other party. Such action may be carried out by either deliver some audio response or express certain emotion or attitude via certain gesture. When the response is to be delivered in audio, text with words that need to be spoken are processed by a text to speech module to produce audio signals and such audio signals are then sent to the speakers to render the speech as a response. In some embodiments, the speech generated based on text may be performed in accordance with other parameters, e.g., that may be used to control to generate the speech with certain tones or voices. If the response is to be delivered as a physical action, such as a body movement realized on the automated companion, the actions to be taken may also be instructions to be used to generate such body movement. For example, the processing level may include a module for moving the head (e.g., nodding, shaking, or other movement of the head) of the automated companion in accordance with some instruction (symbol). To follow the instruction to move the head, the module for moving the head may generate electrical signal, based on the instruction, and send to servos to physically control the head movement.

The third level is the reasoning level, which is used to perform high level reasoning based on analyzed sensor data. Text from speech recognition, or estimated emotion (or other characterization) may be sent to an inference program which may operate to infer various high level concepts such as intent, mindset, preferences based on information received from the second level. The inferred high level concepts may then be used by a utility based planning module that devises a plan to respond in a dialogue given the teaching plans defined at the pedagogy level and the current state of the user. The planned response may then be translated into an action to be performed to deliver the planned response. The action is then further processed by an action generator to specifically direct to different media platform to carry out the intelligent response.

The pedagogy and educator levels both related to the educational application as disclosed. The educator level includes activities related to designing curriculums for different subject matters. Based on designed curriculum, the pedagogy level includes a curriculum scheduler that schedules courses based on the designed curriculum and based on the curriculum schedule, the problem settings module may arrange certain problems settings be offered based on the specific curriculum schedule. Such problem settings may be used by the modules at the reasoning level to assist to infer the reactions of the users and then plan the response accordingly based on utility and inferred state of mind.

According to the present teaching, in order to keep a user engaged, the automated dialogue companion is implemented to understand the dialogue scene so that the dialogue may be managed in a more relevant, adaptive, and personalized manner. In some configurations, the automated dialogue companion is configured to understand the dialogue environment in order to improve its ability to adapt its conversation with a user. For example, the automated dialogue companion may be configured to detect objects present in the scene, estimate how such objects are arranged in the dialogue scene, classify the type of a dialogue scene (e.g., office or park), or detect what object(s) a user seems to be interested in. Such understanding of the surrounding may facilitate the automated dialogue companion to determine what to say to a user or how to change the subject of the dialogue using what is available in the dialogue scene, etc. In some embodiments, based on what is observed in a dialogue scene, e.g., movement of a user, the automated dialogue companion may render what is observed, e.g., in real time, in the application that the user is interacting with to enhance the affinity that the user senses with the automated dialogue companion.

Figure 7:
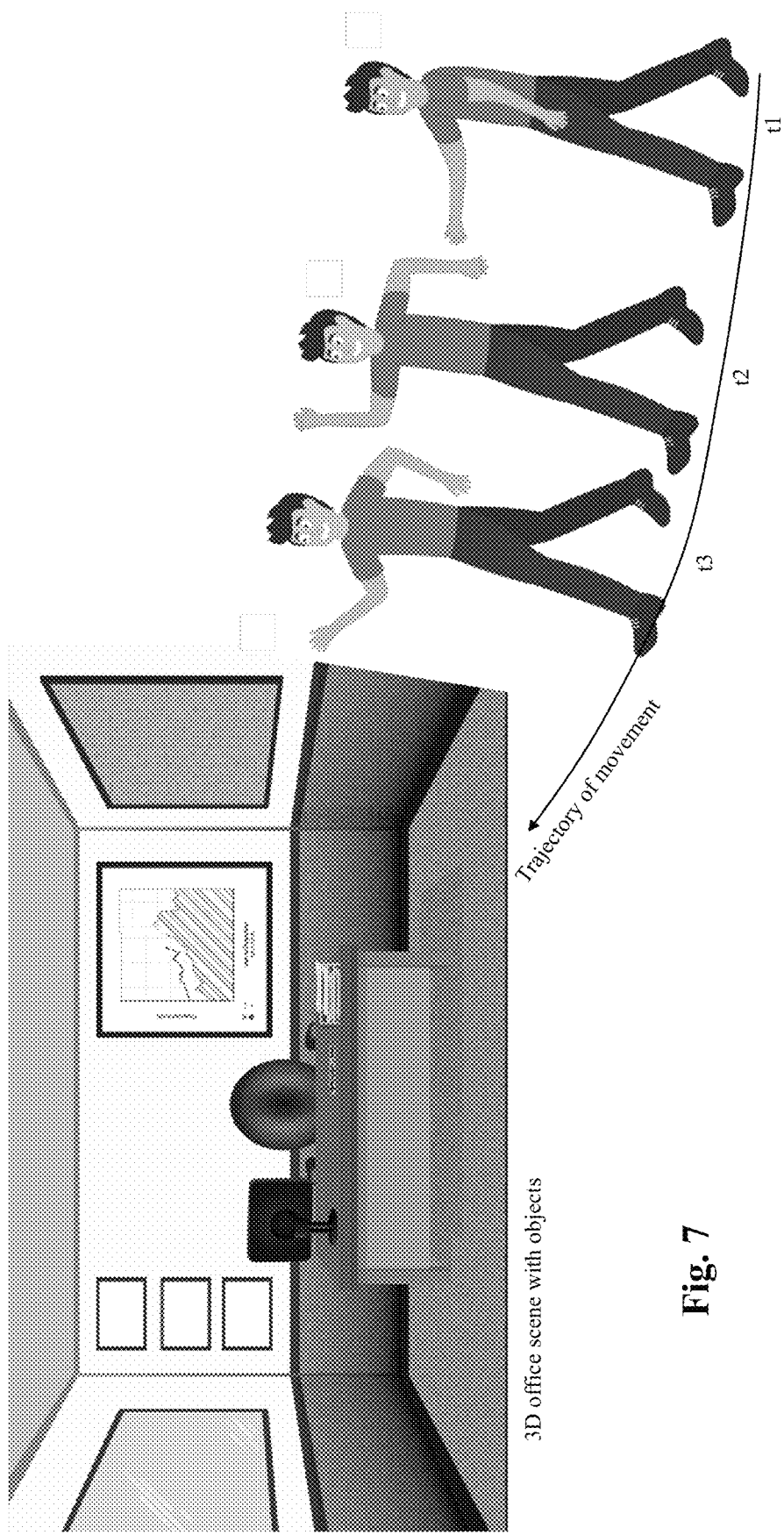
FIG. 7 depicts an exemplary dialogue scene, according to an embodiment of the present teaching.

FIG. 7 depicts an exemplary dialogue scene, according to an embodiment of the present teaching. As illustrated, the dialogue scene is an office and a user is walking in the scene towards the desk, at different time instances (t1, t2, . . . , t3), a trajectory or path. The office scene is signified by observations of different objects spatially configured in certain ways. For instance, observed objects in the scene include walls, hanging things on the walls (pictured, posters), a door, a window, a desk, a chair, a computer screen, some stationaries on the desk. These observed objects are also observed to be spatially arranged in a certain configuration, e.g., the chair is spatially adjacent to the desk and the computer screen is placed on top of the desk, etc. Such spatial configurations may be representative of an office or a place where a person can work.

By observing a user in the dialogue scene, various types of information may be inferred. For instance, if the user is detected smiling, it may be inferred that the user is happy or in a good mood. If the user is observed quiet and speaks in a harsh tone, it may be inferred that the user is unhappy or frustrated. Such detected emotions are relevant in terms of understanding the user in order to appropriately conduct the dialogues. In addition to the emotional states of the user, it may also be important to observe activities of the user, such as the motion of the user, to further infer relevant emotions of intent. For example, if the user looks happy while walking towards the desk, it may be estimated that the user intends to either get something in the office or is interested in starting to work. To distinguish that, further observations may be made, e.g., the gazing direction of the user may be detected to estimate the intent of the user. If the user is observed to gaze at the window, it may be estimated that the user currently does not intend to work.

In some embodiments, the movement of a user observed may also be used to infer how the 3D space is constructed. For example, by tracking a user moving around in a dialogue scene, the unoccupied 3D space may be inferred. Together with the information about detected objects in the space, the dialogue scene may be more accurately constructed or rendered. For instance, in some settings, in order to enhance user machine interactions, objects present in the scene as well as dynamic user's activities observed in the scene may be rendered on a display screen of a device operated by the user. In this case, the occupied and unoccupied 3D space may be estimated based on what is observed so that the observed objects and user activities may be rendered appropriately on the display screen.

Figure 8:
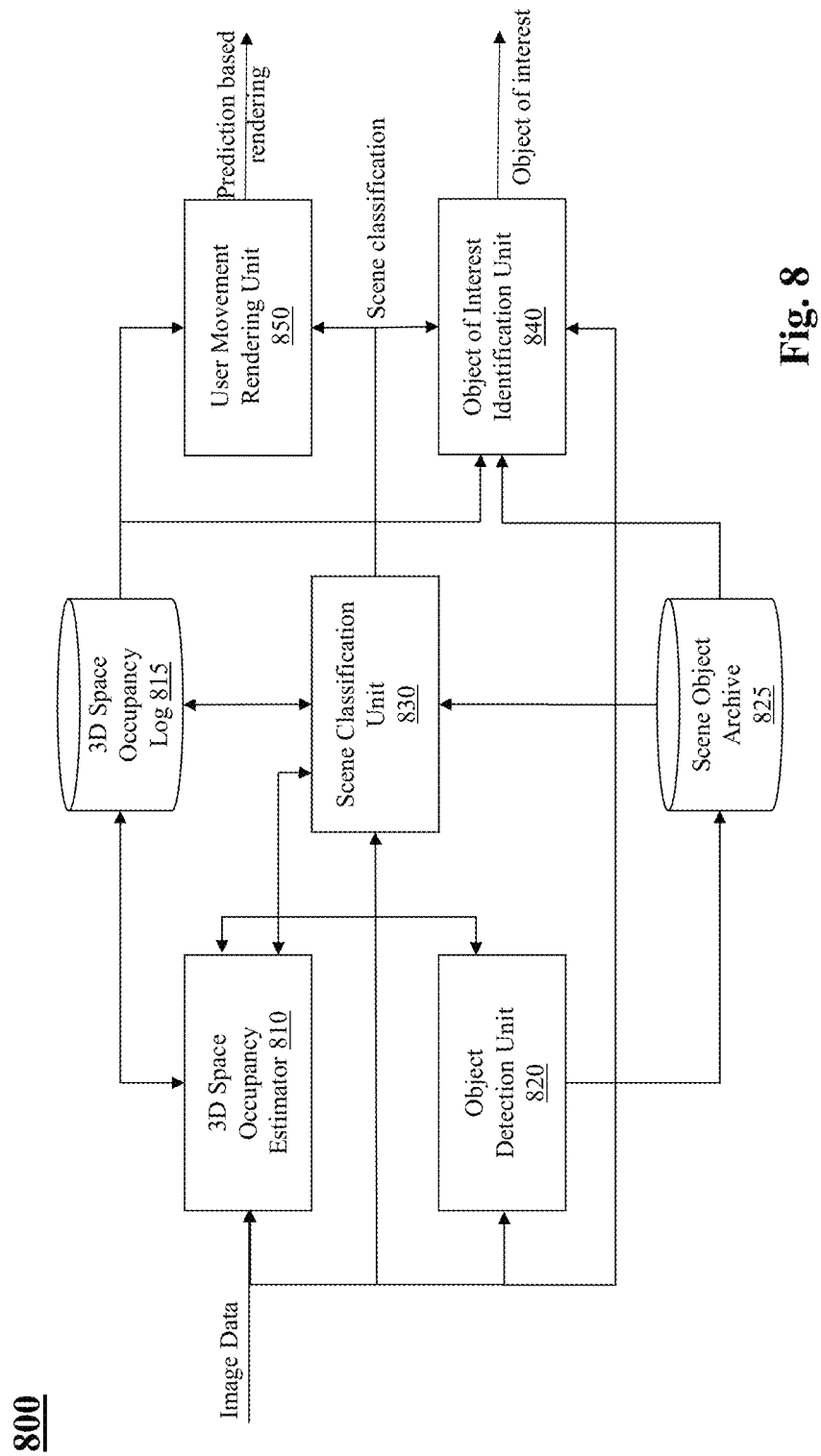
FIG. 8 depicts an exemplary framework for understanding a dialogue scene based on visual information to facilitate a user machine dialogue, according to an embodiment of the present teaching.

FIG. 8 depicts an exemplary framework 800 for understanding a dialogue scene based on visual information to facilitate a user machine dialogue, according to an embodiment of the present teaching. In this illustrated embodiment, framework 800 comprises an object detection unit 820, a 3D space occupancy estimator 810, a scene classification unit 830, an object of interest identification unit 840, and a user movement rendering unit 850. The object detection unit 820 is configured for recognizing objects present in a dialogue scene based on input image data and populating the recognized objects in a scene object archive 825 with various characterizing features thereof. The 3D space occupancy estimator 810 is provided for estimating 3D space occupancy based on input image data and archiving, in 3D space occupancy log 815, the space configuration information (which may include identify both unoccupied and occupied 3D spaces). In some embodiments, the detection of 3D space occupancy may rely on, e.g., information related to detected objects present in the dialogue scene (from the object detection unit 820) and information related to detected user(s) and movement thereof (from the 3D space occupancy estimator 810). Details related to estimating 3D space occupancy based on user tracking are provided with reference to FIGS. 10A-10D.

The scene classification unit 830 is provided to recognize a type of a dialogue scene (e.g., office, park, store) based on objects detected by the object detection unit 820 and a scene context-free grammar, as well as to update the 3D space occupancy log in 815 based on such detected objects and their spatial relationships. Details related to scene classification will be discussed in detail with reference to FIGS. 11A to 12C. In some dialogue settings, the focus of a user engaging in a dialogue with the automated dialogue companion may be detected to facilitate adaptive dialogue management. For instance, detecting object(s) of interest with respect to a user may be carried out based on gazing direction of the user over time. As another example, shared object of interest of different users (e.g., multiple users focus on a basketball in a dialogue scene) may also be detected by detecting gazing directions of such different users. This is achieved by the object of interest identification unit 840. Details related thereto will be provided with respect to FIGS. 13A-16B. As discussed herein, in some user machine interaction settings, what is happening in a dialogue scene, including objects present in the scene and users roaming around in the dialogue scene, is rendered in an interface on a device that a user is operating. To facilitate rendering of a moving user in real time, the user movement rendering unit 850 accesses 3D space occupancy log 815 and renders, based on sparse samples, a moving user based on motion predicted from such sparse samples and real time corrections. Details related to this aspect of the present teaching will be provided with respect to FIGS. 17-21.

Figure 9A:
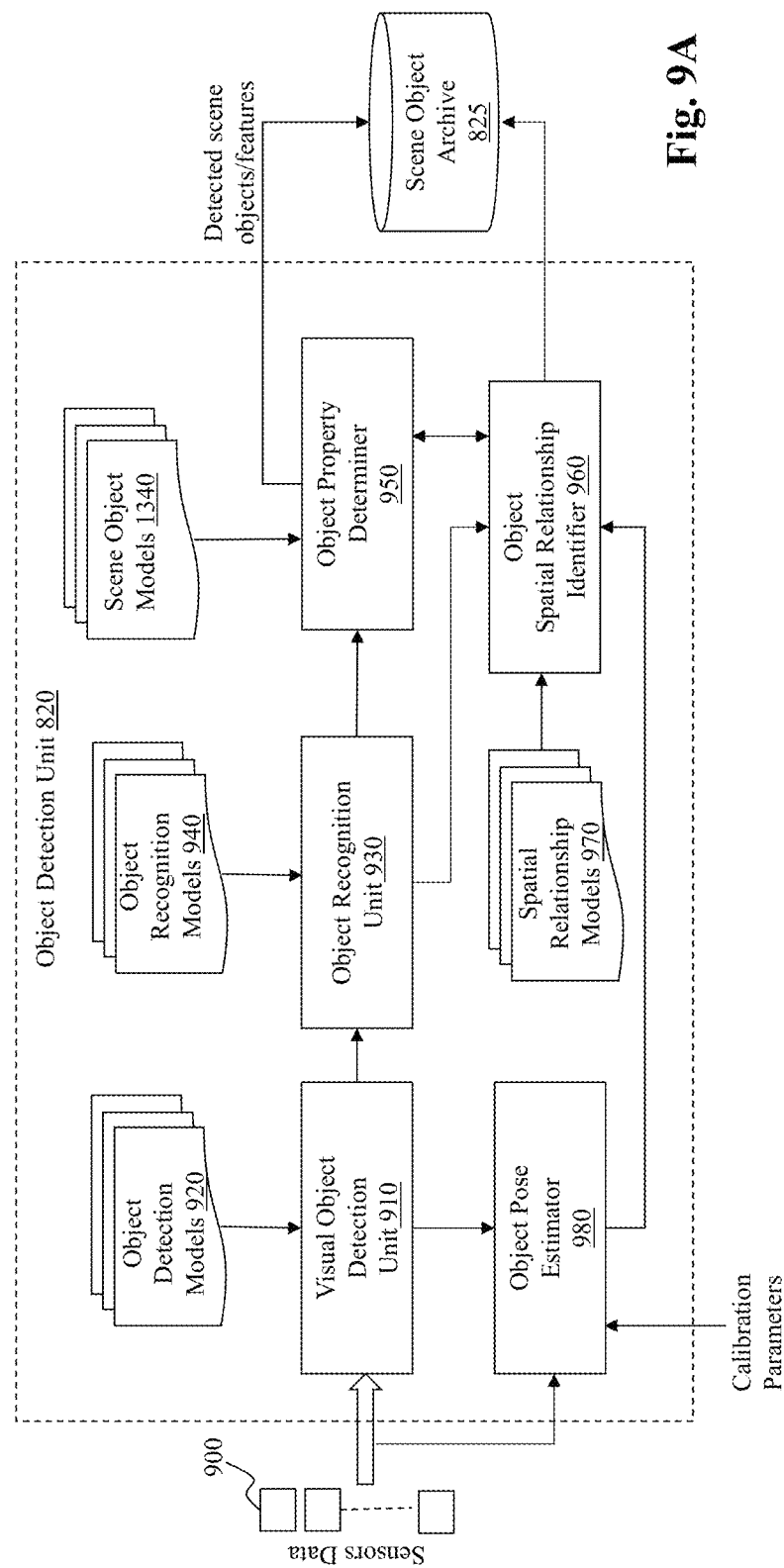
FIG. 9A depicts an exemplary system diagram for object detection/tracking in a dialogue scene, according to an embodiment of the present teaching.

FIG. 9A depicts an exemplary system diagram of the object detection unit 820, according to an embodiment of the present teaching. As discussed herein, the object detection unit 820 is to detect and track objects present in a dialogue scene and create a representation of the object configuration in the 3D dialogue scene. Such a representation may then be used by other components in the framework 800 to, e.g., determine 3D space occupancy and/or object(s) of interest of the users in the dialogue scene. In this illustrated embodiment, the object detection unit 820 comprises a visual object detection unit 910, an object recognition unit 930, an object pose estimator 980, an object spatial relationship identifier 960, and an object property determine 950.

FIG. 9B is a flowchart of an exemplary process of the object detection unit 820, according to an embodiment of the present teaching. In operation, the object detection unit 820 receives, at 915, visual input data acquired from a dialogue scene from one or more sensors 900 and detects, at 925, object(s) present in the dialogue scene from such visual input data. Such detection may be detected in accordance with one or more object detection models 920. In some embodiments, the sensors 900 may be distributed in the dialogue scene and may have been calibrated. Some of the sensors may be deployed to capture images of the scene and some may be deployed to capture depth information of the scene. Image data and depth data may be combined for object detection. For instance, based on depth information, an object may be detected when it has continuous depths. Such a detected object may also be verified as to the consistency in color or texture of the object. The vice versa may be applicable as well. Objects detected using visual cues such as color or texture may be verified based on depth information.

For objects detected in each frame, the object recognition unit 930 may further recognizes, at 935, each of the detected objects based on, e.g., object recognition models 940. For instance, if an object is detected based on consistency in color (e.g., a chair in the scene), to recognize the object detected may further rely on specific object models, e.g., a chair should have a relatively flat surface and supporting legs. Certain features associated with each of the detected object may also be determined such as the pose (e.g. depth), dimension, and other visual features of each detected object may be estimated. The object pose estimator 980 may determine, at 945, the depth and other positional information associated with each object based on, e.g., depth information of the region in an image where the object is detected. Such depth information may be received directly from a sensor, e.g., a LiDar sensor that acquires depth of each pixel, or obtained based on stereo using multiple cameras. In some embodiments, in order to determine 3D pose of an object, the object pose estimator 980 may also utilize calibration parameters to map an object detected in an 2D image to a 3D coordinate system in accordance with the calibration parameters.

On the other hand, the object property determiner 950 may also determine other features or properties associated with each detected object. Such features may include dimension of an object, color of the object, or composition of the object. Based on the detected properties of each of the objects (pose, dimension, etc.), the spatial relationship identifier 960 may then determine, at 955, the spatial relationship among such detected objects. The detected objects, their corresponding properties, as well as their spatial relationships may then be archived, at 965, in a scene object archive 825 as a representation of the dialogue scene. Such a representation of a dialogue scene may be utilized by other components in framework 800 for managing the underlying dialogue accordingly.

Figure 10A:
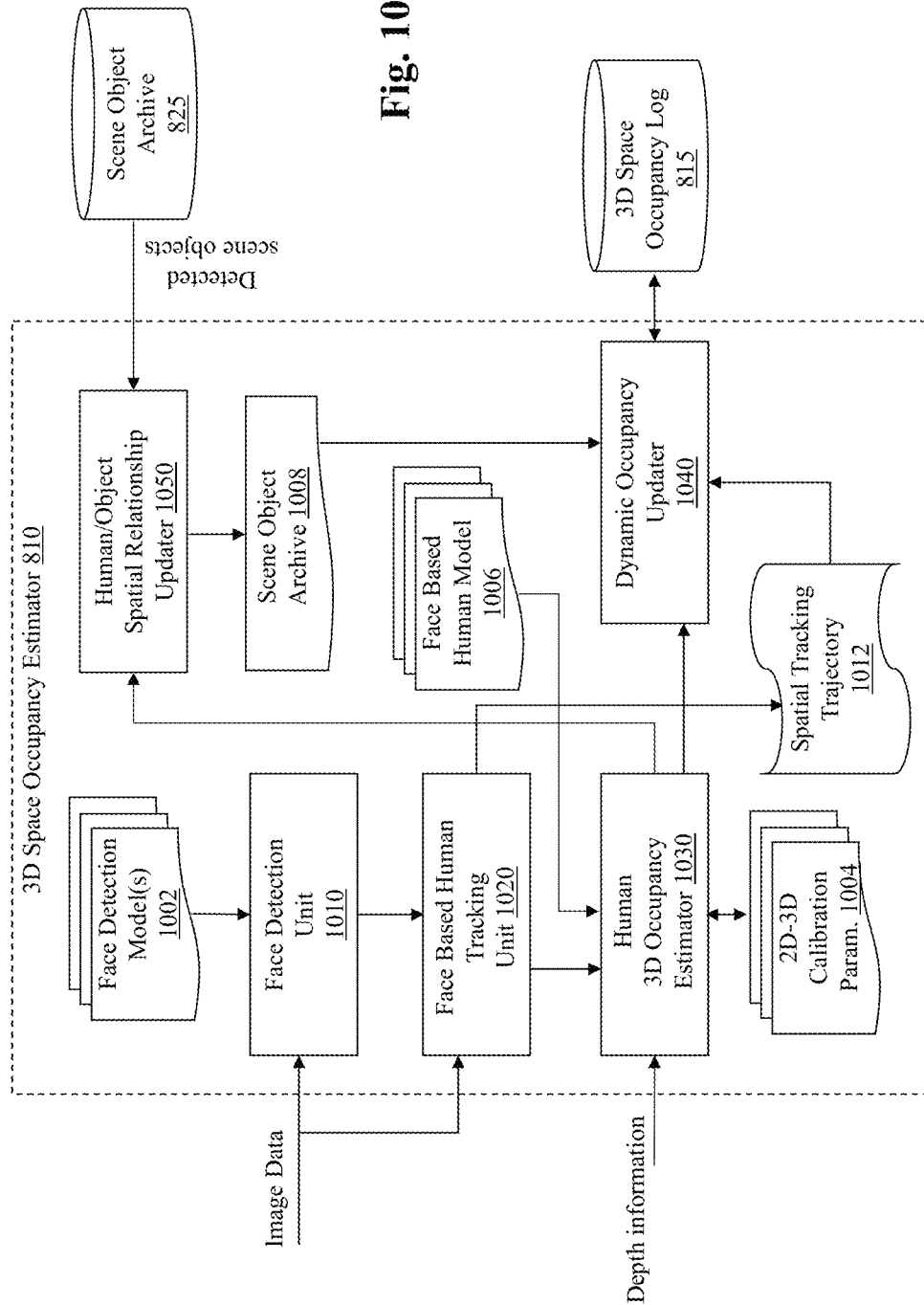
FIG. 10A depicts an exemplary system diagram of a 3D space occupancy estimator, according to an embodiment of the present teaching.

FIG. 10A depicts an exemplary system diagram of the 3D space occupancy estimator 810, according to an embodiment of the present teaching. As discussed herein, the 3D space occupancy estimator 810 is provided to determine 3D space occupancy of users by tracking one or more users present in a dialogue scene. Such occupancy may be dynamic (because people may move around) and together with the detected stationary objects in the scene (e.g., desk, chair, etc.), the occupancy of the 3D space may be dynamically determined. As shown, the exemplary system diagram of the 3D space occupancy estimator 810 comprises a face detection unit 1010, a face based human tracking unit 1020, a human 3D occupancy estimator 1030, a human/object spatial relationship updater 1050, and a dynamic occupancy updater 1040. In this illustrated embodiment, the occupancy of tracked users in the 3D dialogue scene is determined based on a human model 1006 that may specify the 3D occupancy in relation to a detected human face. This is illustrated in FIGS. 10B-10C. In FIGS. 10B and 10C, a user may be located at a specific depth 1009 in a 3D space of a dialogue scene. The user may be captured in a 2D image 1001 and a depth sensor may provide data indicating the depth 1009 of the user. In the 2D image, the face 1005 of the user may be detected and using the human model 1006, the body portion 1003 of the user may be accordingly determined. Based on the detected face 1005 and the estimated body 1003 of the user, a 3D prism 1007 for the user may be estimated at the depth 1009 so that the 3D space occupied by the prism corresponds to a 3D space occupied by the user.

Figure 10D:
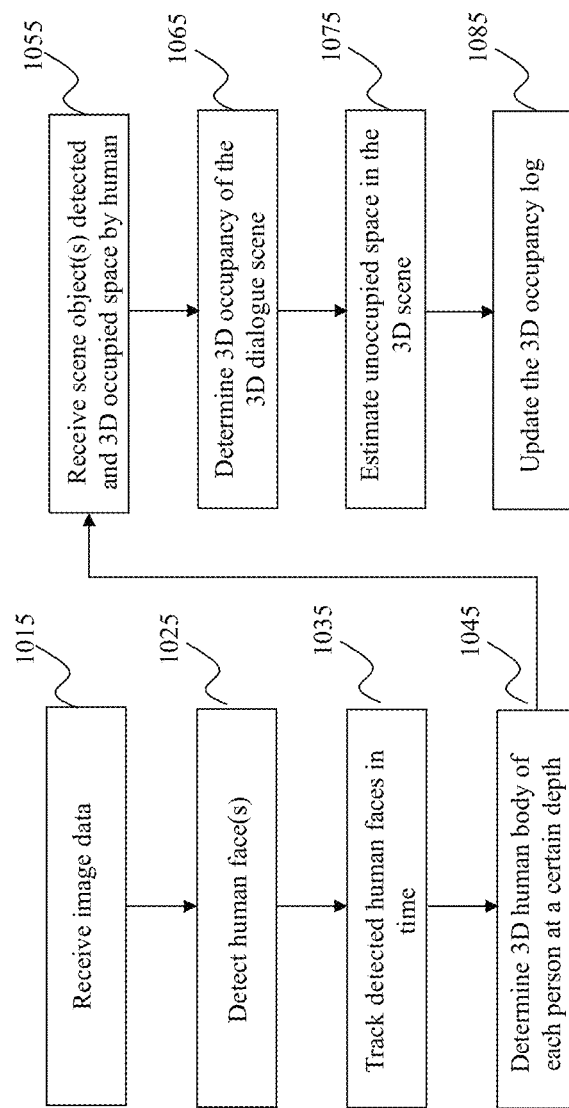
FIG. 10D is a flowchart of an exemplary process for estimating 3D space occupancy based on face detection, according to an embodiment of the present teaching.

FIG. 10D is a flowchart of an exemplary process for estimating 3D space occupancy based on face detection, according to an embodiment of the present teaching. As discussed herein, in operation, when the face detection unit 1010 receives, at 1015, image data acquired from a dialogue scene by sensors 900, it detects, at 1025, human face(s) corresponding to people present at the dialogue scene based on, e.g., face detection models 1002. In some embodiments, based on each such detected face, the face based human tracking unit 1020 tracks, at 1035, the face in a sequence of 2D images acquired at different times. The moving trajectory for each of the tracked faces may then recorded in a spatial tracking trajectory archive 1012.

To determine the 3D space occupancy for each tracked face, a 3D prism, as shown in FIG. 10C, representing a person in the 3D space is determined based on depth information of the tracked face and the face based the face based human model 1006. For example, the depth information corresponding to a face of a person detected in a 2D image may be obtained to determine the 3D location of the person. Such depth information may be acquired directly from a 3D sensor, such as a LiDar sensor, or computed based on, e.g., disparity information determined based on at least two camera sensors that capture information of the same scene from different perspectives. Based on the depth information associated with each detected face, the human 3D occupancy estimator 1030 determines, at 1045, a 3D volume occupied by the person at the depth based on a 3D prism 1007 determined in accordance with the face based human model 1006. In this manner, the 3D space occupied by each of the detected persons in each frame can be determined and such estimated 3D space occupied by detected humans may the be sent to the dynamic occupancy updater 1040.

To determine 3D space occupancy associated with a dialogue scene, in addition to 3D spaces occupied by detected people, 3D space(s) occupied by other objects (e.g., stationary fixture or objects) present in the dialogue scene may also be considered. As shown herein, to do so, the human/object spatial relationship updater 1050 receives, at 1055, information related to the objects detected by the object detection unit 820 and stored in the scene object archive 825 as well as the estimated 3D spaces occupied by detected humans in the dialogue scene and determines the spatial relationships between stational objects and the detected people in the dialogue scene. Such constructed spatial relationship may then be used to estimate, at 1065, the 3D space occupancy of the dialogue scene and accordingly, the unoccupied 3D space may also be estimated at 1075. Such estimated 3D occupancy configuration information may then be sent to the dynamic occupancy updater 1040, that then updates, at 1085, the 3D occupancy log 1085 to reflect the current 3D occupancy situation. In general, moving people creates dynamic 3D occupancy information. Similarly, tracking people's movements also enables detection of unoccupied 3D space. For example, when a person is moving, the 3D space after the person moves out may now be unoccupied. In addition, any 3D space occupied due to moving people corresponds to 3D space that is not occupied by stationary objects and therefore generally unoccupied. In some situations, stationary objects in a dialogue scene may be moved around and, hence, creating dynamics in the 3D occupancy information. The 3D space occupancy estimator 810 is configured to be able to capture such dynamic information and generate adaptively updated 3D occupancy log.

As discussed herein, the 3D space occupancy map estimated as disclosed above may be helpful in different scenarios in dialogue management. According to the present teaching, awareness of a type of the dialogue scene and objects contained therein and on which object(s) a user engaged in a dialogue pays attention to may enable the automated dialogue companion to adaptively determine the dialogue management strategy. For instance, if the automated dialogue companion recognizes that the dialogue occurs in an office, there is a Lego toy on a desk in the office, and the user engaged in the dialogue is gazing at the Lego toy without paying enough attention to the on-going dialogue (e.g., did not respond questions correctly), the automated dialogue companion may decide to switch the conversation to the Lego toy in order to continue to engage the user.

Figure 11A:
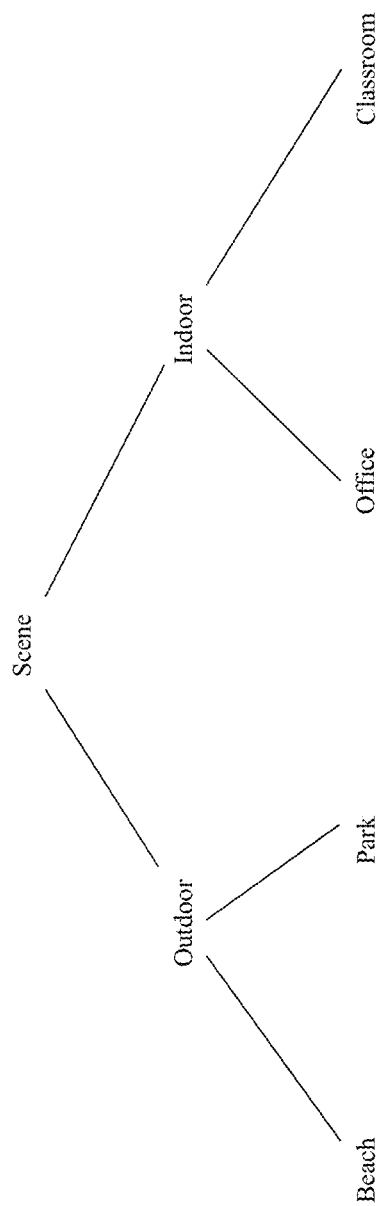
FIG. 11A illustrates a taxonomy of different types of dialogue scenes.

To achieve such awareness of the dialogue surrounding, the estimated 3D space occupancy may provide a useful basis for additional understanding of the dialogue environment. For instance, the automated dialogue companion may be deployed on a device (e.g., an agent device or a user device) and may be activated in any type of environment, e.g., an office, a classroom, a park, home, restaurant, or playground, etc. Some exemplary types of dialogue scenes are illustrated in FIG. 11A, wherein different types of scenes may be organized in a taxonomy structure. In each deployed scene, sensor data may provide both visual and audio information and can be used to detect objects in the scene, the spatial relationships among such objects, and the 3D space occupancy estimated therefrom.

Figure 11B:
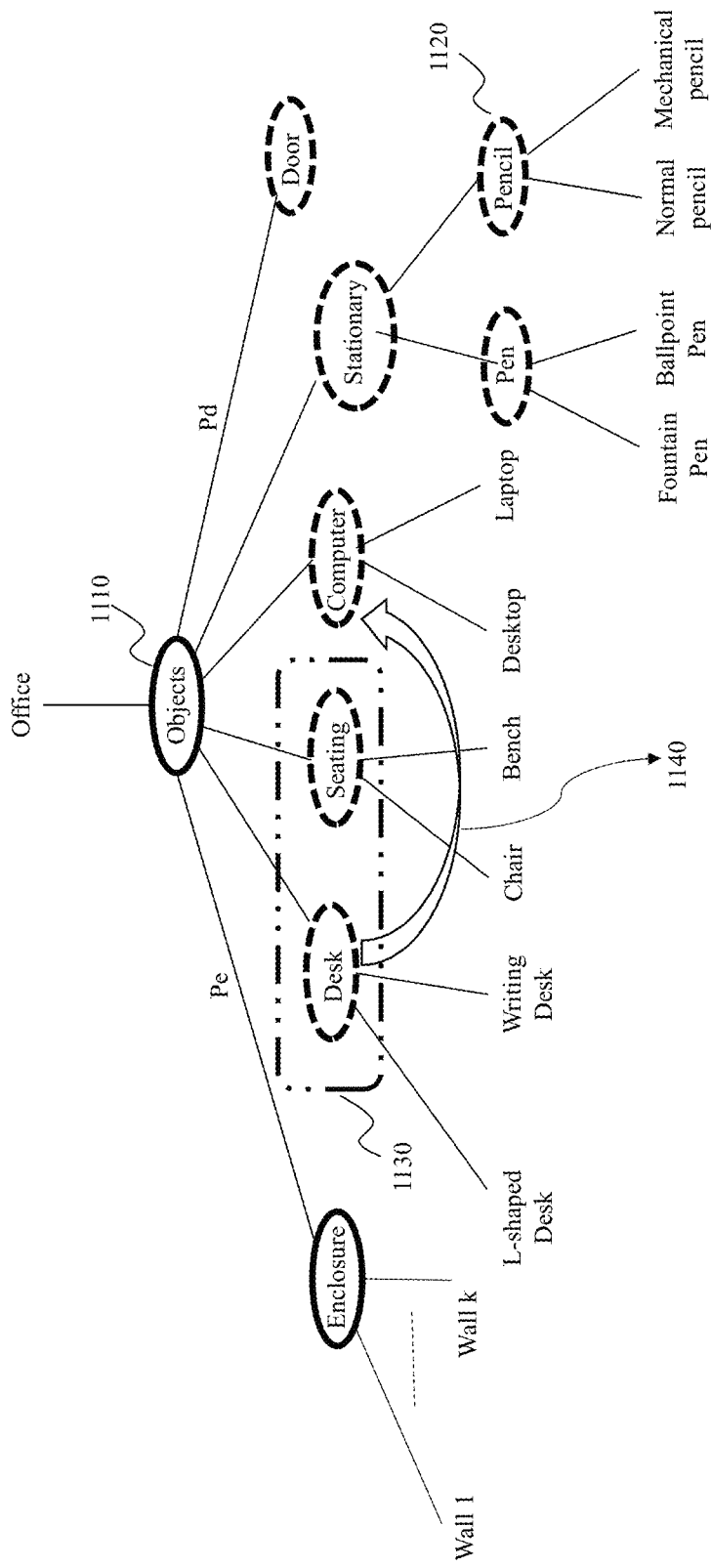
FIG. 11B illustrates an exemplary scene context grammar, according to an embodiment of the present teaching.

To infer a type of scene based on objects detected from the scene and their spatial relationships, the present teaching discloses an approach for classifying a scene based on a scene context-free grammar, which may be learned from prior known scenes and objects contained therein. FIG. 11B illustrates an exemplary scene context-free grammar for an office scene, according to an embodiment of the present teaching. In this illustrated example, an office scene may include objects that are typically present in such a scene and that may spatially form certain relationships. The office scene context-free grammar may be represented herein via an AND-OR graph, which includes AND node and OR node. Each node may represent an object or objects. In this illustrated example, an AND node is represented as a node with a solid circle. An OR node is one with dotted circle.

In this illustrated embodiments, an AND node represent an object that links to all sub-objects that must be present. For example, a node 1110 is an AND node linking to all objects that have to be present in an office scene. As seen in FIG. 11B, an office is required to have an enclosure, a desk, some seating, a computer, some stationary, and a door. An OR node represents an object that may have alternative instantiations. For instance, note representing "computer" is an OR node and links to sub-node "desktop" and "laptop." This representation indicates that a computer can be either a desktop or a laptop and it is not required that these alternatives are all present in the scene. Additional requirements as to an office scene may also be represented in this exemplary grammar. For instance, a desk and a seating in an office scene may be related by a "adjacency" spatial relationship 1130 and a desk and a computer present in an office scene may also be required to have a "on-top" spatial arrangement 1140, i.e., the computer has to be on top of a desk.

Based on this exemplary office scene context-free grammar, to qualify as an office scene, a number of objects need to be observed, including an enclosure, desk, seating, computer, stationaries, and door. For the node representing an enclosure, it may further require that at least some walls are present in the scene. For the desk, although required in an office scene, it has alternative forms such as L-shaped desk, . . . , or a writing desk. Similarly, a seating observed in an office scene may be a chair or a bench, a computer in an office scene may be a desktop or a laptop, and stationary observed in an office scene may be a pen, a pencil, while a pen may be a fountain pen or a ballpoint pen, and a pencil may be a normal pencil or a mechanical pencil.

Such a grammar may be derived via machining learning. In some embodiments, the links among different objects may be annotated with, e.g., probability, so that more flexibility may be introduced. For instance, the link to node "enclosure" is annotated with probability Pe, representing, e.g., a likelihood that an office scene is within an enclosure. This makes it possible that some scenes without an enclosure, e.g., either not visible from the sensors or other office related objects are simply present in an open space such as on a porch without walls. Similarly, on the link to object "door," a probability Pd is provided indicating a likelihood that an office scene has a door. There may also be probabilities associated with links to other possible objects that may be present in an office scene. Such probabilities may also be learned from training data via machine learning.

Figure 12A:
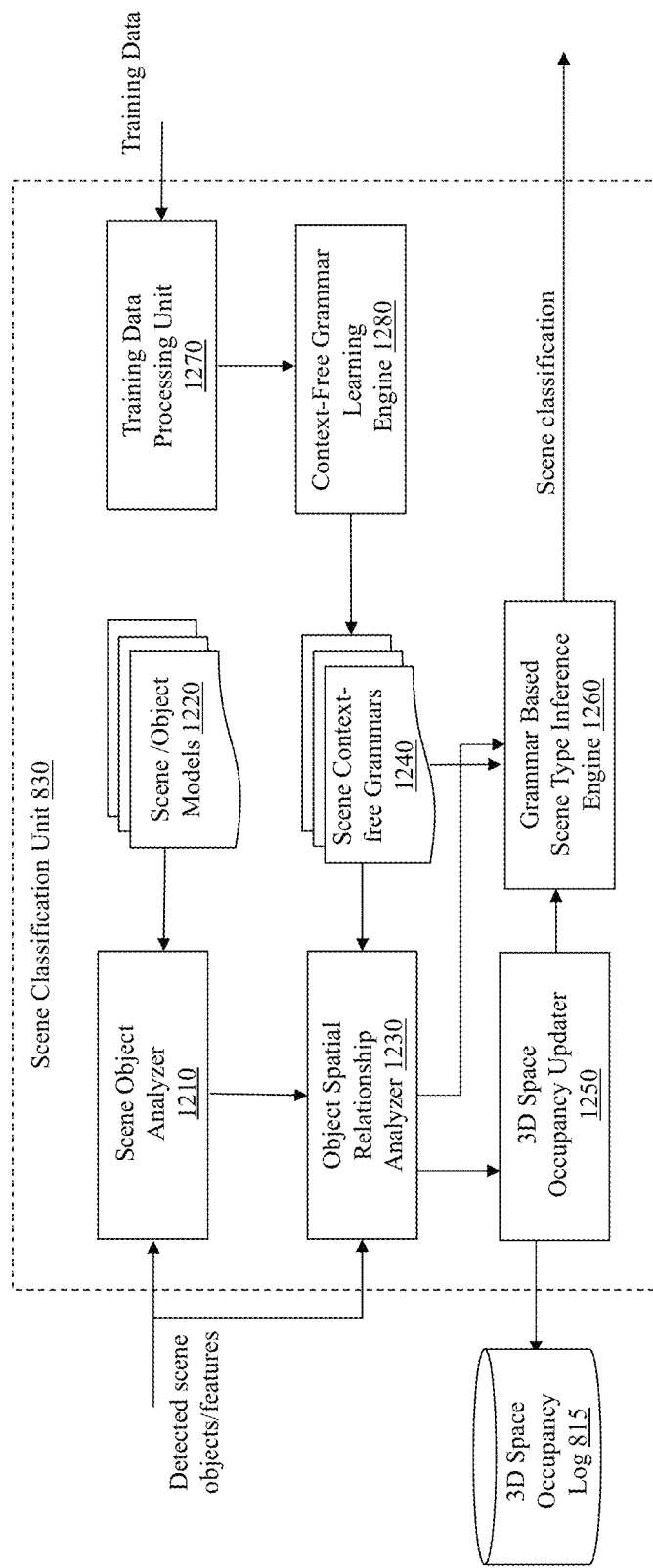
FIG. 12A depicts an exemplary high level system diagram of a scene classification unit, according to an embodiment of the present teaching.
Figures 12B, 12C:
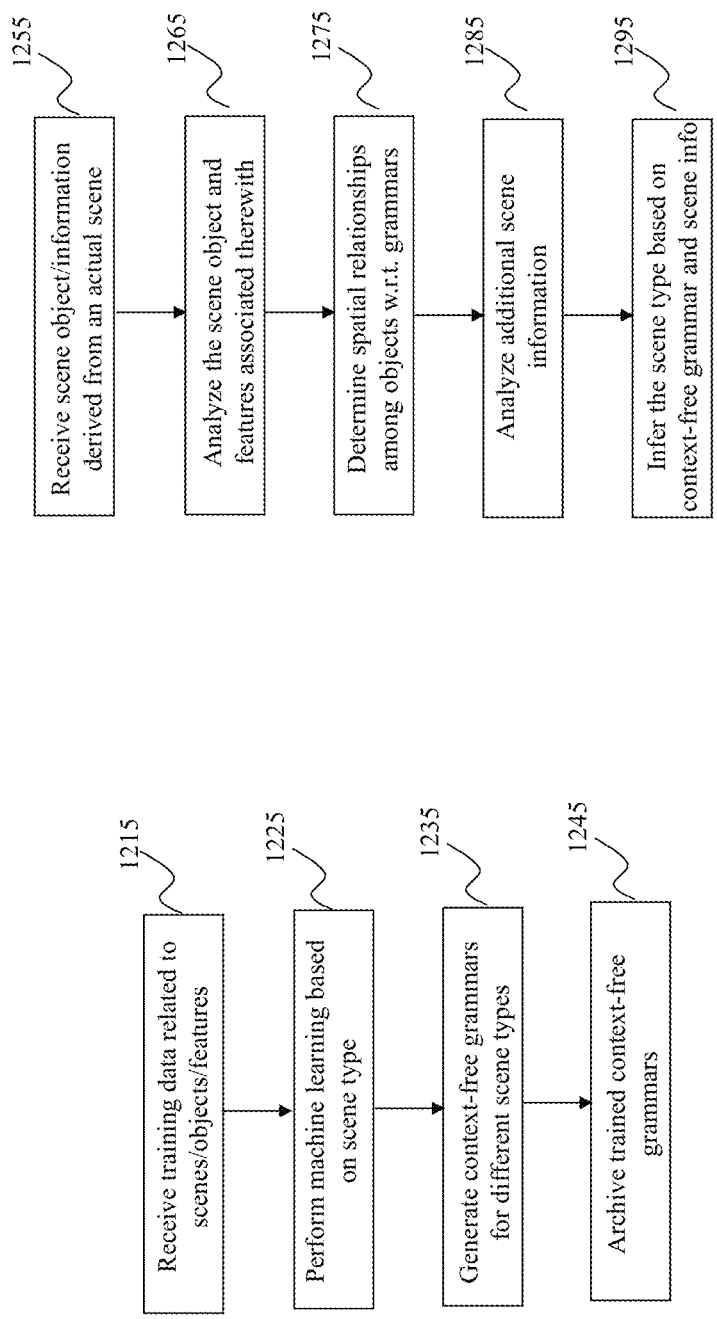
FIG. 12B is a flowchart of an exemplary process of learning scene context grammars based on machine learning, according to an embodiment of the present teaching.
FIG. 12C is a flowchart of an exemplary process for scene classification based on scene context grammar, according to an embodiment of the present teaching.

FIG. 12A depicts an exemplary high level system diagram of the scene classification unit 830 that infers a scene based on scene context-free grammar models, according to an embodiment of the present teaching. The scene classification unit 830 comprises two parts of the operation. The first part is provided for deriving different scene context-free grammars via machine learning based on training data. The second part is to rely on information related to a present scene (objects detected, etc.) and the learned scene context-free grammars to infer a type of a dialogue scene. To derive different scene context-free grammars, the scene classification unit 830 includes a training data processing unit 1270 and a context-free grammar learning engine 1280. FIG. 12B is a flowchart of an exemplary process for learning scene context-free grammars based on machine learning, according to an embodiment of the present teaching. The training data processing unit 1270 receives, at 1215, training data that may comprise prior known scenes with objects present in each associated scene as well as features thereof (e.g., spatial arrangement features, etc.), processes the received training data, and sends to the context-free grammar learning engine 1280 for the training. Upon receiving the processed training data, the context-free grammar learning engine 1280 performs, at 1225, machine learning based on the training data and with respect to different scene types in order to generate, at 1235, context-free grammar for each type of dialogue scene. Such learned context-free grammars for different scene types are then archived as scene context-free grammars 1240 which may then be used for dialogue scene inference.

To utilize learned context-free grammars to infer or classify a dialogue scene, the scene classification unit 830 further includes a scene object analyzer 1210, an object spatial relationship analyzer 1230, a scene information analysis unit 1250, and a grammar based scene type inference engine 1260. FIG. 12C is a flowchart of an exemplary process for scene type inference based on scene context-free grammars, according to an embodiment of the present teaching. Inferring a scene type is performed based on information related to a scene, such as objects present in the scene, features associated with the objects, as well as spatial configurations of such detected scene objects. When the scene object analyzer 1210 receives, at 1255, information related to objects detected in a dialogue scene, it analyzes, at 1265, the scene objects and their associated features. In addition, based on the information related to scene objects and features, the object spatial relationship analyzer 1230 determines, at 1275, spatial relationships among scene objects in accordance with the trained scene context-free grammars. Such determined spatial relationship among scene objects, together with the objects themselves, are then sent to the grammar based scene type inference engine 1260.

To infer a scene type, additional information acquired from the dialogue scene may also facilitate scene type determination. One example of such additional scene information includes the environmental sounds sensed from a dialogue scene. A recognition of specific sounds may further help to disambiguate during scene type inference. For instance, if the sensed sound from a dialogue scene indicates that there is much TV sounds in the background, it may suggest that the dialogue scene cannot be a beach or part scene. In some embodiments, optionally the scene information analysis unit 1250 may receive additional scene information acquired, e.g., by sensors on either user device or an agent device and analyze, at 1285, such information and provide the analyzed results to the grammar based scene type inference engine 1260. Based on received scene objects, features thereof, the spatial relationships among such scene objects, as well as optionally additional scene information, the grammar based scene type inference engine 1260 infers, at 1295, the type of the dialogue scene in accordance with the scene context-free grammars 1240. Such estimated scene type may be used by the automated dialogue companion to conduct the dialogue with a user accordingly. In addition, the scene involved in a dialogue may change over time, e.g., a user may walk around with a device in hand so that the scene acquired by sensors on the device may change accordingly. The dynamically changing input from a dialogue scene (scene objects with features and the additional scene information) may be continuously provided to the scene classification unit 830 so that the inference of a scene type may be accordingly adapted to the changing scene.

Detecting objects present in a dialogue scene with information on their spatial configurations in terms of 3D space occupancy in the dialogue scene not only facilitates the automated dialogue companion to infer the type of the dialogue scene but also may assist the automated dialogue companion to further infer or understand certain dynamics during a dialogue session. For instance, with the knowledge of which objects is located where in the 3D dialogue scene, via visual tracking, the automated dialogue companion may estimate what is the user's current focus or interest, what may be the intent of the user (inferred from the observed user's current focus), whether it deviates from what is intended, and then accordingly devise a dialogue strategy in order to enhance the user engagement and improve the user's experience. According to an embodiments of the present teaching, the automated dialogue companion detects the attention of a user engaged in a dialogue by tracking his/her gaze over time to facilitating a determination on what is the object that the user is focusing on, and how long the user is focusing on the object, etc. In some situations, a user may be focusing on an object, e.g., a child keeps looking at a Lego toy on a desk while carrying on a dialogue with the automated dialogue companion. In some situations, multiple users in the dialogue scene may be interested in the same object, e.g., two students in a classroom are staring at a basketball in the corner of the classroom. Such observations may be relevant to how to conduct a dialogue with people in the scene.

Figure 13A:
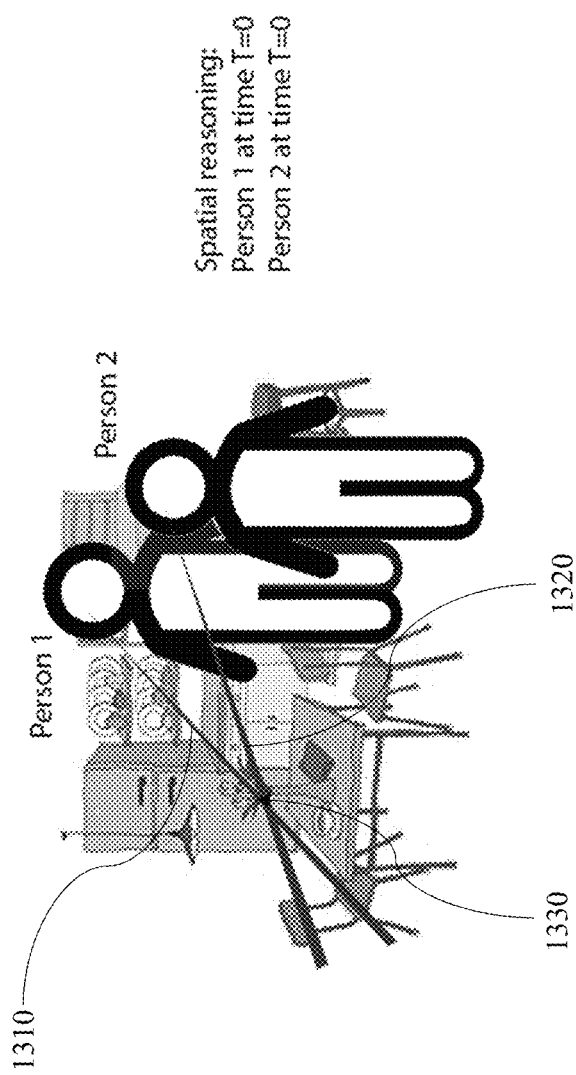
FIG. 13A shows the concept of identifying a common object of interest of different people via gazing detection, according to an embodiment of the present teaching.
Figure 13B:
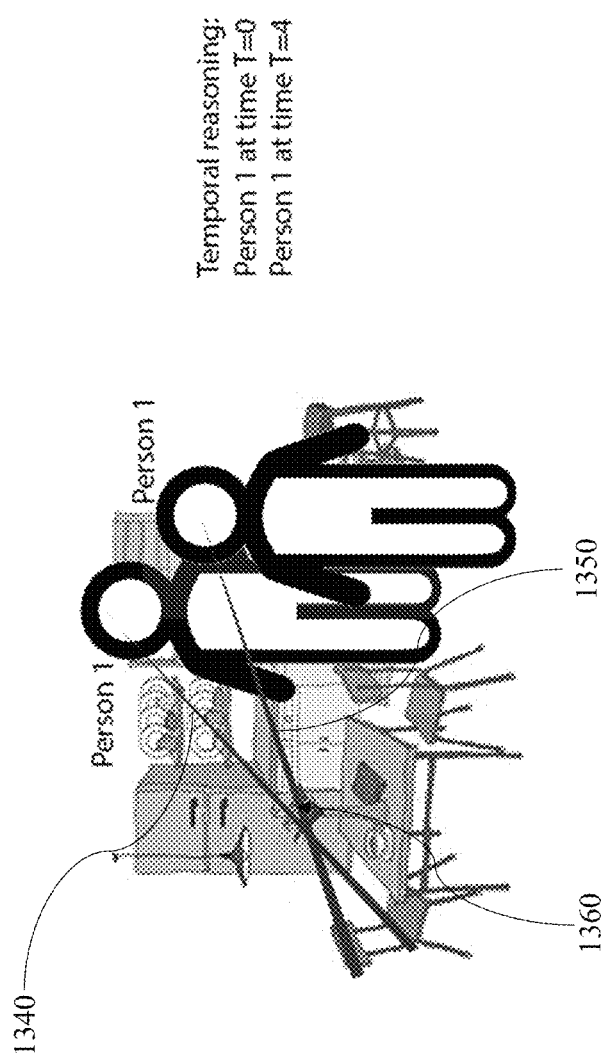
FIG. 13B shows the concept of identifying an object of interest of a user via gazing tracking, according to an embodiment of the present teaching.

FIG. 13A shows the concept of identifying a common object of interest of different people via gazing detection, according to an embodiment of the present teaching. In the illustrated dialogue scene, there is a person 1 and person 2. In the scene, there are different objects present such as a table, some chairs, a refrigerator, a vase placed on the table, etc. If both person 1 and person 2 are looking at a same object, e.g., the vase on the table, they are gazing at the vase in respective gazing directions (1310 and 1320) so that the intersection (1330) of their gazing directions corresponds to the 3D position where the vase is. Similarly, to identify an object of interest in a 3D dialogue scene, by detecting gazing directions of a same person at different times may facilitate detection of the object that the user is focusing on. FIG. 13B shows the concept of identifying an object of interest of a user via gazing tracking, according to an embodiment of the present teaching. A person in a 3D dialogue scene may gaze at an object in the scene. Gazing directions (1340 and 1350) of the person at different times may be detected and an intersection point (1360) of different gazing directions from different times may be determined to identify an object of interest at a 3D location corresponding to the intersection point. Although the person 1 in FIG. 13B is at different locations at different times (i.e., the person is moving), the gazing directions of the same person at different times may coincide or substantially coincide with each other (i.e., the person is not moving), which still enable the detection of the intersection point and hence identify the object of interest.

Figure 14A:
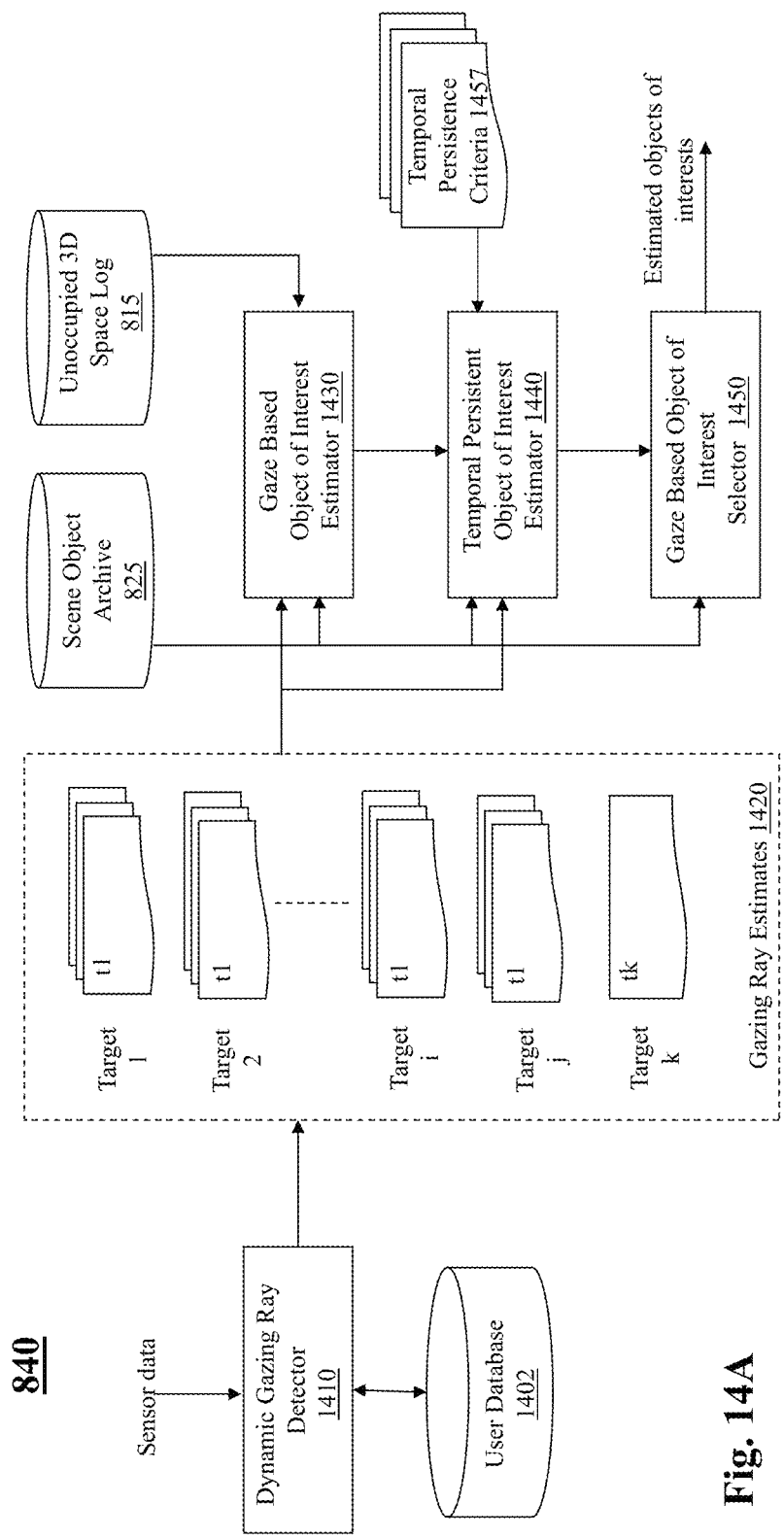
FIG. 14A depicts an exemplary high level system diagram of an object of interest identification unit, according to an embodiment of the present teaching.

FIG. 14A depicts an exemplary high level system diagram of the object of interest identification unit 840, according to an embodiment of the present teaching. In this illustrated embodiment, the object of interest identification unit 840 includes a dynamic gazing ray detector 1410, a gaze based object of interest estimator 1430, a temporal persistent object of interest estimator 1440, and a gaze based object of interest determiner 1450. The dynamic gazing ray detector 1410 is provided for detecting a gazing ray corresponding to a point of time of each user present in a dialogue scene. The detection results in gazing ray estimates 1420, which may be recorded with respect to each target user and for each target user multiple gazing rays may be recorded, each of which corresponds to a specific point of time, e.g., t1, t2, tk. For any user who appears in the course of the detection, a recorded gazing ray detected may also be recorded with respect to the point of time at which the gazing ray is detected. For example, as seen in FIG. 14A, for target k, the first gazing ray is detected at time tk, while gazing rays detected from other target users started at time t1.

Based on the gazing ray estimates 1420, the gaze based object of interest estimator 1430 may proceed to determine intersections of different gazing rays. This is visualized in FIG. 14C. As seen, each target has gazing rays at different times. For example, there is a group of gazing ray estimates for target 1 at times t1, t2, . . . and target 2, a group of gazing ray estimates for target 2 at t1, t2, . . . , and a gazing ray estimate for target k at time tk (target k is detected later than others). The example shows that the gazing rays of target 1 and the gazing rays of target 3 persistently intersect at different points of time (t1, t2, . . . , ti, tj) and the intersection points at different times are consistently corresponding to a 3D location in the dialogue scene. The example also shows that target j has a multiple gazing rays at different points of time and these gazing rays intersect at a point in the 3D space in the dialogue scene. Furthermore, gazing rays of target 2 and target i intersect at point of time t2. In some embodiments, for each gazing ray detected, it may be compared against all other gazing rays, whether it is from the same person or from other person, detected at the same point of time to seek intersections. In this way, all intersections may be identified.

Once the intersection points of gazing rays are identified, whether such intersection points correspond to scene objects may be determined based on information related to the detected scene objects stored in the scene object archive 825. In some embodiments, although gazing rays intersect, the point of intersection may not be exactly the location of an object. This may be due to the inaccurate estimation of the gazing ray direction caused by, e.g., inaccurate calibration of the cameras or image processing. In this situation, disambiguation may be need based on, e.g., the nearest location of an object to achieve inexact identification of scene object. In some situations, an intersection point may be near multiple objects, especially when one object occludes the other. In this situation, the intersection of the gazing rays may be associated with more than one object. In some situations, an intersection point may not have any nearby object, if a search of the scene object archive 825 based on 3D pose of scene objects does not reveal any. This may also be confirmed via the 3D space occupancy log 815, e.g., the intersection point corresponds to 3D space that is marked as unoccupied.

Gazing rays may intersect transiently without persistence. For example, a user may look at an object in the scene for 2-3 seconds but quickly moved on. In this case, although the gazing rays in these 2-3 seconds do intersect, it does not persist. The eye sights of different people in a dialogue scene may cross temporarily but do not continue. In this case, particularly when the intersection of their gazing eye sights does not have a corresponding scene object, the temporary intersecting gazing rays may not indicate an intentional focus. According to the present teaching, this may be disambiguated based on temporal persistence. That is, if an intersection point of gazing rays is persistently detected over a specified period of time, the intersection point is more likely indicating an intentional focus. Otherwise, it may be considered transient without persistence. For example, the intersection point of gazing rays between target 2 and target i may be transient because it is detected only at time t2 and then disappears. In this case, although the intersection point of gazing rays of target 2 and target i at t2 does correspond to the 3D pose of object "Computer screen," it may not be concluded that target 2 and target i are interested in object "computer screen" because it is a transient event. On the other hand, the intersection point of gazing rays of target 1 and target i are persistent over t1, t2, t3, . . . , tj, indicating that it is a persistent event so that it may be concluded that both target 1 and target i are focusing on an object "vase" located at a 3D pose close or coincide with the persistent intersection point of gazing rays of target 1 and target i.

Figure 14B:
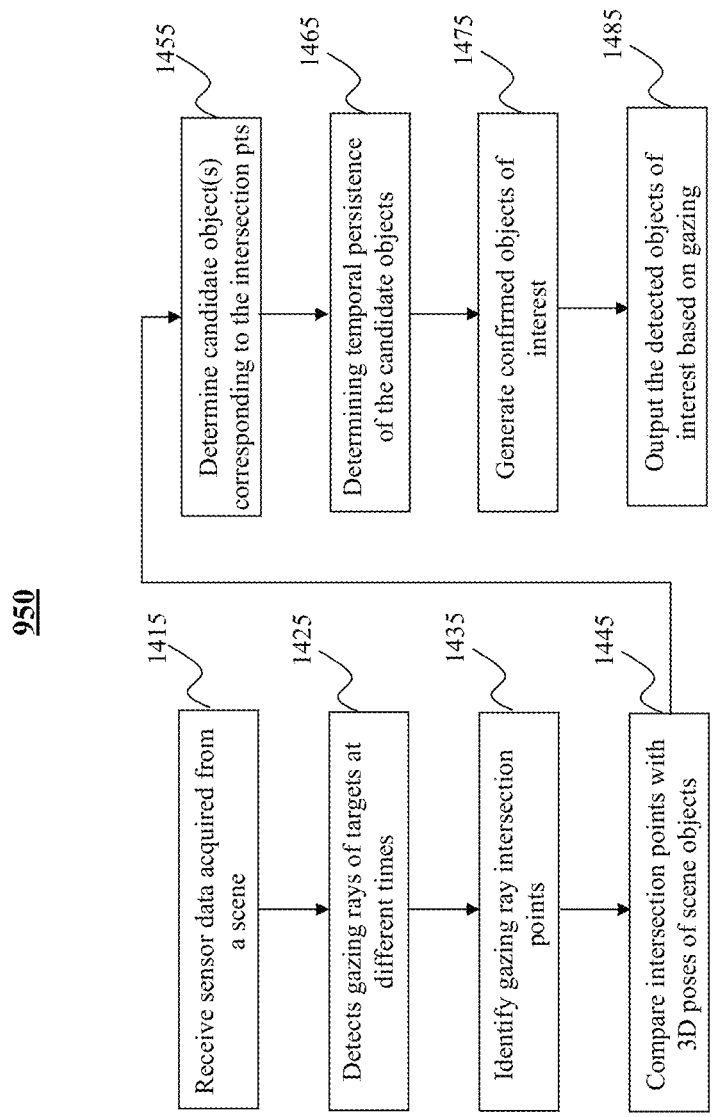
FIG. 14B is a flowchart of an exemplary process of an object of interest identification unit, according to an embodiment of the present teaching.
Figure 14C:
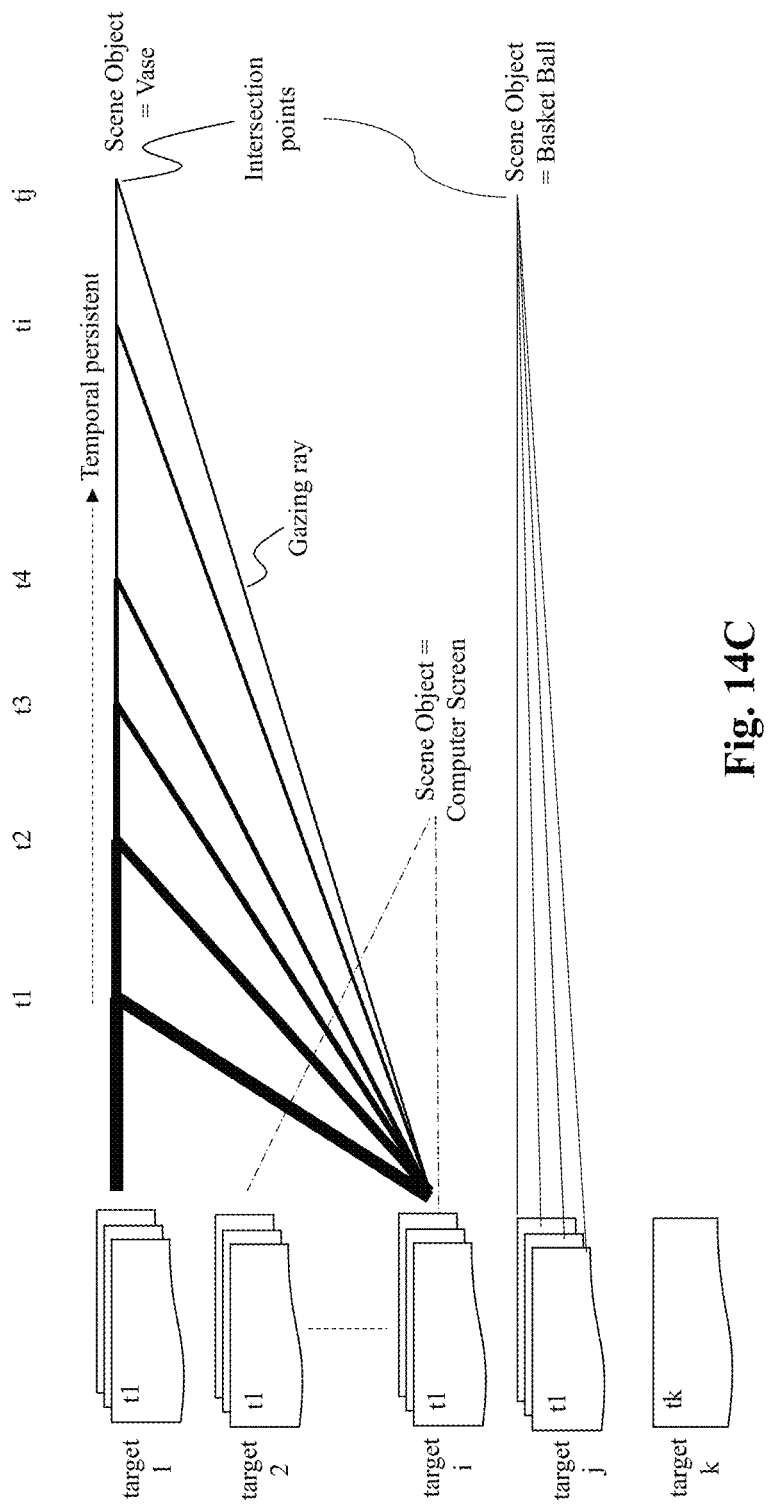
FIG. 14C illustrates the concept of detecting objects of interest via gazing tracking, according to an embodiment of the present teaching.

FIG. 14B is a flowchart of an exemplary process of the object of interest identification unit 840, according to an embodiment of the present teaching. When the dynamic gazing ray detector 1410 receives, at 1415, sensor data acquired from a dialogue scene, it detects, at 1425, gazing rays of users detected in the dialogue scene and tracks such gazing rays of detected users at different times. Such detection results in the gazing ray estimates 1420, which are then used by the gaze based object interest estimator 1430 to identify, at 1435, gazing ray intersection points, compare, at 1445, such intersection points with 3D poses of the detected scene objects, and determines, at 1455, candidate objects of interest for such intersection points that correspond to scene objects located at or close thereto. Based on the candidate objects of interest, the temporal persistent object of interest estimator 1440 assesses, at 1465, the temporal persistence of the intersection points associated with each candidate object of interest based on temporal persistence criteria 1457. The gaze based object of interest selector 1450 then selects, at 1475, those candidate objects of interest that are temporal persistent and outputs, at 1485, the confirmed objects of interest.

In an alternative embodiments, the temporal persistence may be assessed with respect to intersection points and retain only those intersection points that are temporal persistent and use such retained intersection points for identifying corresponding objects of interest based on the archived scene objects. This is described in more detail with reference to FIGS. 16A-16. In some embodiments, the temporal persistence may be assessed with respect to both intersection points and the candidate objects of interest. The criteria to be used for assessing temporal persistence may be a continued length of time, e.g., longer than 10 seconds, or intermittent, e.g., if in a period of 30 seconds, a user focused on the same object more than 3 times and each time is longer than 5 seconds. Such criteria may be made application dependent or even user dependent. For example, if the automated dialogue companion is engaged in a dialogue with an adult user, the required temporal persistence may be different from that for a child user.

Figure 15A:
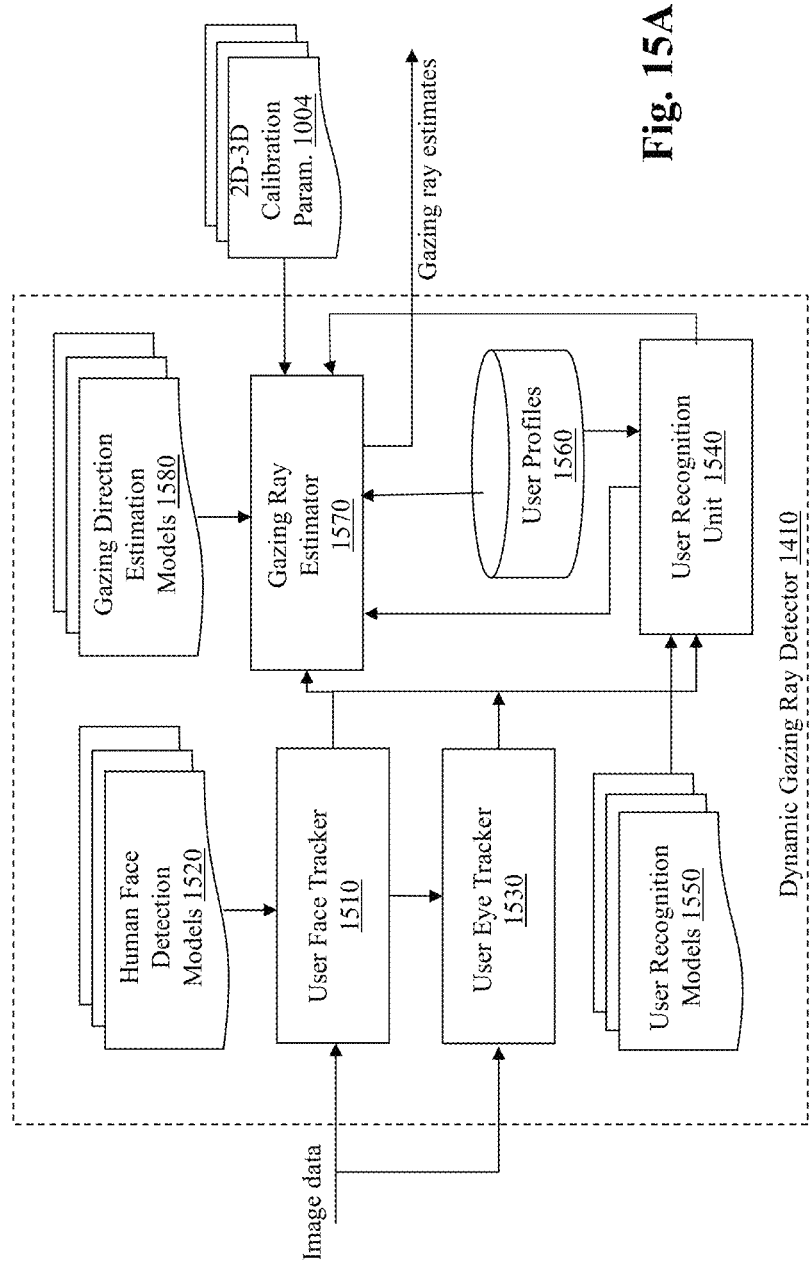
FIG. 15A depicts an exemplary high level system diagram of a dynamic gazing ray detector, according to an embodiment of the present teaching.
Figure 15B:
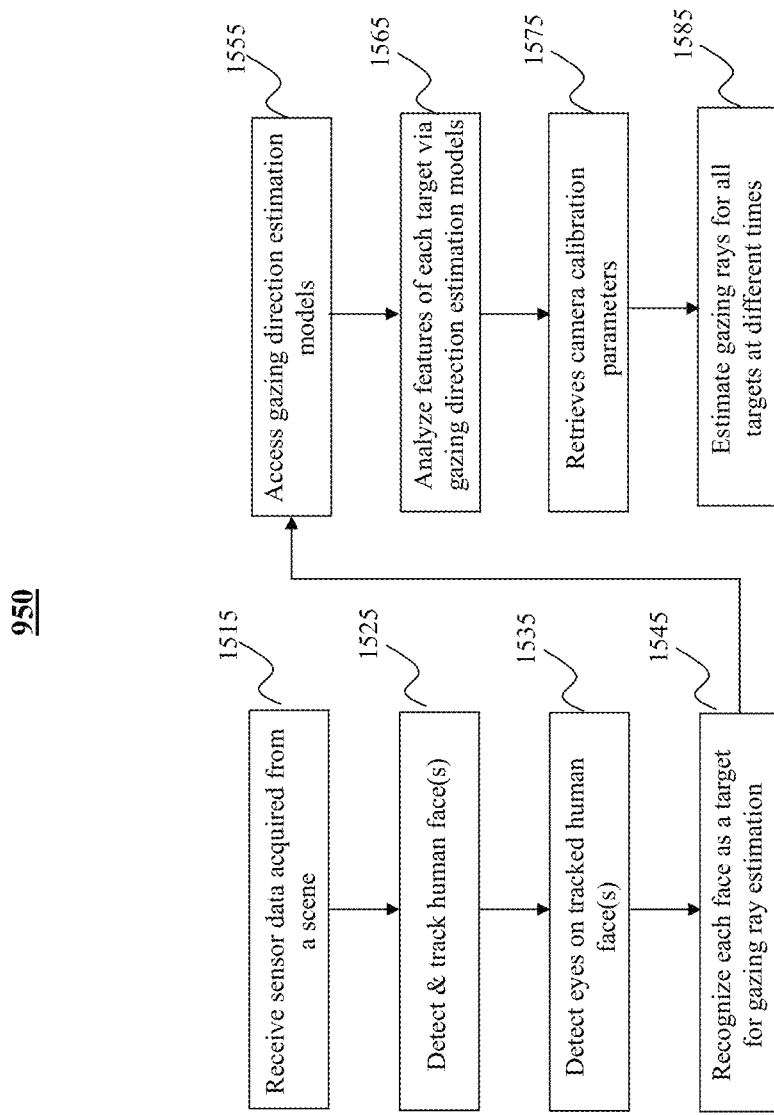
FIG. 15B is a flowchart of an exemplary process of a dynamic gazing ray detector, according to an embodiment of the present teaching.

FIG. 15A depicts an exemplary high level system diagram of the dynamic gazing ray detector 1410, according to an embodiment of the present teaching. As discussed herein, the dynamic gazing ray detector 1410 is provided to detect and track gazing rays of one or more users in a dialogue scene and generate the gazing ray estimates 1420. In this illustrated embodiment, the dynamic gazing ray detector 1410 comprises a user face tracker 1510, a user eye tracker 1520, a user recognition unit 1540, and a gazing ray estimator 1570. FIG. 15B is a flowchart of an exemplary process of the dynamic gazing ray detector 840, according to an embodiment of the present teaching. To detect gazing rays, human face(s) and eyes may be detected first. Upon receiving the sensor image data at 1515, the user face tracker 1510 detects and tracks human faces appearing in the dialogue scene. Certain features associated with each detected face may also be identified. For example, the angle of a detected face with respect to the camera may be detected. The detected faces and features thereof may be sent to the user eye tracker 1530, which detects, at 1535, eyes and features thereof from the tracked human faces in different picture frames. Features detected from eyes may include, e.g., location of pupils which may be used, e.g., together with features related to face such as angle of the face with respect to the camera, to estimate the gazing direction.

The detected faces and eyes and features thereof may then be sent to the gazing ray estimator 1570 and the user recognition unit 1540. In some embodiments, based on the detected face and features thereof (including eyes), the user recognition unit 1540 may analyze the features to recognize, at 1545, the identity of the corresponding person based on, e.g., information from a user profile database 1560. In some embodiments, the recognition may be performed based on user facial features. In some embodiments, the recognition may be performed based on other biometric features such as iris. In some embodiments, the recognition may be performed based on a combination of facial and iris features. Recognizing a user may facilitate to organize the gazing ray estimates with respect to different users at different times (organized as 1420 in FIG. 14A).

In some embodiments, instead of recognizing the identity of each user tracked, which may be computational expensive, the user recognition unit 1540 may merely individually track each user without performing recognition. In that case, the user recognition unit 1540 may track faces to make sure that each sequence of tracked faces are most likely corresponding to the same person based on, e.g., similarity of facial features. In this way, the user recognition unit 1540 will provide information on how many individuals present in the dialogue scene and for each individual, there is an associated sequence of tracked faces and eyes with associated features. Such results are then sent to the gazing ray estimator 1570, which will then proceed to estimate gazing rays associated with each individual at different times.

Upon receiving inputs from the user face tracker 1510 (tracked faces), the user eye tracker 1530 (tracked eyes with respect to faces), and the output from the user recognition unit 1540 (information about how tracked faces, eyes are grouped with respect to each distinct individual present in the scene), the gazing ray estimator 1570 accesses, at 1555, the stored gazing direction estimation models 1580, analyzes, at 1565, features associated with each tracked face and eyes in accordance with the gazing direction estimation models. To compute the gazing directions corresponding to tracked faces/eyes in 2D images, the gazing ray estimator 1570 may estimate, e.g., based on detected pupils from 2D images, a direction of eye sight coming out of the 2D image. To further determine a direction of eye sight in the 3D dialogue scene, the gazing ray estimator may also retrieve, at 1575, camera calibration parameters 1004 that specify the mappings between 2D and 3D and estimate, at 1585, the directions of the sys sights in the dialogue scene or the gazing rays associated with each tracked individual at different times. Such estimated gazing rays may then be organized with respect to each distinct individual along with a time line and output as the gazing ray estimates 1420.

Figure 16A:
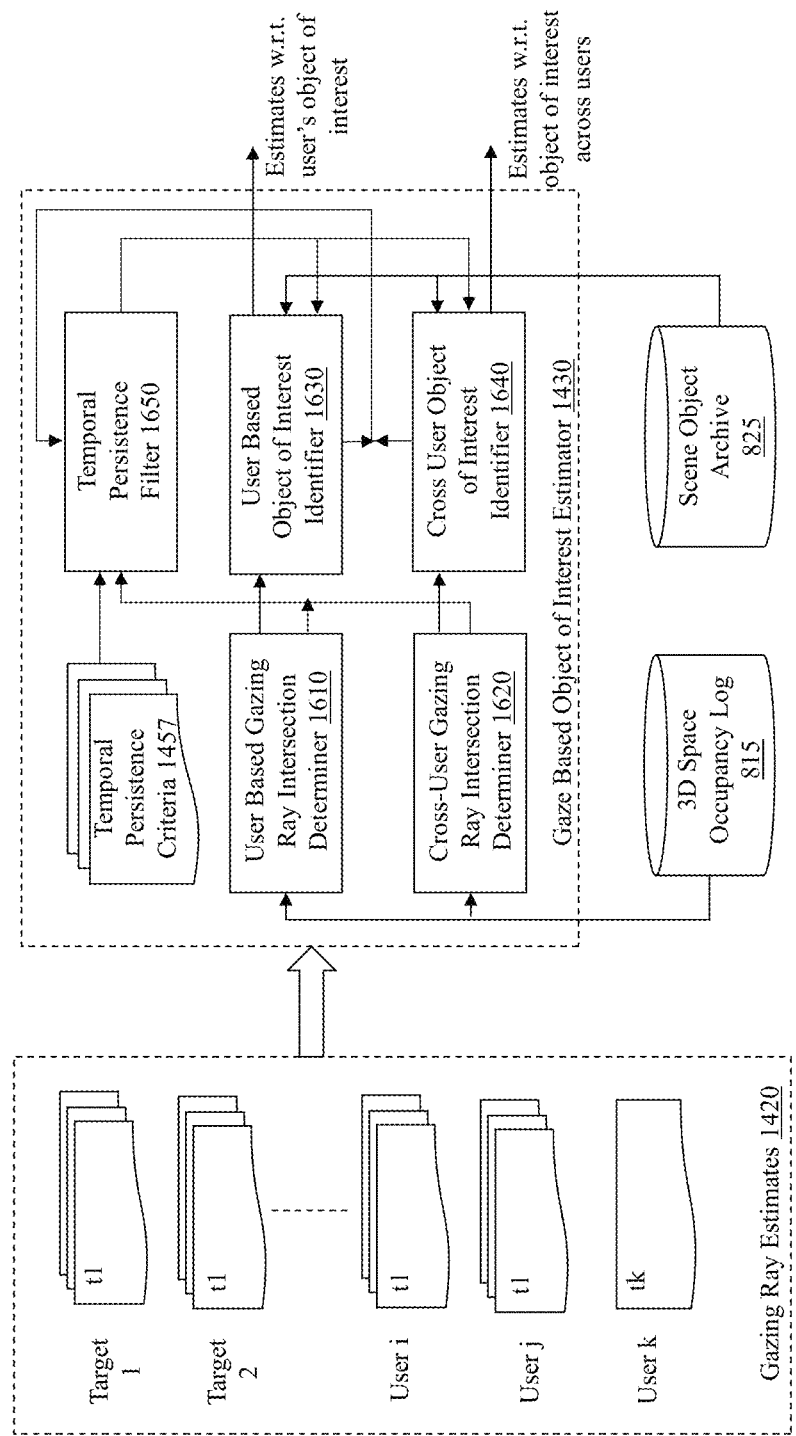
FIG. 16A depicts an exemplary high level system diagram of a gaze based object of interest estimator, according to an embodiment of the present teaching.

FIG. 16A depicts an exemplary high level system diagram of the gaze based object of interest estimator 1430, according to an embodiment of the present teaching. As discussed with respect to FIG. 14A, the gazing ray estimates 1420, which may be organizes with respect to individual targets along time lines, are used by the object of interest estimator 1430 to identify objects of interest associated with different targets. In this illustrated embodiment, the gaze based object of interest estimator 1430 comprises a user based gazing ray intersection determiner 1610, a user based object of interest identifier 1630, a cross-user gazing ray intersection determiner 1620, a cross user object of interest identifier 1640. As illustrated, the intersection points of gazing rays may be identified based on gazing ray estimates 1420 with respect to each tracked individual in the dialogue scene (by the user based gazing ray intersection determiner 1610) and across different users (by the cross user gazing ray intersection determiner 1620).

Such determined intersection points may optionally be confirmed or disaffirmed based on information stored in the 3D space occupancy log 815. If an intersection point falls in an unoccupied 3D space or outside of the dialogue scene, the intersection point may not correspond to any object (including a moving user, which is also tracked) in the dialogue scene. If an intersection point falls within an occupied 3D space, then the object of interest may be identified based on information relate to scene objects archived in 825. This is achieved by either 1630 or 1640. In some embodiments, components 1630 and 1640 may be merged to perform a mapping from an intersection point in the 3D space corresponding to the dialogue scene to an object whose location is the same or in the vicinity of the intersection point.

As discussed herein, the temporal persistence of identified object of interest may need to be confirmed in order for an object of interest to qualify as a valid object of interest. As discussed previously, temporal persistence may be checked at different processing stages. In some embodiments, it may be carried out with respect to the intersection points. In some embodiments, it may be carried out with respect to objects of interest identified based on intersection points. In some embodiments, it may be carried out at both points of processing. To enable temporal persistence check, the gaze based object of interest estimator 1430 may also include a temporal persistence filter 1650, which is provided to carry out temporal persistence based filtering, either directed to intersection points or objects identified based on intersection points. As can be seen, to carry out temporal persistence check on intersection points, the temporal persistence filter 1650 may take input from the gazing ray intersection determiners 1610 and 1620 and sends the filtered result (the intersection points that are temporal persistent) to the object of interest identifiers 1630 and 1640, respectively (depending on whether the filtered intersection point involves one or more users) to identify objects of interest based on the intersection points that passed the temporal persistence check.

In an alternative configuration, temporal persistence check may also be applied to objects of interest identified based on intersection points. In this configuration, the intersection points determined by the user based gazing ray intersection determiner 1610 and the cross user gazing ray intersection determiner 1620, respectively, may be sent directly to the user based object of interest identifier 1630 and the cross user object of interest identifier 1640 for identifying objects of interest corresponding to the intersection points. Each of such identified objects of interest may be associated with certain features or meta data, such as the temporal persistency of the underlying gazing rays that form the intersection point. Such identified objects of interests as well as associated meta information may then be sent to the temporal persistence filter 1650 and the ones that do not meet the required temporal persistence may then be filtered out.

Figure 16B:
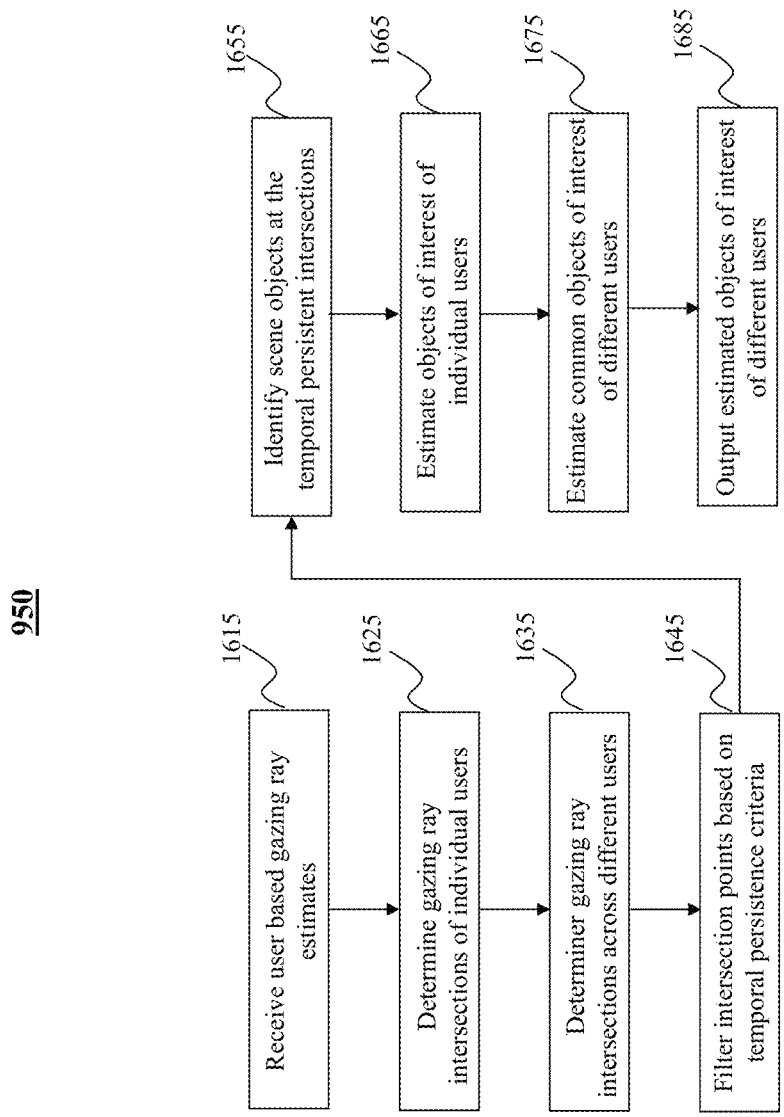
FIG. 16B is a flowchart of an exemplary process of a gaze based object of interest estimator, according to an embodiment of the present teaching.

FIG. 16B is a flowchart of an exemplary process of the gaze based object of interest estimator 1430, according to an embodiment of the present teaching. When the gaze based object of interest estimator 1430 receives, at 1615, the user based gaze ray estimates, the user based gazing ray intersection determiner 1610 determines, at 1625, gazing ray intersections with respect to individual users. The cross user gazing ray intersection determiner 1620 determines, at 1635, gazing ray intersections across different users. In this illustrated flowchart, such determined intersection points are filtered, at 1645 by the temporal persistence filter 1650, and temporal persistent intersection points are then used to identify objects of interests, either interested by individual user(s) or commonly interested by more than one users.

To do so, the user based object of interest identifier 1630 and the cross user object of interest identifier 1640 access, at 1655, the archived objects present in the dialogue scene and their associated features such as their 3D location in the dialogue scene and a description thereof as to the nature of the objects. Based on the temporal persistent intersection points with their 3D coordinates as well as the 3D coordinates of archived scene objects (including people tracked), the user based object of interest identifier 1630 estimates, at 1665, object(s) of interest of individual tracked user(s) in the dialogue scene. Similarly, the cross user object of interest identifier 1640 estimates, at 1675, object(s) of interest that are commonly interested by more than one tracked users in the dialogue scene. Such identified objects of interest, together with one or more users associated therewith, are then output at 1685.

With estimated objects of interest in a user machine dialogue, it may assist the automated dialogue companion to devise adaptive strategy in managing the dialogue. For example, when a user engaged in a dialogue appears to be unfocused on the content of the dialogue (e.g., a child is going through a tutorial session but is not able to answer questions correctly), the automated dialogue companion may access information related to the estimated object of interest to find out what the user is currently interested in. With this information, the dialogue may be steered in a way to continue to engage the user until he/she can refocus. For instance, if a child user is in the middle of a tutorial session on math and lost focus, if the user is observed to focus his gaze on a Lego toy on a desk, the automated dialogue companion may then steer the conversation to temporarily shift to the Lego toy so that the user can continue to engage with the machine. In this situation, the automated dialogue companion may invoke a different dialogue tree (or sub-tree) that may be designed to talk about a toy such as a Lego toy but having different math problems intended initially injected into the conversation to not only better engage the user but also achieve the intended purpose of teaching math. This also provides the user enhanced experience.

In some situations, during a user machine interaction process, an observed user may be rendered on a screen in order to provide a more interesting interface to the user. In order to render in a manner that mimics the user, various features including the user's positions and motions, may be observed over time which are then used to control how the rendering should be done on a device. For a moving object such as a user, the observation may be done using a video performed in a specific framerate. It is commonly known that the typical framerate of a video camera is 24 frames per second. With this rate, the amount of information being collected is very large. If using such a high volume of data to derive the needed features in order to control the rendering of the moving object on screen requires much computational power and speed. On the other hand, there is the issue of framerate of the rendering. If rendering at the same 24 frames per second, it also requires much computation power and speed to achieve that. Furthermore, the communication to transmit the monitored information related to the real scene to the device for the rendering purpose also requires bandwidth. A high framerate will necessarily increase the required bandwidth.

Figure 17:
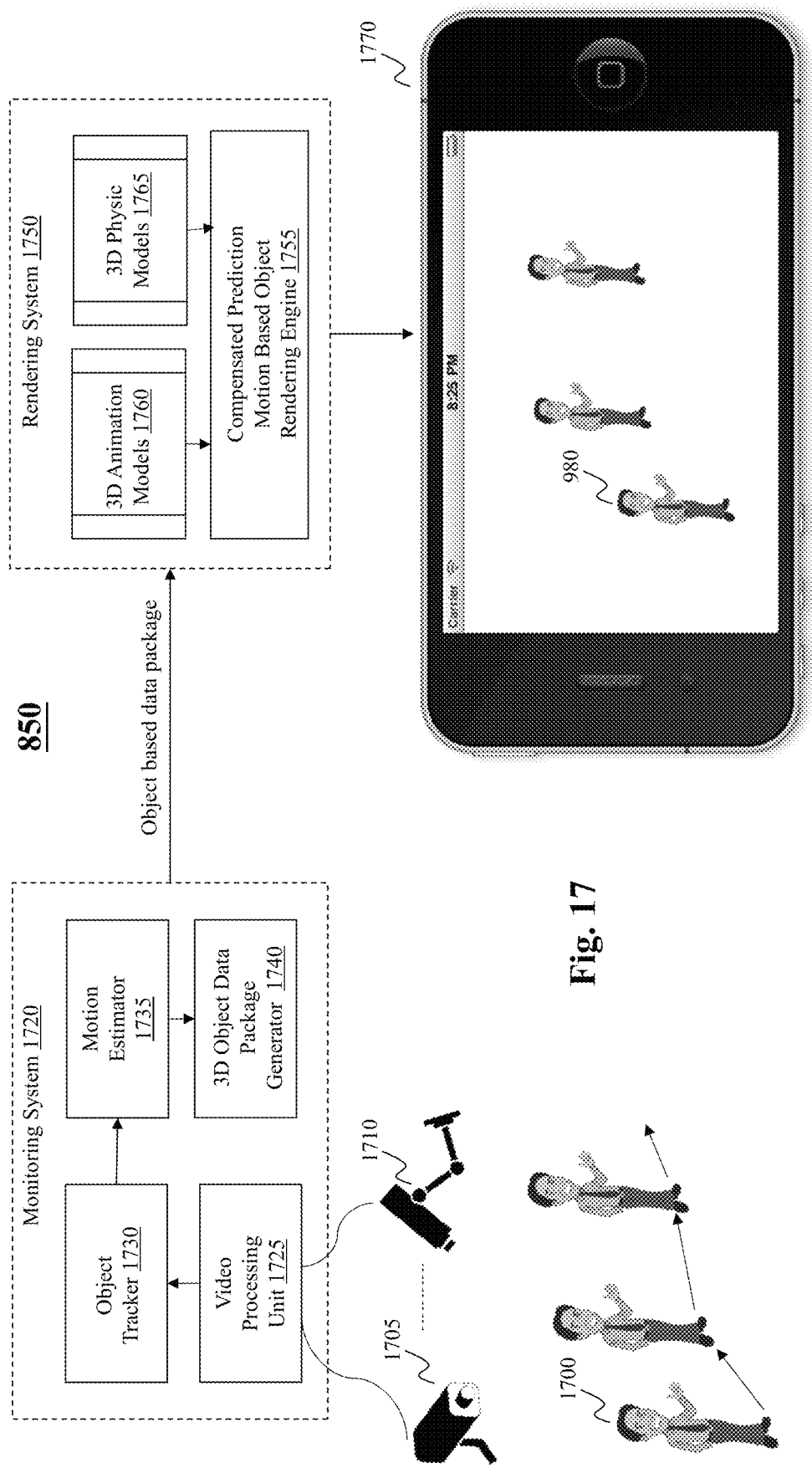
FIG. 17 depicts a framework of rendering a moving object based on sparse samples with predicted motions, according to an embodiment of the present teaching.

The present teaching discloses an approach to achieve the above using a lower number of bits needed for both rendering and transmission. FIG. 17 depicts a framework of rendering a moving object (user) based on sparse samples from the moving object (user) with predicted motions, according to an embodiment of the present teaching. In this illustration, a user 1700 is present in a scene with certain movements, as illustrated by arrows. The user and the movements are captured via, e.g., one or more cameras 1705, . . . , and 1710 and the acquired video information is sent to a monitoring system 1720, where the video is processed to identify the user (object) and motions predicted form the video data. The detected objects at sampled points and estimated motions are packaged as an object based data package and sent to a rendering system 1750, which is provided to generate on a device 1770 a rendered version 1780 of the user with certain movements similar to what was observed by the camera 1705, . . . , 1710.

In this illustrated embodiment, the monitoring system 1720 comprises a video processing unit 1725, an object tracker 1730, a motion estimator 1735, and an 3D object data package generator 1740. Each of the users/objects in a scene being monitored may be individually detected and tracked by the object tracker 1730 over time based on the processed video data from the video processing unit 1725. The positions of a user in the captured images over time may be determined by the object tracker 1730. Based on such tracked image positions, the 3D positions corresponding to the tracked 2D image positions may be obtained if the cameras 1705, . . . , and 1710 are calibrated. The motion associated with each user may be estimated by the motion estimator 1735 based on tracked positions of the user in different frames. The motion may be estimated at a certain framerate, e.g., 24 frames per second or at a lower framerate.

In some embodiments, 3D information with regard to a tracked user may be derived when, e.g., multiple cameras are used to capture images of different views of the user. Various techniques to use 2D images to derive 3D information may be applied to obtain 3D information. For example, stereo based approaches may be utilized to obtain 3D information (such as depth) of the user. Such detected information (in both 2D and 3D) about the monitored moving objects in a scene may then be packaged, e.g., in an object centric manner, and sent to the rendering system 1750. As discussed herein, each packaged object may correspond to a tracked user at a particular time instance. That is, each tracked user may have a series of object packages each of which provides a characterization of the tracked user at a specific sample point or at a specific point of time. In order to obtain more precise tracked information, the monitoring side may keep track of user movements at a rate that is the same or substantially close to the framerate. To enable efficient transmission and rendering, the tracked information may be sampled sparsely and the series of object packages corresponding to each specific tracked person may correspond to the sparse sampling rate.

Figure 18:
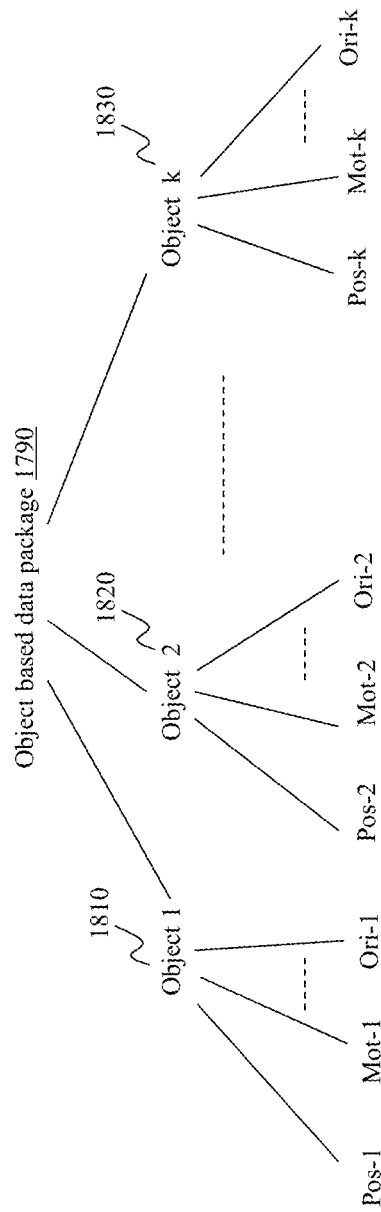
FIG. 18 illustrates exemplary data organization of an object based data package, according to an embodiment of the present teaching.

FIG. 18 illustrates exemplary data organization of the object based data package. In this illustrated embodiment, an object based data package may include information and detailed characterization of each of the tracked objects at a specific point of time. For example, an object based data package 1790 may include information related to object 1 1810, object 2 1820, . . . , object k 1830 for each of the objects tracked at a specific point of time in a video. For each of the tracked objects, various tracked features may be provided such as the position of the object (which may include 2D or 3D position), orientation of the object, and motion it undergoes at that moment in time, etc.

At the rendering side, upon receiving the object data packages from the monitoring system, the rendering system 1750 renders the objects identified using estimated features such as 3D pose, orientation, as well as motion information. As discussed herein, to allow the rendering system 1750 to utilize the limited computation power available from the device 1770 to render objects in a reasonable manner, the framerate to be used to render individual objects on device 1770 may be lower or even significantly lower than the framerate used by the monitoring system 1720 to monitor the scene. To achieve that, the object data packages may be generated at a sparse sampling rate and, in addition, the rendering system 1750 may include a compensated prediction motion based object rendering engine 1755, that accommodates the difference in a monitoring rate and a rendering rate by relying on predicted motion with compensation applied thereon. In some embodiments, when 3D information from the received data is available, the rendering may be in 3D (or partial 3D) performed, e.g., based on 3D animation models 1760 and 3D physic models 1765 as applied to the tracked user images. Details of the compensated prediction motion based object rendering engine 1755 is provided below.

Figure 19:
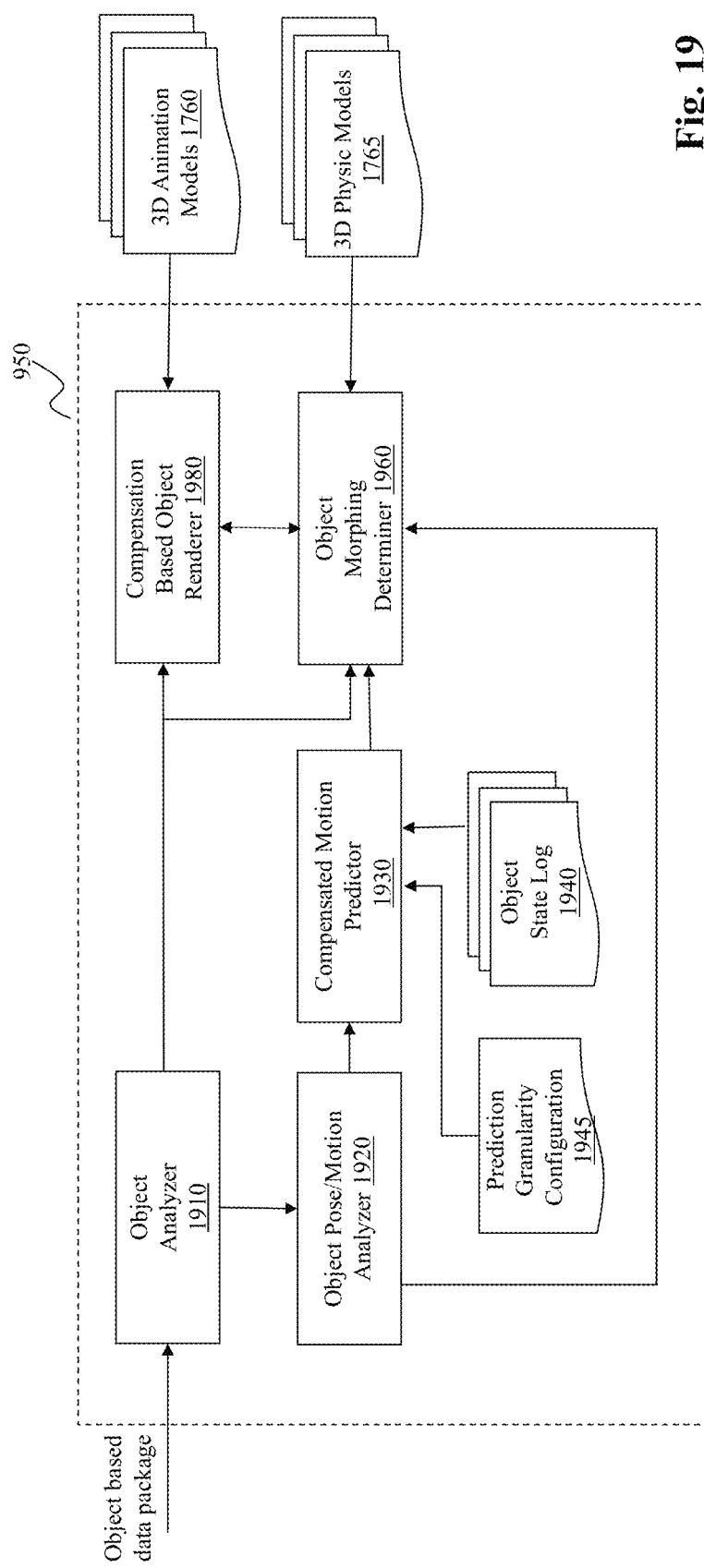
FIG. 19 depicts an exemplary high level system diagram of a rendering system, according to an embodiment of the present teaching.

FIG. 19 depicts an exemplary system diagram of the rendering system 1750, according to an embodiment of the present teaching. In this illustrated embodiment, the rendering system 1750 comprises an object analyzer 1910, an object pose/motion analyzer 1920, a compensated motion predictor 1930, an object morphing determiner 11960, and a compensation based object renderer 1980. To discuss how the compensated prediction motion based object rendering engine 1750 operates, an illustrated example is provided and discussed with respect to FIG. 20A and FIG. 20B.

Figure 20B:
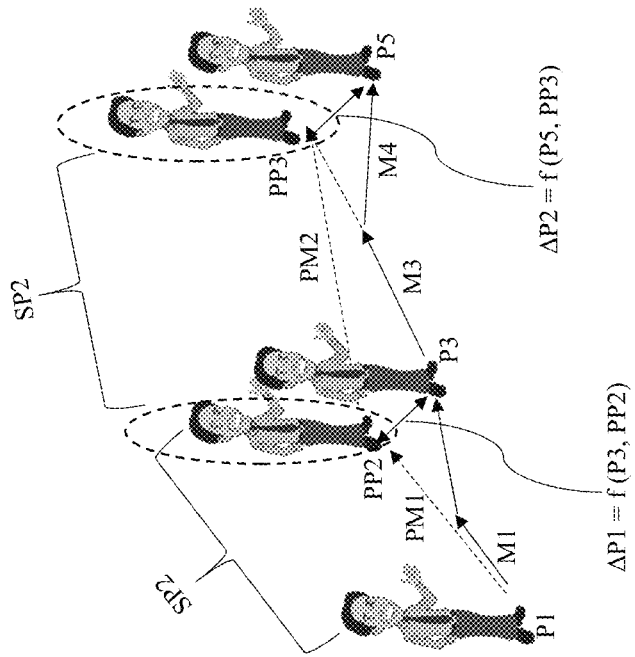
FIG. 20B illustrates the concept of compensated predicted motion based rendering at a sparser rate, according to an embodiment of the present teaching.
Figure 20A:
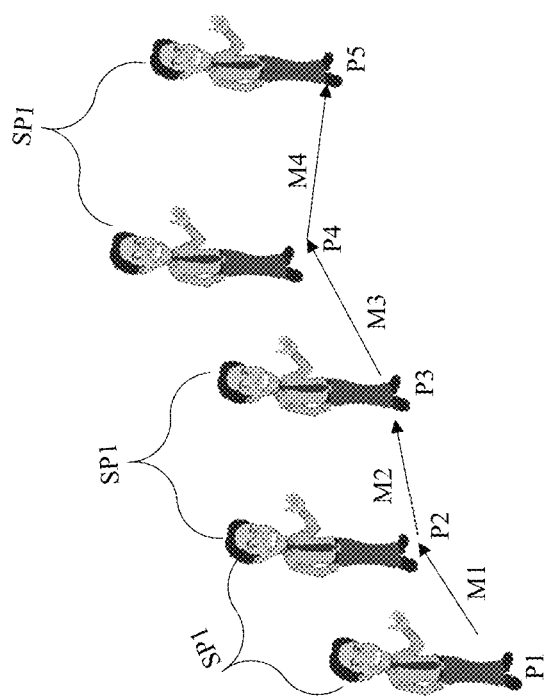
FIG. 20A illustrates a user in a scene moves from positions to positions.

In FIG. 20A, a user in a scene moves from position P1 to P2, P3, P4, and P5. Those positions are observed by the monitoring system 1720 and such observations may be according to a frequency corresponding to the framerate or at a rate that is lower than the framerate. The positions P1-P5 may correspond to sparsely sampled points. In this illustrated example, P1 is observed at time T1 and P2 is observed at T2 with a difference of SP1 (P2-P1=SP1), which is the duration between two sampling points. As seen, in the example illustrated, the sampling rate is characterized by SP1. For each sampling point, the monitoring system 1720 estimates a motion vector associated with the monitored object. For instance, for sampling point P1, the estimated motion vector is M1, at P2, the motion vector is M2, etc. As seen, the sequential motions of the tracked object form a trajectory from P1 to P5 with a sampling rate of SP1 and it is estimated based on the monitoring rate of SP1.

As discussed herein, to reduce the resources needed to render on the device 1770 (computation power, memory, bandwidth, etc.), the rendering side may not render a tracked object at the rate that the targets being monitored. This may be done by sending the tracked objects with meta information at a lower framerate rate without reducing the monitoring rate to ensure more accurate estimation of object features (e.g., motion vectors). As shown in FIG. 20B, a user tracked may be rendered at a rendering rate SP2 that may be lower than that of the monitoring rate at the tracking side (SP1). Specifically, the tracked user is rendered only with respect to positions P1, P3, and P5, as compared with the sampling points at P1, P2, P3, P4, P5 over the same period of time. The present teaching discloses a method and system to address the issue of more sparse rendering yet with compensation over time to ensure smooth visual effect.

As shown in FIG. 20B, at the time the rendering system 1750 receives information about a user at P1, motion vector M1 characterizing the motion of the person at P1 (estimated based on video data) may also be made available. In rendering the person in motion, the rendering system 1750 may not have the information of the user with respect to P3 and M3 and may render the person at a time corresponding to P3 based on prediction based on information available at the time when it receives information related to the person at P1. To render the user at a time corresponding to P1, the motion vector M1 associated with P1 is used as the basis. To render the person at a time corresponding to P3 based on rate of SP2, the rendering system 1750 relies on prediction, e.g., deriving a predicted motion PM1 based on the received motion M1 associated with P1 to enable projection of the user from current position P1 up until the next point of time, or a predicted position PP2 using the rendering rate SP2 associated with the rendering system 1750. This is shown in FIG. 20B where the user is rendered at P1 and from there, the same user is rendered at PP2 using a predicted motion vector PM1, which is an extended version of the received motion vector M1 associated with P1.

When a next object based data package for the next monitored point P3 is received by the rendering system 1750, the object position P3 is received, which may be different from the rendered position PP2 due to, e.g., a difference between M1 and PM1 (due to, e.g., skipping M2 which may have a different direction than M1 as shown in FIG. 20A). The discrepancy between P3 and PP2 in space may be small or large but can be used to compensate the discrepancy in rendering the user at the next location by the rendering system 1750. The user's monitored location P3 is received with a corresponding motion vector M3, which can be used to project to location PP3 from P3 at the rendering rate of SP2. Based on PP2 and PP3 (where the user is to be rendered at this point), a compensated predicted motion vector PM2 may be derived to morph the user rendered at PP2 to the user at PP3. In this manner, at each step, although the rendered position for the next moment may have a discrepancy when compared with the actual sampled position on the monitoring side caused by a sparser rendering rate, via compensated predicted motion vector PMi, the rendering may still approximately follow the actual trajectory of the moving object at the rendering side. However, based on this approach, the bandwidth and the computation required on the network and the rendering device are much lower. When 3D information is available, it may be compensated in the similar way by utilizing the 3D animation models 1760 as well as 3D physic models 1765.

Figure 21:
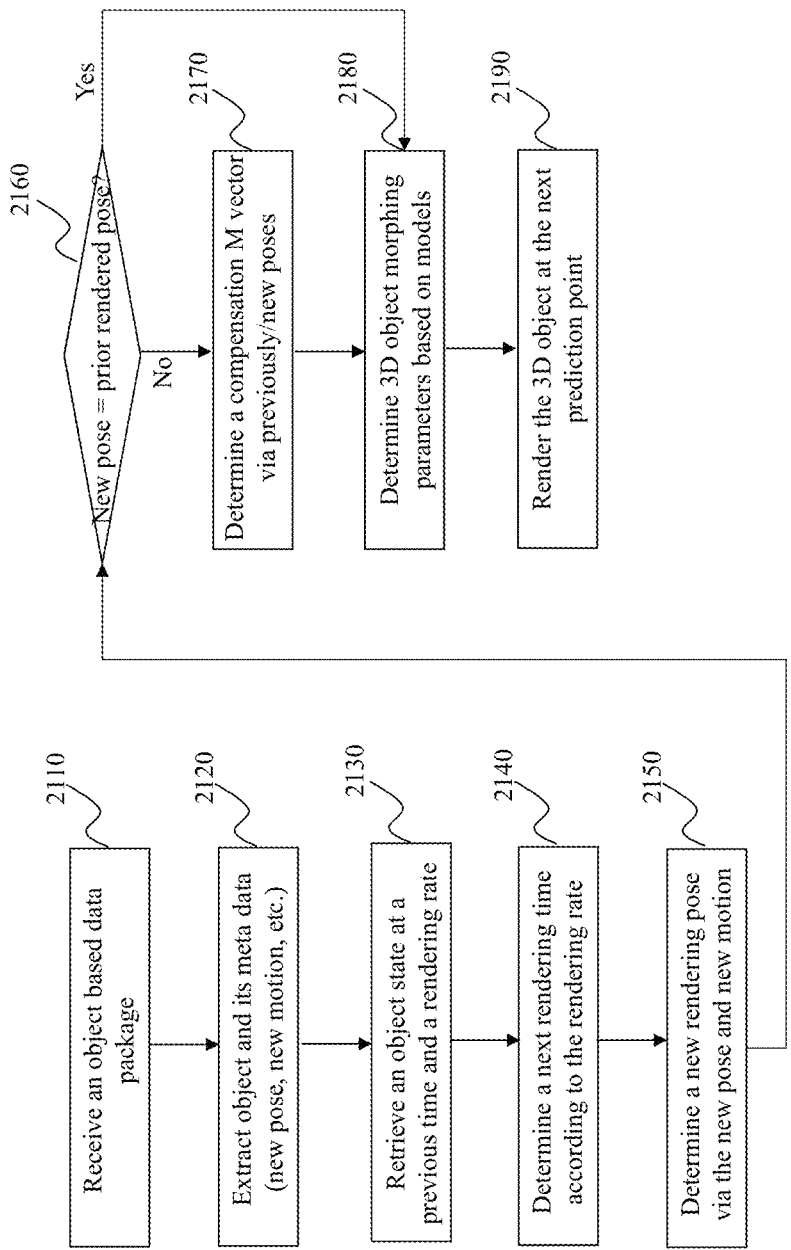
FIG. 21 is a flowchart of an exemplary process of a rendering system, according to an embodiment of the present teaching.

Given the discussion above, FIG. 21 is a flowchart of an exemplary process of the rendering system 1750, according to an embodiment of the present teaching. In operation, when the object analyzer 1910 receives, at 2110 of FIG. 21, an object based data package, it extracts, at 2120, objects and corresponding meta information, including its position and motion vectors characterizing the motion of the object at the moment of the sampling/rendering. The object state at the rendering side and the rendering rate may be retrieved, at 2130 (e.g., from an object state log 1940), where the object state may include information about the previous position at which the object (user) was previously rendered. The object state may also include other information such as the corresponding motion vectors used to morph the object from one position to another at the previous times.

Based on the rendering rate, a next rendering time may be determined at 2140, e.g., 0.5 seconds later. With the next rendering time, the new pose of the object and the new motion vector are used to determine, at 2150, a new rendering position at which the object is to be rendered next. For example, based on the received new pose, the new motion vector (describing the direction of the motion and velocity) may be used to compute where is the new position at the next rendering time (0.5 seconds). The motion vector to be used to render the object at the new position depends on whether the previous rendered position and the new pose received from the object data package coincide with each other. To determine that, the previous rendered object position may then be compared, at 2160, with the pose or position of the object extracted from the currently received object based data package. If they are the same, determined by the object pose/motion analyzer 1920 at 2160, it means that no compensation is needed. For example, P1 in FIG. 20A may correspond to the P1 on the rendering device. In this case, the motion vector received with the current object based data package (e.g., M1) is the correct motion vector.

If a discrepancy exists between the previously rendered position and the currently received position of the object (as shown in FIG. 20B between PP2 and P3 as well as between PP3 and P5), determined at 2160, a compensation motion vector needs to be computed. For example, as shown in FIG. 20B, when PP2 does not coincide with P3, a compensation motion vector PM2 needs to be determined. To do so, the compensated motion predictor 1930 determines, at 2170, the compensation motion vector based on the new rendering position (e.g., PP3 in FIG. 20B) at which the object is to be rendered at a later time (according to the rendering rate SP2)

and the previously rendered position (e.g., PP2 in FIG. 20B). That is, the vector connecting these two rendering positions with the known velocity from the object data package form the compensated motion vector. Such generated compensation motion vector is to be used to morph the object from the previously rendered position to the new rendering position.

As shown in FIG. 20B, a previously rendered position is PP2 and the newly received position is P3 with a motion vector M3. As PP2 and P3 are not the same (discrepancy exists), M3 is used to project a point at P3 to a future point PP3, determined based on rendering rate of SP2. Then based on PP2 and PP3, a compensation motion vector PM2 is generated and used to project from point PP2 (previously rendered position) to PP3 (a current rendering point determined based on M3 and P3). In this way, although PP2 are not coincide with P3 (discrepancy exists), by deriving the compensated motion vector PM2 from the newly received object based data package, the object may be rendered at the next position as close to the actual position as possible based on the currently received object position (P3) and motion vector (M3).

To render the object at the next rendering position, the object (user) may be morphed from the previously rendered position to the new rendering position according to some morphing parameters, which determine how to visualize the object at the next rendering position. In some embodiments, information related to the previously rendered object may be used to determine, by the object morphing determiner 1960 at 2180, certain applicable morphing parameters to be used to morph the object using the motion vector, which is either the received new motion vector (when the previously rendered position is the same as the received new position of the object) or the compensation motion vector (when the previously rendered position is not the received new position of the object). In some embodiments, morphing parameters may be determined based on 3D information of the object (if available) in accordance with different models, e.g., 3D animation models 1760 and/or 3D physic models 1765. With the motion vector so determined, the object is then morphed/rendered, by the compensation based 3D object renderer 1980 at 2190, at the next position with a visualization determined in accordance with the morphing parameters. Through the proposed mechanism, the rate of rendering a moving user in accordance with the actual motion trajectory observed can be lowered based on the resources available to the device. In addition, the bandwidth to transmit data packages to facilitate the rendering can also be significantly lowered.

Figure 22:
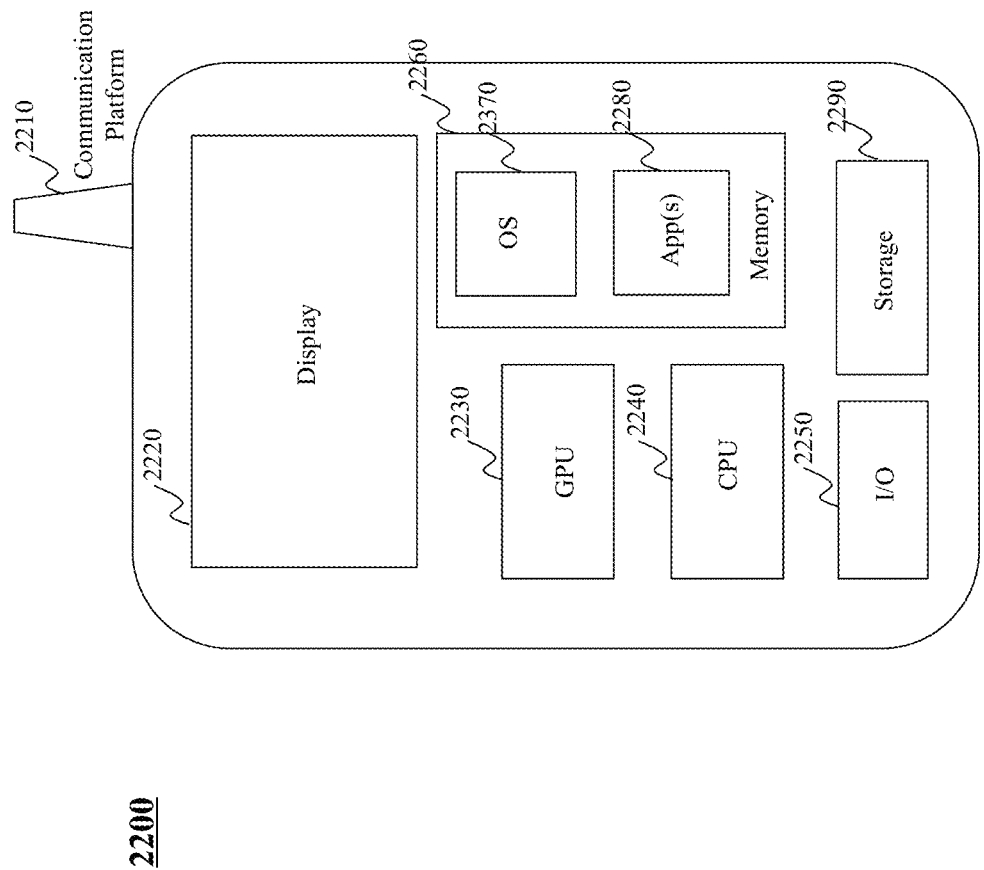
FIG. 22 is an illustrative diagram of an exemplary mobile device architecture that may be used to realize a specialized system implementing the present teaching in accordance with various embodiments.

FIG. 22 is an illustrative diagram of an exemplary mobile device architecture that may be used to realize a specialized system implementing at least some parts of the present teaching in accordance with various embodiments. In this example, the user device on which the present teaching is implemented corresponds to a mobile device 2200, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 2200 may include one or more central processing units ("CPUs") 2240, one or more graphic processing units ("GPUs") 2230, a display 2220, a memory 2260, a communication platform 2210, such as a wireless communication module, storage 2290, and one or more input/output (I/O) devices 2240. Any other suitable component, including but not limited to a system bus or a controller (not shown), may also be included in the mobile device 2200. As shown in FIG. 22 a mobile operating system 2270 (e.g., iOS, Android, Windows Phone, etc.), and one or more applications 2280 may be loaded into memory 2260 from storage 2290 in order to be executed by the CPU 2240. The applications 2280 may include a browser or any other suitable mobile apps for managing a conversation system on mobile device 2200. User interactions may be achieved via the I/O devices 2240 and provided to the automated dialogue companion via network(s) 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 23:
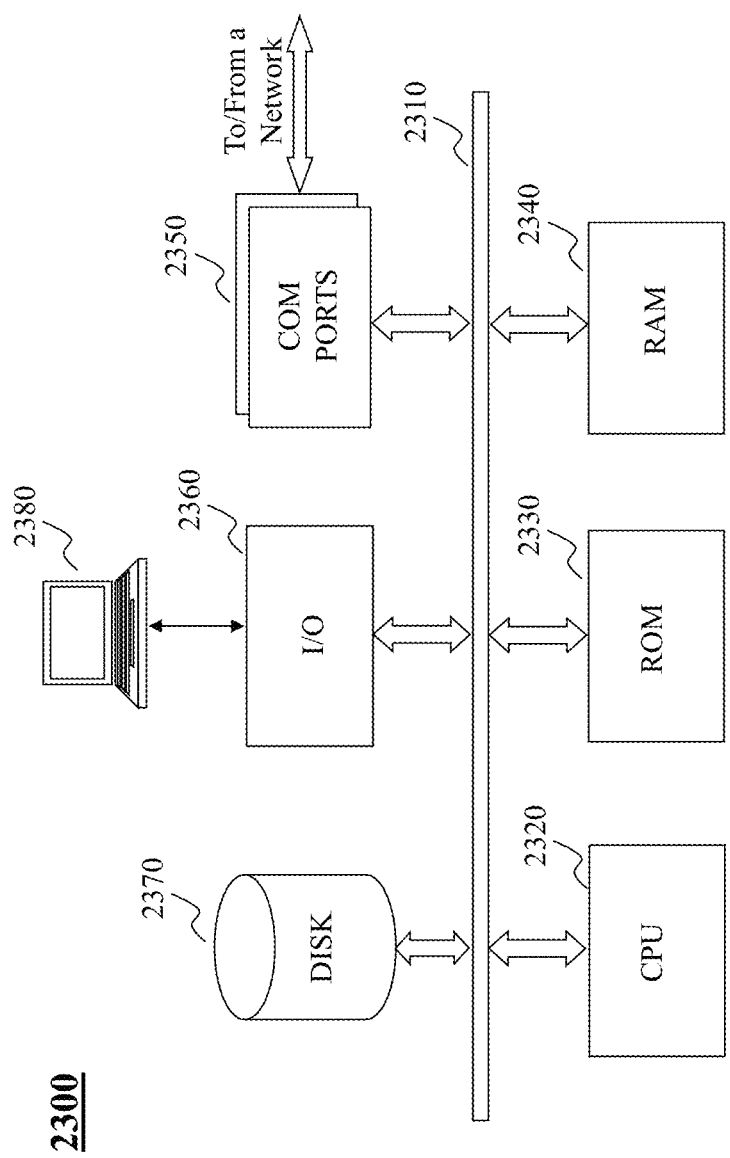
FIG. 23 is an illustrative diagram of an exemplary computing device architecture that may be used to realize a specialized system implementing the present teaching in accordance with various embodiments.

FIG. 23 is an illustrative diagram of an exemplary computing device architecture that may be used to realize a specialized system implementing at least some parts of the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 2300 may be used to implement any component of conversation or dialogue management system, as described herein. For example, conversation management system may be implemented on a computer such as computer 2300, via its hardware, software program, firmware, or a combination thereof. Although only one such computer is shown, for convenience, the computer functions relating to the conversation management system as described herein may be implemented in a distributed fashion on a number of similar platforms, to distribute the processing load.

Computer 2300, for example, includes COM ports 2350 connected to and from a network connected thereto to facilitate data communications. Computer 2300 also includes a central processing unit (CPU) 2320, in the form of one or more processors, for executing program instructions. The exemplary computer platform includes an internal communication bus 2310, program storage and data storage of different forms (e.g., disk 2370, read only memory (ROM) 2330, or random access memory (RAM) 2340), for various data files to be processed and/or communicated by computer 2300, as well as possibly program instructions to be executed by CPU 2320. Computer 2300 also includes an I/O component 2360, supporting input/output flows between the computer and other components therein such as user interface elements 2380. Computer 2300 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method implemented on at least one machine including at least one processor, memory, and communication platform capable of connecting to a network for identifying object of interest, the method comprising:

receiving image data acquired by a camera embedded in an automated dialogue companion with respect to a scene where one or more users are engaged in a human machine dialogue with the automated dialogue companion in accordance with a dialogue strategy directed to an intended topic;

detecting, from the image data, the one or more users during a period of time;

estimating three dimensional (3D) gazing rays of the one or more users during the period of time;

identifying, for each of different points of time in the period of time, one or more intersections of the 3D gazing rays of at least some of the one or more users;

determining at least one intentional focus of at least one of the one or more users based on patterns of the one or more intersections across the different points of time;

determining at least one object of interest corresponding to the at least one intentional focus associated with the at least one of the one or more users present in the scene; and adjusting the dialogue strategy to generate an updated dialogue strategy relating to the at least one object of intentional focus in accordance with the intended topic.

2. The method of claim 1, wherein the step estimating the 3D gazing rays comprises:

detecting, from the image data, eyes of the one or more users;

computing 3D gazing rays of each of the one or more users at different points of time during the period of time based on features of the detected eyes as well as at least one calibration parameter associated with the camera, wherein the at least one calibration parameter maps each point in the image data to a 3D position in the scene.

3. The method of claim 1, wherein the step of identifying the one or more intersections of the 3D gazing rays comprises:

with respect to each of the one or more users,
identifying gazing rays at different points of time;
determining whether an intersection between two gazing rays of the user exists at each of different points of time; and
recording any intersection of gazing rays of the user at any applicable point of time.

4. The method of claim 3, further comprising:

applying temporal persistence test to the recorded intersections;

filtering out any intersection that fails the temporal persistence test;

generating the one or more intersections based on the intersections that satisfy the temporal persistence test.

5. The method of claim 3, wherein the step of determining at least one object of interest comprises:

retrieving a plurality of objects detected in the scene and associated 3D positions thereof;

selecting the at least one object of interest from the plurality of objects wherein the 3D position of each of the at least one object matches a corresponding one of the at least one of the one or more intersections.

6. The method of claim 4, wherein
when an intersection point that matches a 3D position of an object of interest is originated from gazing rays of one user, the user is considered to be interested in the object of interest;
when an intersection point that matches a 3D position of an object of interest is originated from gazing rays of two users, the two users are considered to be both interested in the object of interest.

7. The method of claim 1, wherein
one of the one or more users actively engaged in the dialogue is associated with an object of interest; and
the dialogue strategy for the user is modified based on the intentional focus of the user to continue the dialogue in relation to the object of interest in order to improve user engagement.

8. Machine readable and non-transitory medium having information recorded thereon for identifying object of interest, wherein the information, when read by the machine, causes the machine to perform:
receiving image data acquired by a camera embedded in an automated dialogue companion with respect to a scene where one or more users are present engaged in a human machine dialogue with the automated dialogue companion in accordance with a dialogue strategy directed to an intended topic;
detecting, from the image data, the one or more users during a period of time;
estimating three dimensional (3D) gazing rays of the one or more users during the period of time;
identifying, for each of different points of time in the period of time, one or more intersections of the 3D gazing rays of at least some of the one or more users;
determining at least one intentional focus of at least one of the one or more users based on patterns of the one or more intersections across the different points of time;
determining at least one object of interest corresponding to the at least one intentional focus associated with at least one of the one or more users present in the scene; and
adjusting the dialogue strategy to generate an updated dialogue strategy relating to the at least one object of intentional focus in accordance with the intended topic.

9. The medium of claim 8, wherein the step estimating the 3D gazing rays comprises:
detecting, from the image data, eyes of the one or more users;
computing 3D gazing rays of each of the one or more users at different points of time during the period of time based on features of the detected eyes as well as at least one calibration parameter associated with the camera, wherein
the at least one calibration parameter maps each point in the image data to a 3D position in the scene.

10. The medium of claim 8, wherein the step of identifying the one or more intersections of the 3D gazing rays comprises:
with respect to each of the one or more users,
identifying gazing rays at different points of time;
determining whether an intersection between two gazing rays of the user exists at each of different points of time; and
recording any intersection of gazing rays of the user at any applicable point of time.

11. The medium of claim 10, wherein the information, when read by the machine, further causes the machine to perform:
applying temporal persistence test to the recorded intersections;
filtering out any intersection that fails the temporal persistence test;
generating the one or more intersections based on the intersections that satisfy the temporal persistence test.

12. The medium of claim 10, wherein the step of determining at least one object of interest comprises:
retrieving a plurality of objects detected in the scene and associated 3D positions thereof;
selecting the at least one object of interest from the plurality of objects wherein the 3D position of each of the at least one object matches a corresponding one of the at least one of the one or more intersections.

13. The medium of claim 11, wherein
when an intersection point that matches a 3D position of an object of interest is originated from gazing rays of one user, the user is considered to be interested in the object of interest;
when an intersection point that matches a 3D position of an object of interest is originated from gazing rays of two users, the two users are considered to be both interested in the object of interest.

14. The medium of claim 8, wherein
one of the one or more users actively engaged in the dialogue is associated with an object of interest; and
the dialogue strategy for the user is modified based on the intentional focus of the user to continue the dialogue in relation to the object of interest in order to improve user engagement.

15. A system for identifying object of interest, comprising:
a dynamic gazing ray estimator configured for
receiving image data acquired by a camera embedded in an automated dialogue companion with respect to a scene where one or more users are engaged in a human machine dialogue with the automated dialogue companion in accordance with a dialogue strategy directed to an intended topic,
detecting, from the image data, the one or more users during a period of time, and
estimating three dimensional (3D) gazing rays of the one or more users during the period of time; and
a gaze based object of interest estimator configured for
identifying, for each of different points of time in the period of time, one or more intersections of the 3D gazing rays of at least some of the one or more users,
determining at least one intentional focus of at least one of the one or more users based on patterns of the one or more intersections across the different points of time, and
determining at least one object of interest corresponding to the at least one intentional focus, associated with at least one of the one or more users present in the scene, wherein
the dialogue strategy is adjusted to generate an updated dialogue strategy relating to the at least one object of intentional focus in accordance with the intended topic.

16. The system of claim 15, wherein the dynamic gazing ray estimator comprises:
a user eye tracker configured for detecting, from the image data, eyes of the one or more users;
a gazing ray estimator configured for computing 3D gazing rays of each of the one or more users at different points of time during the period of time based on features of the detected eyes as well as at least one calibration parameter associated with the camera, wherein the at least one calibration parameter maps each point in the image data to a 3D position in the scene.

17. The system of claim 15, wherein the gaze based object of interest estimator comprises:

a user based gazing ray intersection estimator configured for, with respect to each of the one or more users,
identifying gazing rays at different points of time;
determining whether an intersection between two gazing rays of the user exists at each of different points of time; and
recording any intersection of gazing rays of the user at any applicable point of time.

18. The system of claim 17, further comprising a temporal persistence filter configured for:

applying temporal persistence test to the recorded intersections;
filtering out any intersection that fails the temporal persistence test;
generating the one or more intersections based on the intersections that satisfy the temporal persistence test.

19. The system of claim 17, wherein the step of determining at least one object of interest comprises:

retrieving a plurality of objects detected in the scene and associated 3D positions thereof;
selecting the at least one object of interest from the plurality of objects wherein the 3D position of each of the at least one object matches a corresponding one of the at least one of the one or more intersections.

20. The system of claim 15, wherein when an intersection point that matches a 3D position of an object of interest is originated from gazing rays of one user, the user is considered to be interested in the object of interest;
when an intersection point that matches a 3D position of an object of interest is originated from gazing rays of two users, the two users are considered to be both interested in the object of interest.

21. The system of claim 15, wherein one of the one or more users actively engaged in the dialogue is associated with an object of interest; and
the dialogue strategy for the user is modified based on the intentional focus of the user to continue the dialogue in relation to the object of interest in order to improve user engagement.

* * * * *